(12) United States Patent
Jain et al.

(10) Patent No.: US 10,652,765 B2
(45) Date of Patent: May 12, 2020

(54) AUTOMATED NETWORK DIAGNOSTIC TECHNIQUES

(71) Applicant: Hughes Network Systems, LLC, Germantown, MD (US)

(72) Inventors: Kaustubh Jain, Germantown, MD (US); Nagesh Javali, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/200,340

(22) Filed: Nov. 26, 2018

(65) Prior Publication Data

US 2019/0110211 A1 Apr. 11, 2019

Related U.S. Application Data

(63) Continuation of application No. 15/264,569, filed on Sep. 13, 2016, now Pat. No. 10,142,860.
(Continued)

(51) Int. Cl.
*H04W 24/02* (2009.01)
*H04W 24/10* (2009.01)
(Continued)

(52) U.S. Cl.
CPC ............ *H04W 24/02* (2013.01); *H04L 43/00* (2013.01); *H04L 43/04* (2013.01); *H04L 43/062* (2013.01);
(Continued)

(58) Field of Classification Search
CPC ... H04L 69/16; H04L 63/166; H04L 63/1425; H04W 24/10; H04W 72/085
See application file for complete search history.

(56) References Cited

U.S. PATENT DOCUMENTS

2003/0128692 A1 7/2003 Mitsumori et al.
2008/0049641 A1 2/2008 Edwards et al.
(Continued)

OTHER PUBLICATIONS

PCT/US2017/037236 Written Opinion of the International Searching Authority dated Jul. 31, 2017.
(Continued)

*Primary Examiner* — Ayaz R Sheikh
*Assistant Examiner* — Debebe A Asefa
(74) *Attorney, Agent, or Firm* — NovoTechIP International PLLC

(57) ABSTRACT

Automatically diagnosing operation of a communication network, including collecting, during multiple time periods spanning multiple days, a plurality of Layer-4 statistics for Layer-4 network connections on the network; determining, for each time period in the multiple time periods, a first Layer-4 condition metric for the time period based on the Layer-4 protocol statistics collected during the time period; determining a network performance indicator, based on a number of the time periods that a first threshold condition is met by the first Layer-4 condition metric; determining whether the communication network has experienced a performance issue based on the network performance indicator meeting a second threshold condition; and causing a diagnostic action, a corrective action, or a maintenance action to be performed based on the determination whether the communication network has experienced a performance issue.

19 Claims, 21 Drawing Sheets

Related U.S. Application Data

(60) Provisional application No. 62/349,968, filed on Jun. 14, 2016, provisional application No. 62/364,839, filed on Jul. 20, 2016.

(51) Int. Cl.
| | | |
|---|---|---|
| *H04W 72/04* | (2009.01) | |
| *H04W 72/08* | (2009.01) | |
| *H04L 12/26* | (2006.01) | |
| *H04W 88/08* | (2009.01) | |

(52) U.S. Cl.
CPC .......... *H04L 43/0864* (2013.01); *H04L 43/16* (2013.01); *H04W 24/10* (2013.01); *H04W 72/0453* (2013.01); *H04W 72/085* (2013.01); *H04W 88/08* (2013.01)

(56) References Cited

U.S. PATENT DOCUMENTS

| | | | | |
|---|---|---|---|---|
| 2008/0049753 A1* | 2/2008 | Heinze | ................. | H04L 47/726 |
| | | | | 370/392 |
| 2014/0303934 A1* | 10/2014 | Mylarappa | .......... | G06F 11/3089 |
| | | | | 702/186 |
| 2015/0039177 A1* | 2/2015 | Chapman | .............. | G06F 16/248 |
| | | | | 701/31.6 |

OTHER PUBLICATIONS

International Search Report dated Jul. 31, 2017 from International Patent Application No. PCT/US2017/037236.

* cited by examiner

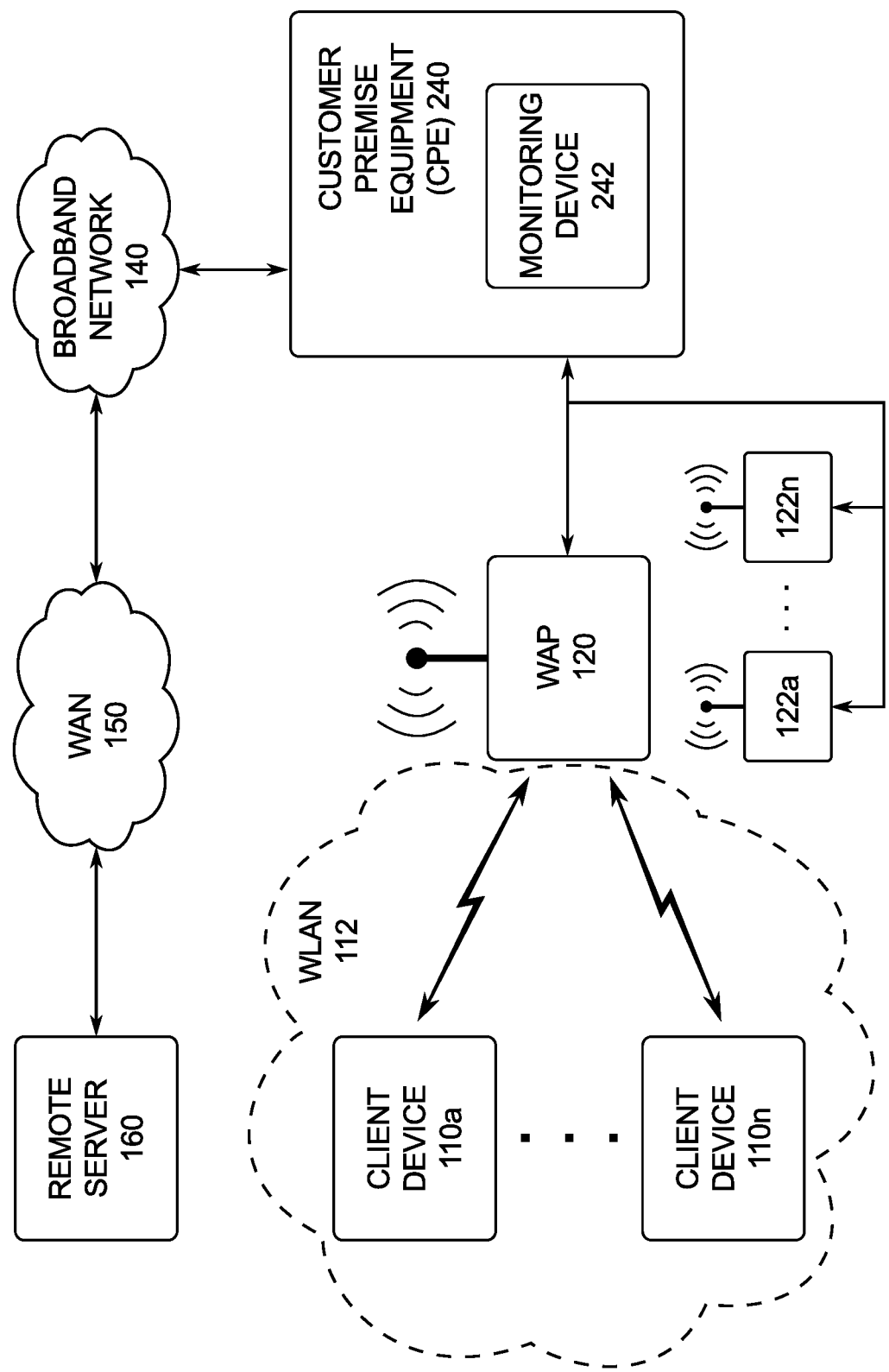

AUTOMATED NETWORK DIAGNOSTIC TECHNIQUES

CROSS-REFERENCE TO RELATED APPLICATIONS

This application is a continuation of pending U.S. patent application Ser. No. 15/264,569, filed on Sep. 13, 2016, and entitled "Gain/Flatness Enhancement for RF Switch Matrix," which claimed a benefit of priority to U.S. Provisional Patent Application No. 62/349,968, filed on Jun. 14, 2016 (entitled "Automated Network Diagnostic Techniques") and U.S. Provisional Patent Application No. 62/364,839, filed on Jul. 20, 2016 (entitled "Automated Network Diagnostic Techniques"). Each of the foregoing applications are incorporated by reference herein in their entireties.

BACKGROUND

Many consumer devices are adapted to utilize Wi-Fi or other wireless networking technologies to connect to the Internet. Thus, in both home and enterprise network installations, Wireless LAN (WLAN) conditions play an important role in the user experience. While advancements are continuously being made in the Wi-Fi protocols and devices to support higher data rates, poor WLAN setup and unanticipated conditions in the environment can lead to significant and persistent performance degradation and user dissatisfaction. With ever increasing speeds being delivered by broadband service providers, and increased use of Wi-Fi for the "last hop" to user devices, more situations are being encountered where a WLAN is acting as a bottleneck. Thus, although Wi-Fi standards have evolved to theoretically deliver high maximum data rates (in some cases, upwards of 1 Gbps), poor placement of devices, misconfiguration of devices, and environmental issues can substantially reduce throughput and reliability in practice. Plus, a client device may fail to support a newer Wi-Fi standard used by a router; the consequences of this may include the client device not utilizing all of a router's capabilities, or other client devices experiencing reduced performance. Additionally, a client device may, even when the client device supports the appropriate Wi-Fi standard and link conditions are good, experience poor performance due to the client device having limited CPU or memory resources which become overloaded and cause received data to be consumed slowly. Apart from identifying when a WLAN is acting as a bottleneck, it is also important to identify what is causing degradation for a WLAN, so that effective actions can be taken to alleviate the problem.

With the ubiquitous use of Wi-Fi wireless networking in home and business environments, diagnosing performance bottlenecks in a Wireless LAN (WLAN) is becoming an important task. Although there are devices and tools that collect a wide range of statistics to identify the health of the Wi-Fi channel, the link quality to various devices, and overall WLAN health as well, such devices and tools often rely on specialized hardware. For home area networks, although some Wi-Fi routers may measure some basic Wi-Fi link quality metrics, such as link quality, transmit rate, and error rate, they only give an indication of the current WLAN health and do not provide enough information to identify some of the commonly experienced problems, generally do not provide meaningful summaries for end users, or remedies for problems. There are enterprise-grade Wi-Fi Access Points (APs) and routers that collect a variety of Layer-1 and Layer-2 statistics. However, such statistics are measured, stored, and presented in a manner directed towards individuals with the skills and expertise or network admins and Wi-Fi-domain experts, and are not summarized and presented in a way useful to a layman. Additionally, such hardware does not provide an algorithmic way of identifying the presence of, main causes of, and solutions for performance bottlenecks.

For broadband service providers (which may also be referred to as "ISPs" (Internet service providers), the problem of troubleshooting performance issues is both difficult and important. The problem is difficult because in many configurations customers provide their own WLAN hardware, which usually is not directly accessible to or configurable by a broadband service provider. In such configurations, Layer-1 and Layer-2 statistics for a WLAN are generally not available. The problem is also important, as the broadband service provider is often one of the first places a customer contacts when experiencing networking issues, even if such issues arise from WLAN hardware neither provided by nor under the control of the broadband service provider. Thus, it is very useful for a broadband service provider to be able to make use of automated wireless access point diagnostic systems that are effective across many of the varied WLAN configurations presented across customers.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2C illustrates an example of a high-level block diagram of an end-to-end network architecture for automatically diagnosing operation of one or more wireless communication networks, using a monitoring device included in customer premise equipment to collect Layer-4 statistics.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1A:
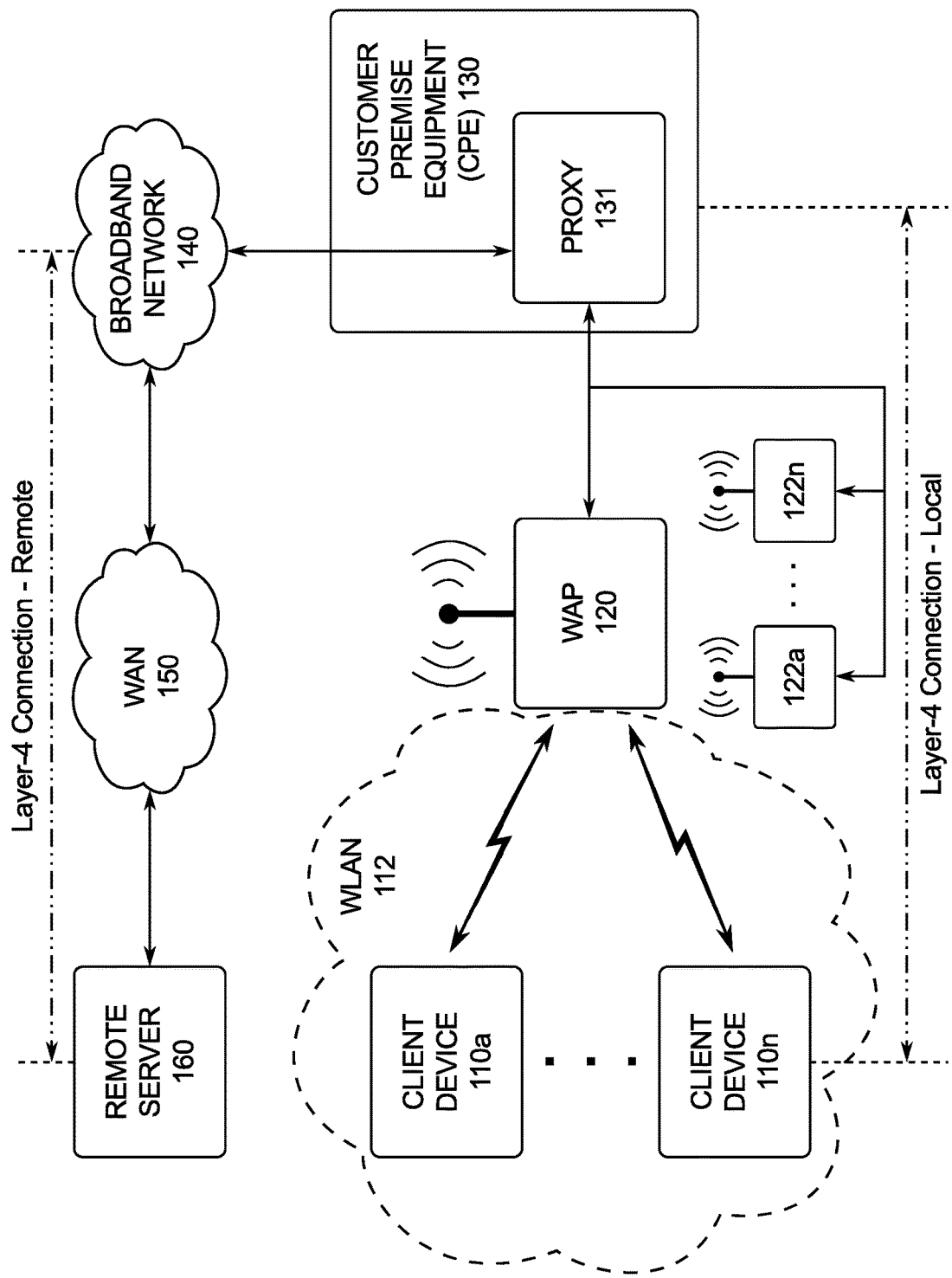
FIG. 1A illustrates an example of a high-level block diagram of an end-to-end network architecture for automatically diagnosing operation of one or more wireless communication networks.

FIG. 1A illustrates an example of a high-level block diagram of an end-to-end network architecture for automatically diagnosing operation of one or more wireless communication networks, such as a wireless network provided by wireless access point (or "WAP") 120 for one or more client devices 110a to 110n. Wireless access point 120 provides wireless data communication for client devices, such as client devices 110a to 110n. The physical layer for wireless access point 120 may be based on, for example, radio (such as Wi-Fi), diffuse light (such as diffuse infrared), directed light (such as steered laser communication). In some instances, wireless access point 120 may be a wireless router that further performs the functions of a router.

In the example illustrated in FIG. 1A, the network comprises one or more client devices 110a to 110n, each of which is configured to establish a connection with wireless access point 120 via WLAN (wireless local area network) 112. Examples of client devices 110a to 110n include, but are not limited to, smartphones, tablet computers, desktop computers, notebook computers, game consoles, network-connected multimedia devices, and Internet of Things (IoT) types of devices. Wireless data communication between client devices 110a to 110n and wireless access point may be according to, for example, one or more of the IEEE 802.11 media access control (MAC) and physical layer (PHY) specifications for implementing WLAN computer communication, including, but not limited to, 802.11a, 802.11b, 802.11g, 802.11n, 802.11ac, and 802.11ax. In some examples, wireless access point 120 may operate multiple WLANs. For example, wireless access point 120 may operate WLAN 112 on a first band (such as the 2.4 GHz ISM band), and also operate a second WLAN (not illustrated in FIG. 1A) on a different second band (such as the 5 GHz U-NII radio band). As another example, wireless access point 120 may operate WLAN 112 on a first channel, and also operate a second WLAN on a different second channel. In some examples, a WLAN may span across multiple wireless access points. For example, each of wireless access points 120 and 122a to 122n may be configured to be part of WLAN 112.

Wireless access point 120 connects client devices 110a to 110n to the customer premise equipment (CPE) 130. In some examples, there may be one or more additional wireless access points 122a to 122n also connected to CPE 130. In some examples, one or more of the additional wireless access points 122a to 122n may be configured to extend the WLAN 112 provided by the wireless access point 120. In some examples, one or more of the additional wireless access points 122a to 122n may be configured to provide one or more WLANs that are separate from WLAN 112. In some examples, the wireless access point 120 may be configured to provide a plurality of WLANs; for example, wireless access point 120 may be configured to provide multiple WLANs within a single band (such as the 2.4 GHz ISM band—although WLANs may be operated on different channels within the same band) or may be configured to provide WLANs on separate bands (such as a first WLAN on the 2.4 GHz ISM band, and a second WLAN on the 5 GHz U-NII radio band).

CPE 130 generally comprises any terminal and associated equipment located at the premises of a client subscriber, which connects client devices 110a to 110n to a communications service provider network. CPE 130 may include, for example, devices such as DSL (digital subscriber line)

modems, cable modems, satellite modems, telephones, routers, switches, residential gateways, set-top boxes, fixed mobile convergence products, home networking adapters, and Internet access gateways that enable the client subscriber to access services available via the communications service provider network and to distribute the services within the client subscriber's premises or facility (for example, a residential dwelling or a local office). CPE 130 is connected to one or more remote servers (of which only a one remote server 160 is illustrated in FIG. 1A) via a broadband network 140 and wide area network (WAN) 150. In some examples, broadband network 140 may provide communications services via satellite communications services. An example of WAN 150 is the Internet. To communicate with remote server 160, client devices 110a to 110n may seek to establish an OSI (Open Systems Interconnection) Level-4 connection (which may be referred to as a "Layer-4 connection" or a "transport layer connection") via the network architecture illustrated in FIG. 1A. A common Layer-4 protocol for such connections is Transmission Control Protocol (TCP); accordingly, one or more of client devices 110a to 110n may seek to establish one or more TCP connections with remote servers such as remote server 160. It is noted that although examples are discussed below regarding TCP, similar techniques may also be applied for other Layer-4 protocols, such as, but not limited to, SCTP (Stream Control Transmission Protocol) and DCCP (Datagram Congestion Control Protocol). Some aspects may also be applied for connectionless Layer-4 protocols, such as, but not limited to, UDP (User Datagram Protocol).

CPE 130 includes a proxy 131. Proxy 131 may be a performance enhancing proxy (PEP). Examples of PEPs are described in IETF (Internet Engineering Task Force) RFC (Request for Comment) 3531, entitled "Performance Enhancing Proxies Intended to Mitigate Link-Related Degradations," which is incorporated by reference herein in its entirety, and a copy of which is included in this provisional application. Other examples of such proxies are described in U.S. Pat. Nos. 6,973,497, 7,006,480, 7,082,467, 7,219,158, 7,389,533, 7,398,552, 7,643,416, 8,140,687, 8,687,493, and 9,240,950 and U.S. Patent App. Pub. No. 2015/0381752, which are each incorporated by reference herein in their entireties. In some examples, proxy 131 may be configured to provide an application layer PEP; for example, a web caching HTTP proxy. In some examples, proxy 131 may be configured to provide a transport layer (or "Layer-4") PEP; for example, a TCP proxy. In some examples, a distributed PEP implementation may be used; for example, proxy 131 may provide a first Layer-4 proxy and a second Layer-4 proxy may be included in broadband network 140, such that the two PEPs surround a particular link for which a performance improvement is desired, such as a satellite communication link. Proxy 131 may be configured to operate essentially transparently from the perspective of client devices 110a to 110n, such that although it may appear to a client device that the client device is communicating via an end-to-end connection (either at a transport layer or an application layer) with remote server 160, the communication is actually between the client device and proxy 131 (although proxy 131 may further communicate with remote server 160 to send or receive data in response to communication with the client device). In some situations, such as an caching web proxy that already has a resource sought by a requesting client device, a local Layer-4 connection between the client device and proxy 131 may not result in a corresponding remote Layer-4 connection via WAN 150, as the resource is available locally.

In some examples, proxy 131 may be configured to "spoof" Layer-4 connections, such as TCP connections. Layer-4 "Spoofing" describes a characteristic of intercepting a Layer-4 connection in the middle and terminating the connection as if the interceptor (proxy 131, for example) is the intended destination. While this is a characteristic of many TCP PEP implementations, it is not a characteristic of all TCP PEP implementations. Spoofing splits the Layer-4 connection; for example, FIG. 1A illustrates an example in which a Layer-4 connection between one of client devices 110a to 110n has been split into at least two Layer-4 connections: a local Layer-4 connection between the client device and proxy 131, and a remote Layer-4 connection with remote server 160. The remote Layer-4 connection may be terminated at, for example, a network node included in broadband network 140, as illustrated in FIG. 1A; for example, broadband network 140 may include a PEP configured to exchange data with proxy 131. The remote Layer-4 connection may be terminated at, as another example, proxy 131. Proxy 131 may be configured to, for a spoofed TCP connection, perform local TCP acknowledgements, where TCP data segments received by proxy 131 are locally acknowledged by proxy 131, which allows fast ramp-up for new TCP connections to maximize data throughput over a broadband connection with a high RTT (round trip time), and may be used to limit a maximum TCP ACK rate. Proxy 131 may be configured to, for a spoofed TCP connection, perform local retransmission, where when TCP packets got lost on the local side (which may be more likely over a WLAN due to factors such as bit errors, collisions, and link outages) proxy 131 can handle the retransmission itself rather than requiring remote server 160 to perform a retransmission. Local TCP acknowledgement and local retransmission each require additional computing and memory resources over a non-spoofed connection. For Layer-4 connections that pass through proxy 131, but are not spoofed, proxy 131 may be configured to simply perform simple forwarding of Layer-3 packets for unspoofed Layer-4 connections.

In some examples, wireless access point 120 may be configured to perform network address translation (NAT) for client devices 110a to 110n. This is common where IPv4 is used for Layer-3 communication. In such examples, although client devices 110a and 110n may be assigned distinct network addresses on WLAN 112, at CPE 130 all packets sent by, or directed to, client devices 110a to 110n are addressed from or to a network address for wireless access point 120. Although it may still be possible to associate packets with individual Layer-4 connections (for example, a TCP packet can be associated with a TCP connection via the source address, source port, destination address, and destination port values included in the TCP packet), it may not be possible to determine which of client devices 110a to 110n a particular connection is associated with. In some examples, CPE 130 or proxy 131 may obtain information, such as a NAT table provided by wireless access point 120, that allows CPE 130 or proxy 131 to determine which of client devices 110a to 110n a TCP connection is associated with. In examples where there are multiple wireless access points, such as wireless access points 120 and 122a to 122n, CPE 130 or proxy 131 may be configured to identify which WLAN and/or which wireless access point a TCP connection is associated with based on network addresses assigned to the wireless access points. In an example where IPv6 is used for Layer-3 communication and/or wireless access point 120 does not perform NAT, CPE 130 or proxy 131 may be configured to associate Layer-4 connections with respective client devices 110*a* to 110*n* based on source or destination address values used for the Layer-4 connections.

CPE 130 and/or proxy 131 are configured to collect Layer-4 statistics, which may be used for diagnosing operation of WLAN 112 (and additional WLANs provided by wireless access points 122*a* to 122*n*, if present). Examples of Layer-4 statistics that may be collected, and their use for diagnosing operation of WLANs connected to CPE 130, is described in more detail later. In general, the term "capturing" may also be applied to collecting such statistics. It is noted that although CPE 130 and/or proxy 131 may collect the Layer-4 statistics, processing of the collected Layer-4 statistics for diagnosis may be performed in full or in part by other elements, such as an element of broadband network 140, for example.

Figure 1B:
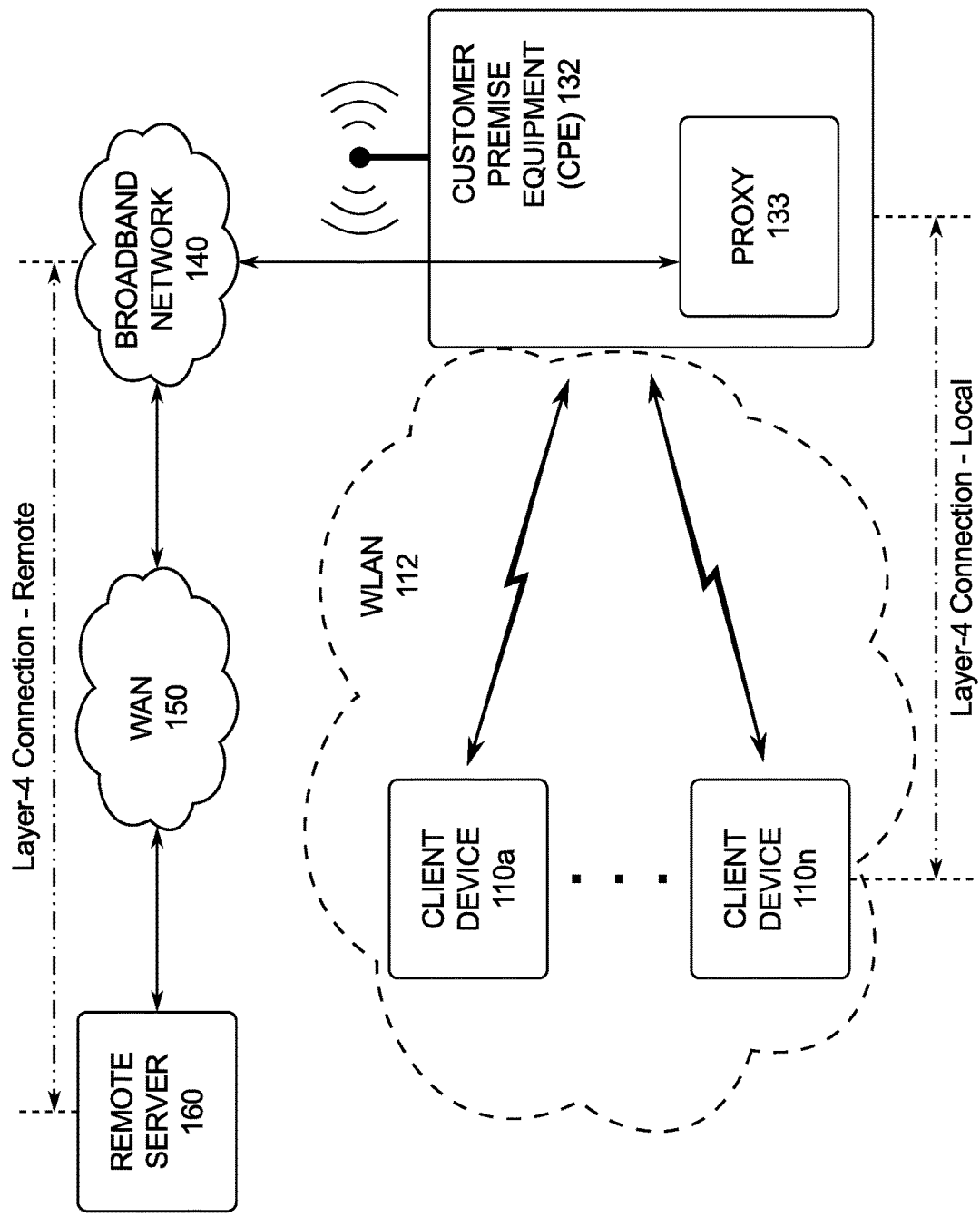
FIG. 1B illustrates an example of a high-level block diagram of an end-to-end network architecture for automatically diagnosing operation of a wireless communication network provided by consumer premise equipment.

FIG. 1B illustrates an example of a high-level block diagram of an end-to-end network architecture for automatically diagnosing operation of a wireless communication network provided by consumer premise equipment. In this example, consumer premise equipment 132 includes wireless data communication capability, and client devices 110*a* to 110*n* are each configured to establish a connection with CPE 132 via WLAN 112. Although not illustrated in FIG. 1B, there may one or more wireless access points connected to CPE 132, much like wireless access points 122*a* to 122*n* illustrated in FIG. 1A. CPE 132 includes proxy 133, which operates in much the same manner as proxy 131 illustrated in FIG. 1A. Much as with CPE 130 and proxy 131 in FIG. 1A, CPE 132 and/or proxy 133 are configured to collect Layer-4 statistics, which may be used for diagnosing operation of WLAN 112 (and additional WLANs, if present). Additionally, in some implementations CPE 132 and/or proxy 133 may further be configured to collect Layer-1 and Layer-2 statistics for wireless communication links, such as 802.11 links within WLAN 112, which may additionally be used for diagnosing operation of WLANs provided by CPE 132.

Figure 1C:
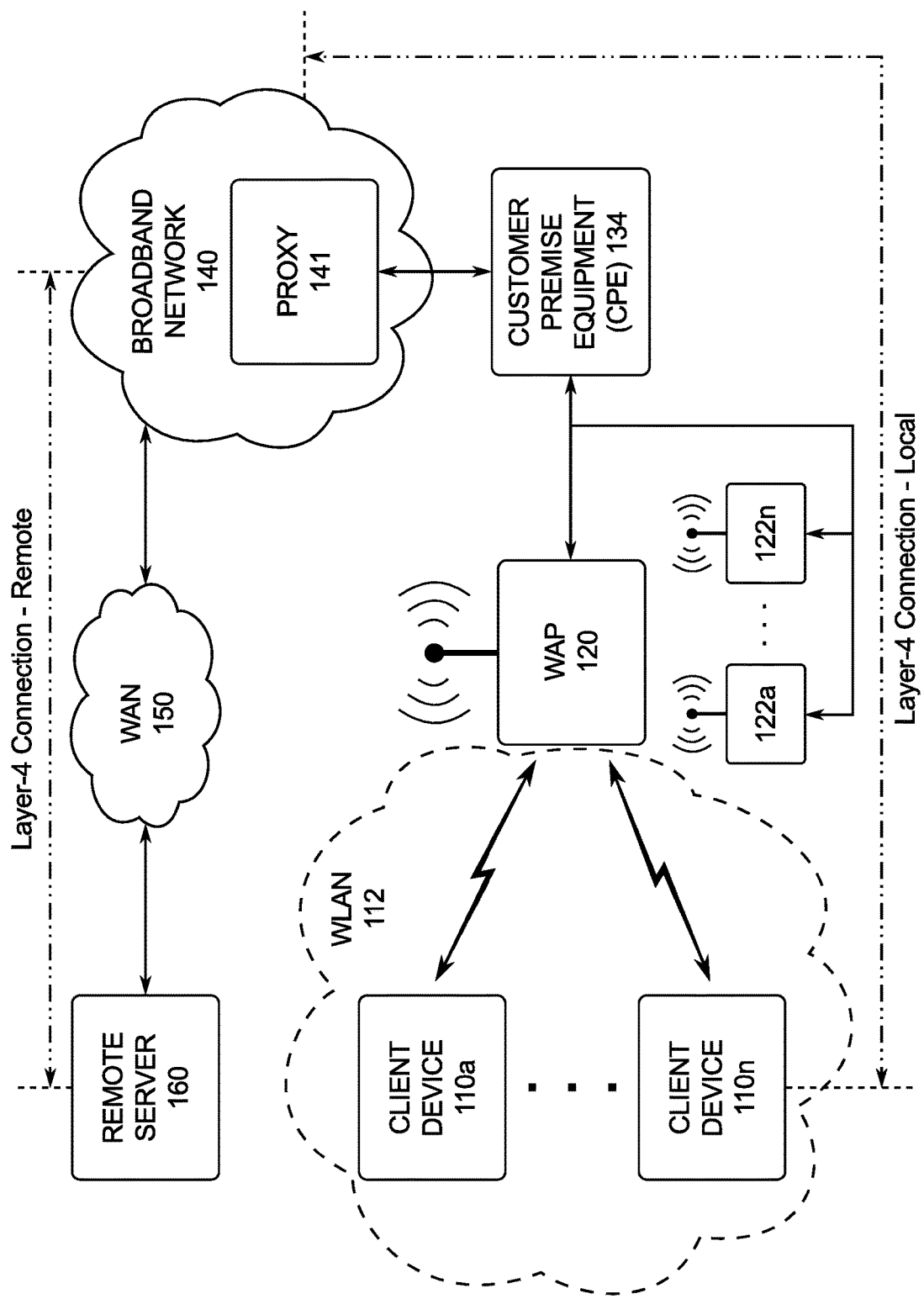
FIG. 1C illustrates an example of a high-level block diagram of an end-to-end network architecture for automatically diagnosing operation of one or more wireless communication networks, such as a wireless network provided by a wireless access point for one or more client devices.

FIG. 1C illustrates an example of a high-level block diagram of an end-to-end network architecture for automatically diagnosing operation of one or more wireless communication networks, such as a wireless network provided by a wireless access point 120 for one or more client devices 110*a* to 110*n*. In this example, a proxy 141 is included in a network node included in broadband network 140. Proxy 141 operates in much the same manner as proxy 131 illustrated in FIG. 1A. Much as with CPE 130 and proxy 131 in FIG. 1A, CPE 134, proxy 141, and/or broadband network 140 are configured to collect Layer-4 statistics, which may be used for diagnosing operation of WLAN 112 (and additional WLANs provided by wireless access points 122*a* to 122*n*, if present). The network architecture illustrated in FIG. 1C may be useful where there is a low RTT between proxy 141 and CPE 134. In some examples, CPE 134 may provide a WLAN, much like CPE 132 illustrated in FIG. 1B. In some examples, CPE 134 may also include a proxy (not illustrated in FIG. 1C) which operates in much the same manner as proxy 131 illustrated in FIG. 1A.

Figure 1D:
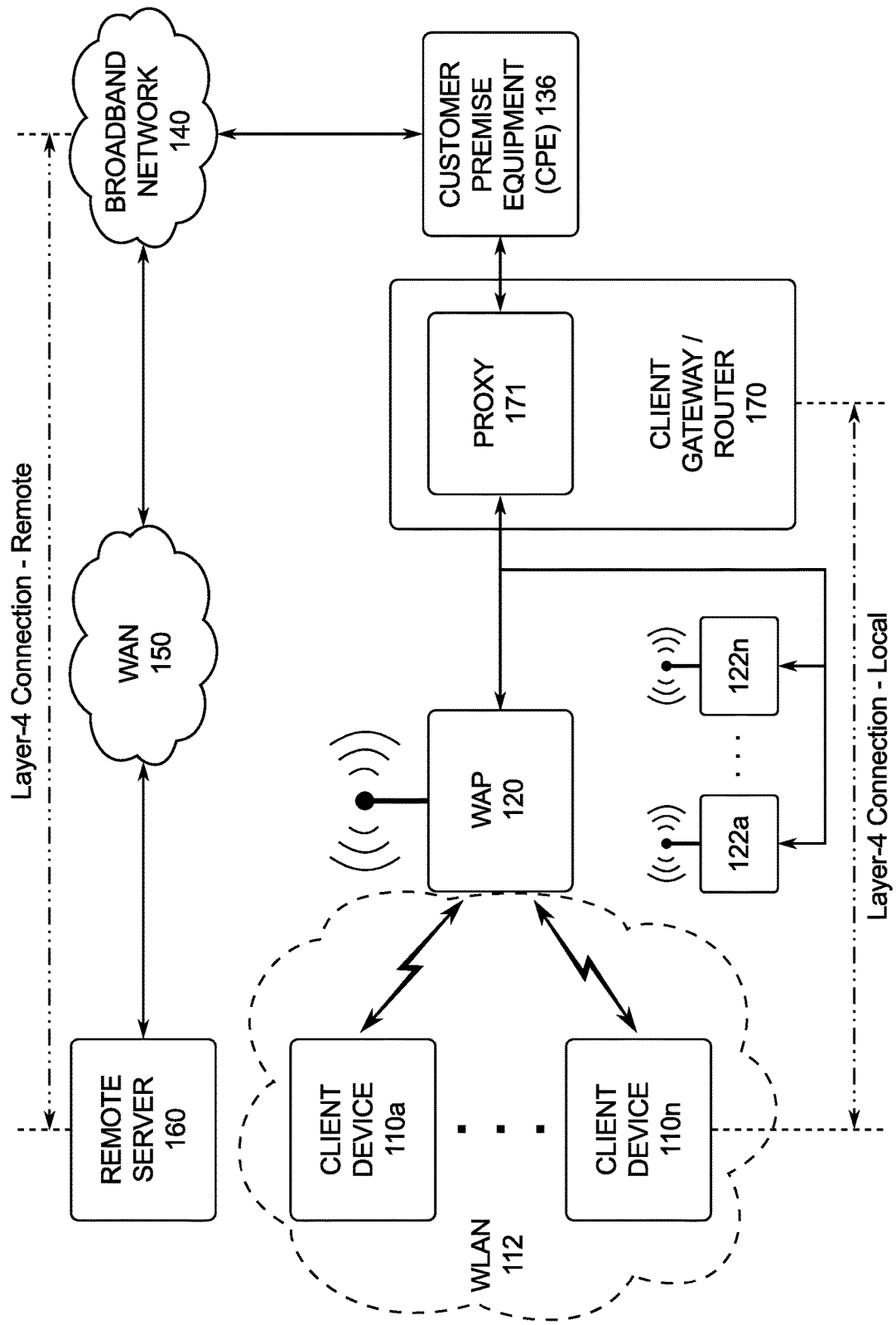
FIG. 1D illustrates an example of a high-level block diagram of an end-to-end network architecture for automatically diagnosing operation of one or more wireless communication networks, such as a wireless network provided by a wireless access point for one or more client devices.

FIG. 1D illustrates an example of a high-level block diagram of an end-to-end network architecture for automatically diagnosing operation of one or more wireless communication networks, such as a wireless network provided by a wireless access point 120 for one or more client devices 110*a* to 110*n*. In this example, a client gateway/router 170 is included between CPE 136 and wireless access point 120. Such a network architecture may be useful if it is not desired to include a proxy in CPE 136, if client/gateway router 170 is introduced into a preexisting network to provide, among other things, automatic diagnosis of one or more wireless communication networks, and/or a local office environment where it is useful to have the additional client gateway/router 170 to support multiple wireless access points 120 and 122*a* to 122*n*. In some examples, wireless access point 120 and client gateway/router 170 may be combined into a single unit, such that proxy 171 is included in wireless access point 120. Proxy 171 operates in much the same manner as proxy 131 illustrated in FIG. 1A. Much as with CPE 130 and proxy 131 in FIG. 1A, client gateway/router 170 and/or proxy 171 are configured to collect Layer-4 statistics, which may be used for diagnosing operation of WLAN 112 (and additional WLANs provided by wireless access points 122*a* to 122*n*, if present).

Figure 1E:
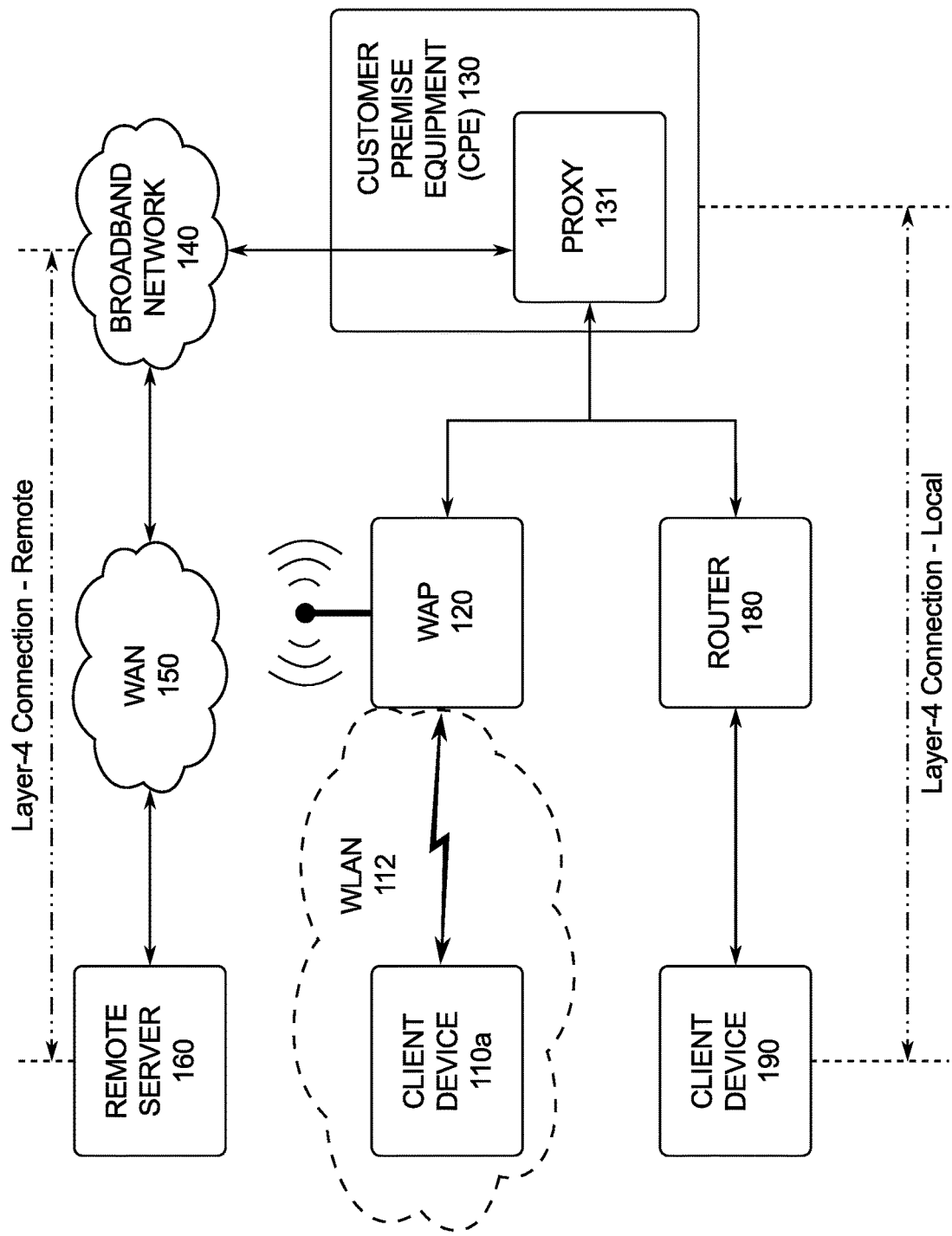
FIG. 1E illustrates an example of a high-level block diagram of an end-to-end network architecture for automatically diagnosing operation of one or more communication networks, such as a wireless network provided by a wireless access point and a wired network provided by a router.

FIG. 1E illustrates an example of a high-level block diagram of an end-to-end network architecture for automatically diagnosing operation of one or more communication networks, such as a wireless network provided by a wireless access point 120 and a wired network provided by a router 180. The example illustrated in FIG. 1E is similar to the example illustrated in FIG. 1A. As in the example illustrated in FIG. 1A, CPE 130 includes a proxy 131, and wireless access point 120 operates WLAN 112, which client device 110*a* is connected to. CPE 130, proxy 131, wireless access point 120, WLAN 112, and client device 110*a* each operate much as discussed with respect to FIG. 1A. Much as discussed with respect to wireless access points 122*a* to 122*n* in FIG. 1A, there may be additional wireless access points (not illustrated in FIG. 1E). The example illustrated in FIG. 1E includes a router 180 that client device 190 is connected to via a wired network connection, such as an ethernet cable. Wired data communication between client device 190 and router 180 may be according to, for example, the IEEE 802.3 standards or PLC (power line communication) standards. Router 180 provides client device 190 with networking connectivity to CPE 130, much as wireless access point 120 in FIG. 1A provides connectivity for client devices 110*a* to 110*n*. Although only one client device 190 is shown connected to router 180 in FIG. 1E, additional client devices may be connected to router 180. Although only one "wired" router 180 is shown in FIG. 1E, additional routers may be included to which client devices are connected via wired network connections. As discussed with respect to FIG. 1A, CPE 130 and/or proxy 131 are configured to collect Layer-4 statistics, which may be used for diagnosing operation of WLAN 112 and connections for client devices connected via router 180, such as client device 190.

Figure 1F:
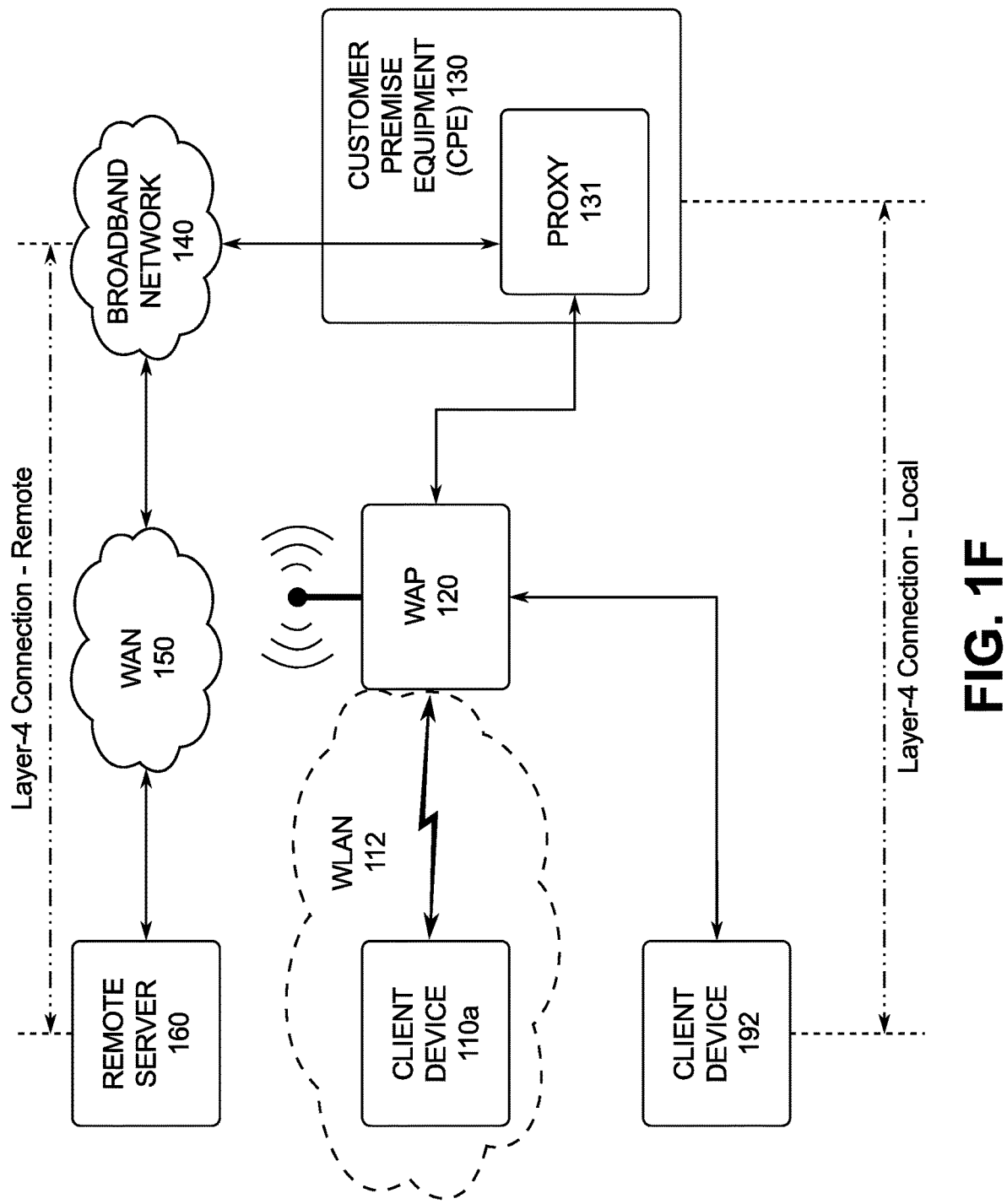
FIG. 1F illustrates an example of a high-level block diagram of an end-to-end network architecture for automatically diagnosing operation of one or more communication networks, whether for connections via wireless networks or wired networks.

FIG. 1F illustrates an example of a high-level block diagram of an end-to-end network architecture for automatically diagnosing operation of one or more communication networks, whether for connections via wireless networks or wired networks. The example illustrated in FIG. 1F is much like the example illustrated in FIG. 1E, except that client device 192 is connected to wireless access point 120 via a wired network connection, much as client device 190 is connected to router 180 in FIG. 1E. Wireless access point 120 may include router capabilities and be considered a wireless router. As discussed with respect to FIG. 1A, CPE 130 and/or proxy 131 are configured to collect Layer-4 statistics, which may be used for diagnosing operation of WLAN 112 and connections for client devices connected to WLAN 120 via a wired network connection, such as client device 192.

Although the examples illustrated in FIGS. 1E and 1F illustrate use of a proxy 131 included in CPE 130, much as illustrated in FIG. 1A, the proxy configurations illustrated in FIGS. 1B, 1C, and 1D may also be used for diagnosing operation of connections for client devices connected via wired networking connections, such as client devices 190 and 192 illustrated in FIGS. 1E and 1F. With a proxy configuration similar to the configuration illustrated in FIG. 1B, a client device may be connected to CPE 132 via a wired network connection; additionally, one or more routers similar to router 180 illustrated in FIG. 1E may be connected to CPE 132, with respective client devices.

Figure 2A:
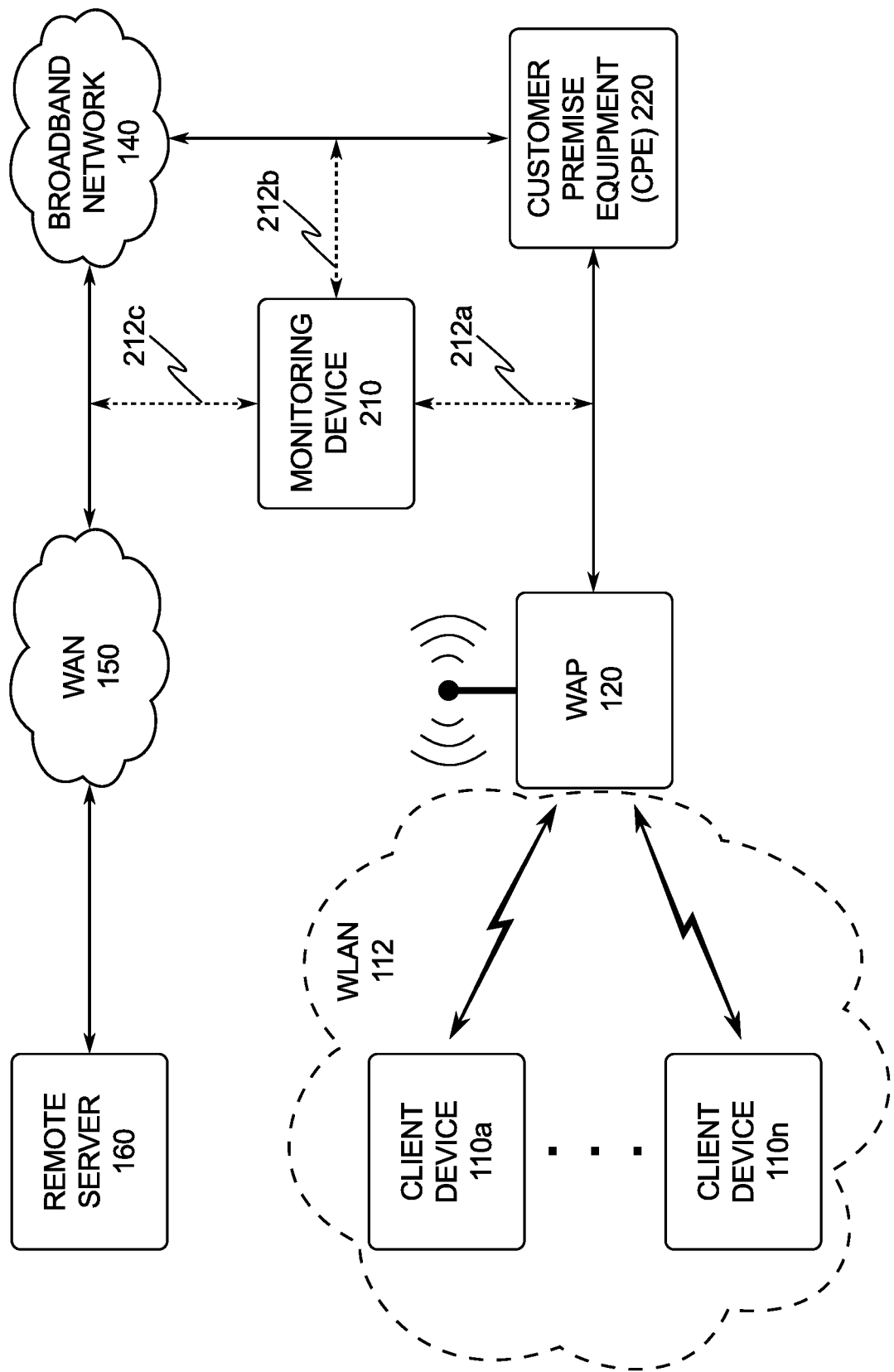
FIG. 2A illustrates an example of a high-level block diagram of an end-to-end network architecture for automatically diagnosing operation of one or more wireless communication networks, using a monitoring device to passively monitor and collect Layer-4 statistics.

FIG. 2A illustrates an example of a high-level block diagram of an end-to-end network architecture for automatically diagnosing operation of one or more wireless communication networks, using a monitoring device 210 to passively monitor and collect Layer-4 statistics. CPE 220 operates in much the same manner as CPE 136 illustrated in FIG. 1D, providing wireless access point 120 (and client devices 110a to 110n connected thereto) with access to remote servers (such as remote server 160) via broadband network 140 and WAN 150. Although not illustrated in FIG. 2A, there may one or more additional wireless access points connected to CPE 220, much like wireless access points 122a to 122n illustrated in FIG. 1A. Monitoring device 210 may be configured to passively monitor Layer-4 communication on a network to collect Layer-4 statistics, which may be used for diagnosing operation of WLAN 112 (and additional WLANs, if present). In one example, monitoring device 210 may be configured to monitor Layer-4 communications between wireless access point 120 and CPE 220 via network connection 212a. In another example, monitoring device 210 may be configured to monitor Layer-4 communications between CPE 220 and broadband network 140 via network connection 212b. In another example, monitoring device 210 may be configured to monitor Layer-4 communications between broadband network 140 and WAN 150 via network connection 212c. In any of these examples, monitoring device 210 may monitor an end-to-end Layer-4 connection between remote server 160 and one of client devices 110a to 110n. In some situations, CPE 220 may include a proxy, much link proxy 131 illustrated in FIG. 1A, and monitoring device 210 may monitor Layer-4 connections between the proxy and client devices 110a to 110n.

Although monitoring device 210 may be able to collect many of the same Layer-4 statistics as a proxy (such as proxy 131) or a CPE (such as CPE 130), monitoring device 210 generally will not have access to internal state information maintained by an endpoint of a Layer-4 connection (for example, an endpoint's TCP congestion window size (CWND) for a TCP connection is not expressly indicated in the data transmitted via the TCP connection). For diagnosing operation of WLAN 112 (and additional WLANs, if present), techniques may be used for estimating values for Layer-4 statistics that cannot be directly collected, or performance indicators may be determined without use of certain Layer-4 statistics that might be collected by a proxy but not by monitoring device 210.

In some examples, monitoring device 210 may include a network adapter that is configured to operate in "monitor" or "promiscuous" mode to collect Level-4 network traffic or Level-4 statistics. Software useful for collecting such information may include "network sniffer" libraries and applications, such as, but not limited to tcpdump, libpcap, and Microsoft Network Monitor.

Figure 2B:
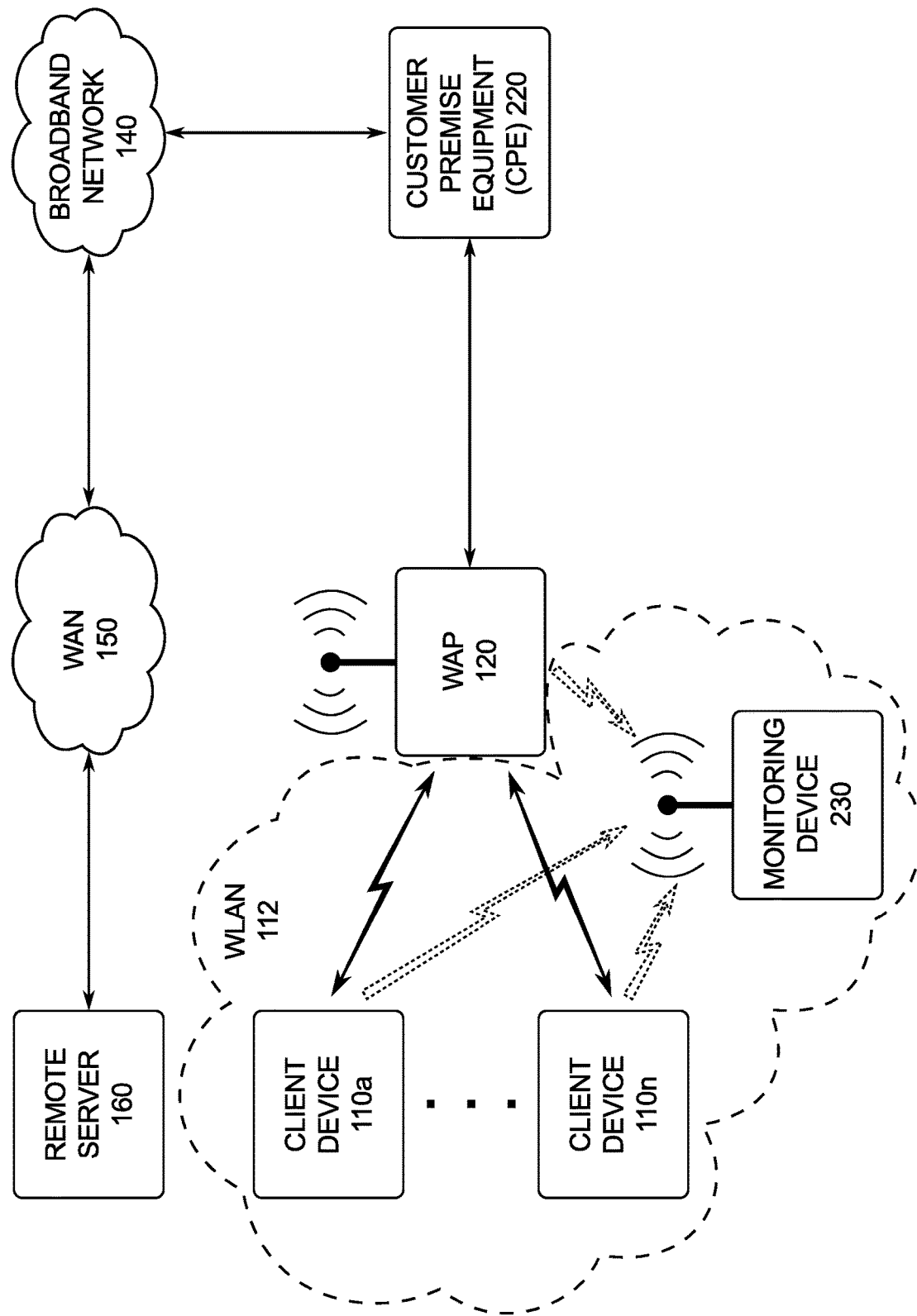
FIG. 2B illustrates an example of a high-level block diagram of an end-to-end network architecture for automatically diagnosing operation of one or more wireless communication networks, using a wireless monitoring device 230 to passively monitor and collect Layer-4 statistics.

FIG. 2B illustrates an example of a high-level block diagram of an end-to-end network architecture for automatically diagnosing operation of one or more wireless communication networks, using a wireless monitoring device 230 to passively monitor and collect Layer-4 statistics. Wireless monitoring device 230 is configured to monitor Layer-4 communication on WLAN 112 to collect Layer-4 statistics, which may be used for diagnosing operation of WLAN 112. In some situations, wireless monitoring device 230 may be configured to passively monitor wireless network traffic on WLAN 112. In some situations, wireless monitoring device 230 may be configured to connect to WLAN 112 by interacting with wireless access point 120; for example, wireless network traffic on WLAN 112 may be encrypted (for example, according to WEP (Wired Equivalent Privacy), WPA (Wi-Fi Protected Access), or WPA2) and wireless monitoring device 230 may authenticate and/or associate with wireless access point 120 in order to successfully decrypt wireless network traffic for monitoring the wireless network traffic. Although not illustrated in FIG. 2A, there may one or more additional wireless access points connected to CPE 220, much like wireless access points 122a to 122n illustrated in FIG. 1A, and monitoring device 230 may be configured to monitor wireless network traffic on a plurality of WLANs, including WLANs operated by the one or more additional wireless access points. In some implementations, monitoring device 230 may also be configured to collect Layer-1 and Layer-2 statistics based on observed wireless network traffic.

Much as with monitoring device 210 illustrated in FIG. 2A, although wireless monitoring device 230 may be able to collect many of the same Layer-4 statistics as a proxy (such as proxy 131) or a CPE (such as CPE 130), wireless monitoring device 230 generally will not have access to internal state information maintained by an endpoint of a Layer-4 connection. For diagnosing operation of WLAN 112 (and additional WLANs, if present), techniques may be used for estimating values for Layer-4 statistics that cannot be directly collected, or performance indicators may be determined without use of certain Layer-4 statistics that might be collected by a proxy but not by wireless monitoring device 230.

In some examples, wireless monitoring device 230 may be implemented using a smartphone or tablet computer device; for example, a smartphone or tablet computer utilizing the Android operating system. In some examples, the smartphone or tablet computer device may be "rooted," "jailbroken," or running a custom firmware in order to provide application software with access to low-level networking interfaces useful for placing a wireless network adapter in "monitor" or "promiscuous" mode and obtaining Level-1, Level-2, and/or Level-4 statistics. In some implementations, a smartphone or tablet computer utilizing the Android operating system may use the Android PCAP Capture utility (available at https://www.kismetwireless.net/android-pcap/), which allows capturing of raw 802.11 frames using a userspace implementation of the Linux kernel RTL8187 driver using the Android USB host API to control an RTL8187 based USB Wi-Fi NIC (network interface card). In some examples, monitoring device 230 may be implemented by executing monitoring software on one of client devices 110a to 110n. In some examples, monitoring device 230 may be implemented using a Linux-based computer, such as, but not limited to, a desktop or notebook computer, configured to use a Wi-Fi adapter (such as a Wi-Fi card or Wi-Fi USB adapter) put into a "sniffer" mode. In some examples, monitoring device 230 may be implemented using a specialized wireless packet sniffer product, such as the OmniPeek™ network analysis software produced by Savvius, or the AirPcap wireless packet capture device produced by Riverbed Technology.

In some examples, CPE 220 may include a proxy that operates much as proxy 131 illustrated in FIG. 1A. In such examples, the proxy may be configured to collect Layer-4 statistics, and monitoring device 230 may be configured to collect Layer-1 and Layer-2 statistics (and may further collect Layer-4 statistics) on WLAN 112 and provide the collected Layer-1, Layer-2, and/or Layer-4 statistics, or information based thereon, to a system for analysis along with the Layer-4 statistics collected by the proxy. Similarly, each of the architectures illustrated in FIGS. 1B-1D may be adapted to collect Layer-1 and Layer-2 statistics via a monitoring device, such as monitoring device 210 or monitoring device 230, to allow use of the collected Layer-1 and Layer-2 statistics in addition to Layer-4 statistics collected via proxies 133, 141, and 171.

FIG. 2C illustrates an example of a high-level block diagram of an end-to-end network architecture for automatically diagnosing operation of one or more wireless communication networks, using a monitoring device 242 included in customer premise equipment 240 to collect Layer-4 statistics. Monitoring device 242 may be provided by, for example, one or more processors included in CPE 240 configured to execute instructions which cause the one or more processors to collect Layer-4 statistics. Monitoring device 242, depending on the implementation, may also be referred to as a "monitoring module," monitoring component," "monitoring software," and/or "monitoring application." In some examples, a proxy, such as proxy 131 illustrated in FIG. 1A, may serve as a monitoring device for some connections; for example, proxy 131 may be configured to selectively spoof Layer-4 connections, and may be configured to collect Layer-4 statistics for unspoofed connections. In general, monitoring device 242 collects similar Layer-4 statistics as those collected by monitoring device 210 via network connection 212a or network connection 212b.

Figure 2D:
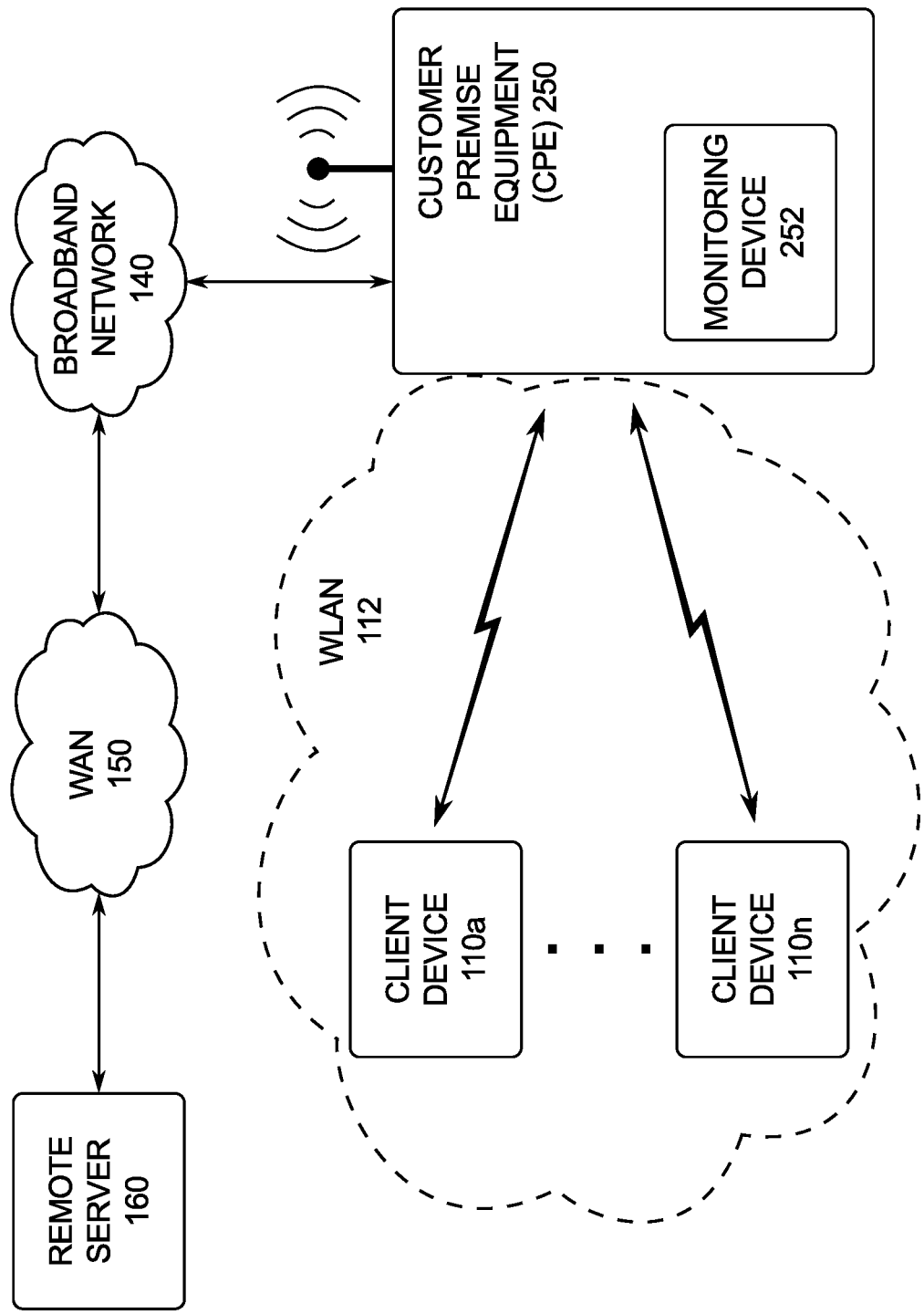
FIG. 2D illustrates an example of a high-level block diagram of an end-to-end network architecture for automatically diagnosing operation of one or more wireless communication networks, using a monitoring device included in customer premise equipment to collect Layer-4 statistics.

FIG. 2D illustrates an example of a high-level block diagram of an end-to-end network architecture for automatically diagnosing operation of one or more wireless communication networks, using a monitoring device 252 included in customer premise equipment 250 to collect Layer-4 statistics. In this example, CPE 250 operates WLAN 112, much as is done by CPE 132 in FIG. 1B. Monitoring device 252 is much the same as monitoring device 242 illustrated in FIG. 2C. In some examples, monitoring device 252 may be configured to collect Level-1 and Level-2 statistics, which may additionally be used for diagnosing operation of WLANs provided by CPE 132.

As is discussed above, CPEs 130, 132, 240, and 250, proxies 131, 133, 141, and 171, client gateway/router 170, and monitoring devices 210, 220, 242, and 252 may collect Level-4 statistics. For example, they may collect TCP statistics.

Figure 2E:
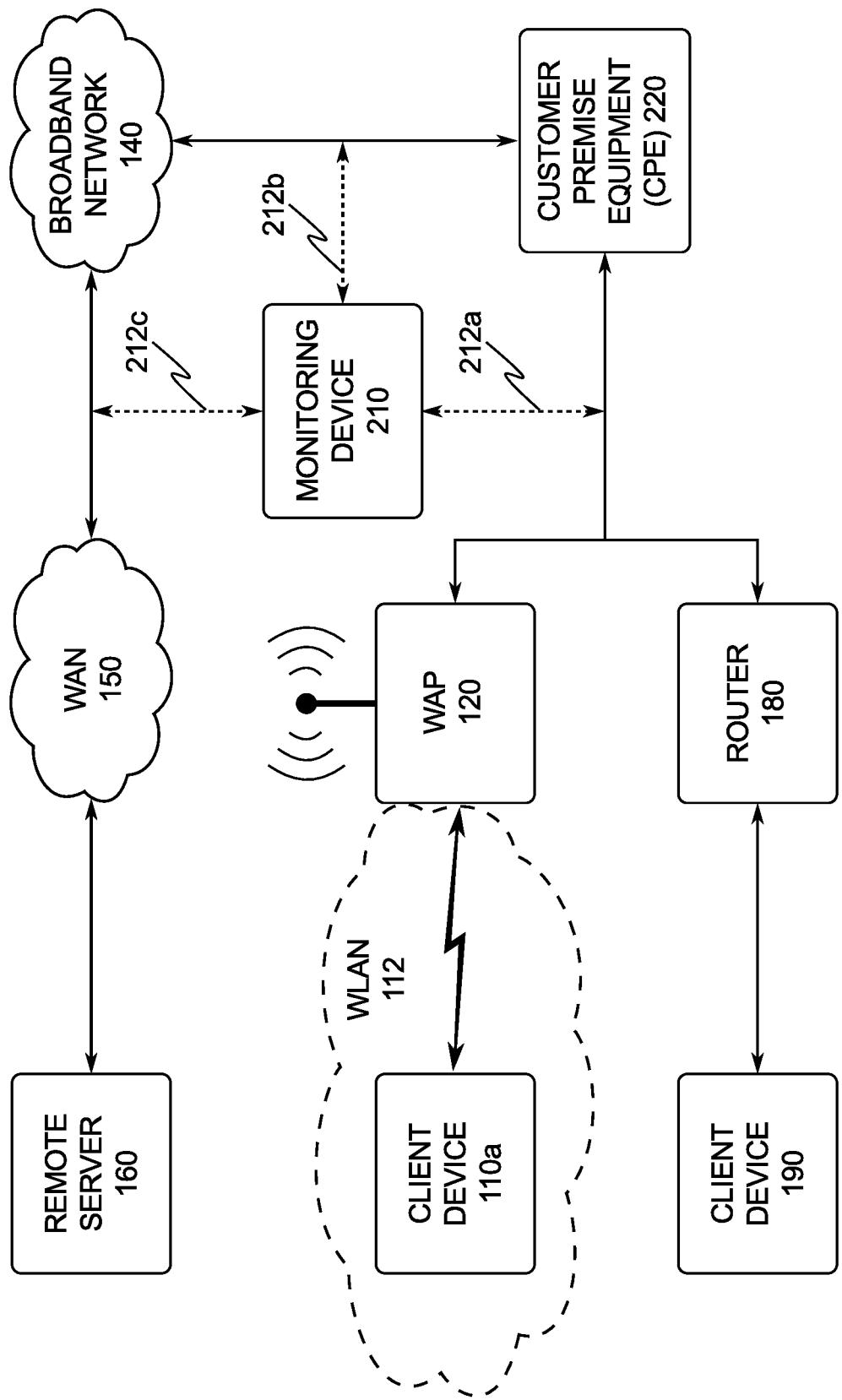
FIG. 2E illustrates an example of a high-level block diagram of an end-to-end network architecture for automatically diagnosing operation of one or more communication networks, such as a wireless network provided by a wireless access point and a wired network provided by a router, using a monitoring device to passively monitor and collect Layer-4 statistics.

FIG. 2E illustrates an example of a high-level block diagram of an end-to-end network architecture for automatically diagnosing operation of one or more communication networks, such as a wireless network provided by a wireless access point 120 and a wired network provided by a router 180, using a monitoring device 210 to passively monitor and collect Layer-4 statistics. The example illustrated in FIG. 2E is similar to the example illustrated in FIG. 2A. As in the example illustrated in FIG. 2A, there is a monitoring device 210, and wireless access point 120 operates WLAN 112, which client device 110a is connected to. Monitoring device 210, wireless access point 120, WLAN 112, and client device 110a each operate much as discussed with respect to FIG. 2A. Much as discussed with respect to wireless access points 122a to 122n in FIG. 2A, there may be additional wireless access points (not illustrated in FIG. 2E). The example illustrated in FIG. 2E includes a router 180 that client device 190 is connected to via a wired network connection, such as an ethernet cable. Router 180 provides client device 190 with networking connectivity to CPE 220, much as wireless access point 120 in FIG. 2A provides connectivity for client devices 110a to 110n. Although only one client device 190 is shown connected to router 180 in FIG. 2E, additional client devices may be connected to router 180. Although only one "wired" router 180 is shown in FIG. 2E, additional routers may be included to which client devices are connected via wired network connections. As discussed with respect to FIG. 2A, monitoring device 210 is configured to collect Layer-4 statistics, which may be used for diagnosing operation of WLAN 112 and connections for client devices connected via router 180, such as client device 190.

Figure 2F:
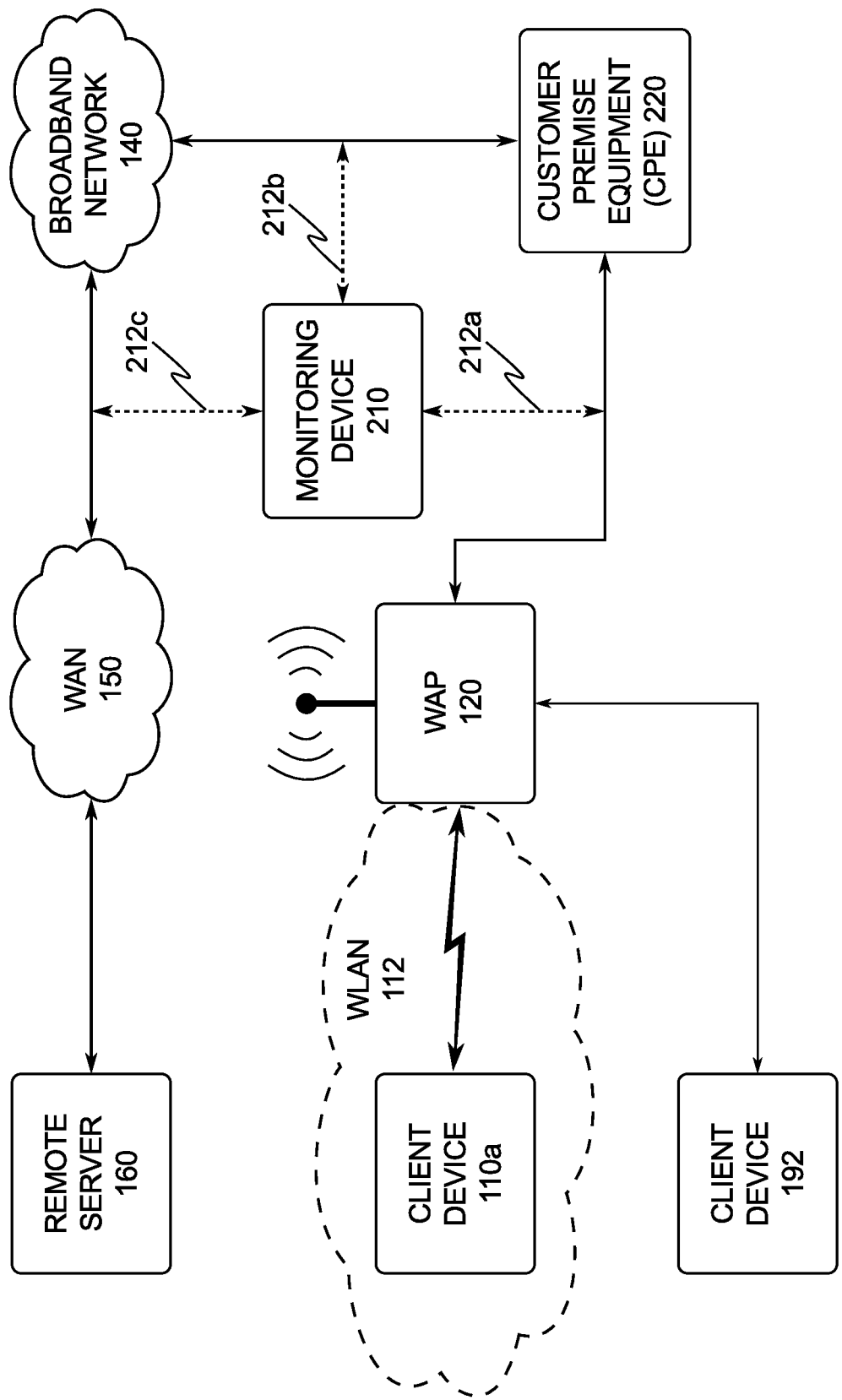
FIG. 2F illustrates an example of a high-level block diagram of an end-to-end network architecture for automatically diagnosing operation of one or more communication networks, whether for connections via wireless networks or wired networks, using a monitoring device to passively monitor and collect Layer-4 statistics.

FIG. 2F illustrates an example of a high-level block diagram of an end-to-end network architecture for automatically diagnosing operation of one or more communication networks, whether for connections via wireless networks or wired networks, using a monitoring device 210 to passively monitor and collect Layer-4 statistics. The example illustrated in FIG. 2F is much like the example illustrated in FIG. 2E, except that client device 192 is connected to wireless access point 120 via a wired network connection, much as client device 190 is connected to router 180 in FIG. 2E. As discussed with respect to FIG. 2A, monitoring device 210 is configured to collect Layer-4 statistics, which may be used for diagnosing operation of WLAN 112 and connections for client devices connected to WLAN 120 via a wired network connection, such as client device 192.

Although the examples illustrated in FIGS. 2E and 2F illustrate use of a monitoring device 210, much as illustrated in FIG. 1A, the monitoring device configurations illustrated in FIGS. 2C and 2D may also be used for diagnosing operation of connections for client devices connected via wired networking connections, such as client devices 190 and 192 illustrated in FIGS. 2E and 2F. With a monitoring device configuration similar to the configuration illustrated in FIG. 2D, a client device may be connected to CPE 250 via a wired network connection; additionally, one or more routers similar to router 180 illustrated in FIG. 2E may be connected to CPE 250, with respective client devices. Monitoring device 230 illustrated in FIG. 2B may be adapted to be connected to a wired network connection provided by router 180 or wireless access point 120 to monitor client devices such as client devices 190 and 192.

Collecting Layer-4 Statistics

For TCP statistics, TCP network connections each having a first endpoint at a client device (such as client devices 110a to 110n), wherein data transmitted for each of the TCP connections traverses a WLAN of interest (such as WLAN 112), are monitored (for example, continuously or at a predetermined period that may be configurable). The second endpoint of the monitored connections may be at a proxy, such as proxies 131, 133, 141, and 171, or another network element, such as remote server 160. A log of the TCP statistics may be generated for each of the monitored TCP connections. The following examples of statistics regarding the internal state of the corresponding TCP connection may be collected:

TIMESTAMP—Time of receiving the ACK (as noted by TCP state machine)

SRC—Source IP and Port

DST—Destination IP and Port

SRTT—Smoothed Round Trip Time Estimate (as computed by TCP state machine for Retransmission Timeout (RTO)). An estimates SRTT or RTT may be calculated CWND—Congestion Window (updated after processing the ACK) (in Segments)

RWND—Advertised Receive Window (in Bytes)

IN_FLIGHT—Number of segments currently waiting to be ACKed

SND_NXT—Send next Byte count

SND_UNA—Send unacknowledged Byte count

LOST, RETRAN, SACK

In some examples, such statistics may be collected in response to an ACK being received from a client device (such as, but not limited to, client device 110a illustrated in FIG. 1A). In some examples, such statistics may be collected in response to an ACK being transmitted to a client device. In some examples, such statistics may be collected for a TCP connection in response to a packet being transmitted for the TCP connection. In some examples, such statistics may be collected in response to a passage of time; for example, a "polling" mechanism may be used to periodically collect such statistics, such as approximately each 10 milliseconds, 20 milliseconds, 50 milliseconds, 100 milliseconds, 200 milliseconds, 600 milliseconds, 1 second, 2 seconds, 5 seconds, 10 seconds, 30 second, 1 minute, 2 minutes, 10 minutes, 15 minutes, 20 minutes, 30 minutes, 40 minutes, 45 minutes, 60 minutes, 90 minutes, and 120 minutes.

The internal state may be obtained from, for example, a proxy (such as proxy 131 in FIG. 1A, proxy 133 in FIG. 1B, proxy 141 in FIG. 1C, and proxy 171 in FIG. 1D) or a system on which the proxy is being executed (such as CPE 130 in FIG. 1A, CPE 132 in FIG. 1B, a network element included in broadband network 140 in FIG. 1C, and client gateway/router 170 in FIG. 1D). On a system executing a Linux-based kernel, such statistics may be, for example, obtained or derived from values included in instances of the tcp_sock data structure (defined in include/linux/tcp.h) created for each TCP connection. For example, these values may be obtained via a loadable Linux kernel module, such as net/ipv4/tcp_probe.ko. On a system executing a FreeBSD-based kernel, such statistics may be, for example, obtained or derived from values included in instances of the tcp_info data structure (defined in sys/netinet/tcp.h) created for each TCP connection. In some implementations, a kernel module may be used to register one or more callback functions that are called on every sent and/or received TCP ACK (or every sent and/or received TCP packet) and which obtain such kernel information for the TCP connection corresponding to the TCP ACK responsible for the callback occurring.

IN_FLIGHT can also be estimated as:

IN_FLIGHT=((SND_NEXT—SND_UNA)IMSS)—SACK where MSS is Maximum Segment Size for the TCP segments. The additional TCP state variables, LOST, RETRAN, SACK, can be used to make inferences about link losses. The Packet Retransmission Ratio (for TCP packets) and the Packet Lost Ratio (ratio of packets actually lost, not counting the spurious retransmissions due to MAC delays and variation in ACK receipts) can also be estimated, however, much of this information is already captured by other statistics.

Although in some examples many or all of the above examples of TCP statistics may be readily available or accessible, such as in the examples illustrated in FIGS. 1A-1D, in other situations only some of the above examples of TCP statistics may be available. For example, monitoring devices 210 and 230, illustrated in FIGS. 2A and 2B, may only have access to data directly transmitted across a network, such as what is visible to a network adapter being used in promiscuous or monitor mode. For example, CWND is internal to a TCP implementation, and is not transmitted across the network. SRTT is another example of a TCP statistic not transmitted across the network. There are various techniques to estimate CWND using passive network monitoring. U.S. Pat. No. 8,724,475, entitled "Method and Apparatus to Estimate the Sender's Congestion Window Throughout the Life of a TCP Flow (Socket Connection)," which is incorporated by reference herein in its entirety, describes such techniques. S. Jaiswal, G. Iannaccone, C. Diot, J. Kurose, D. Towsley, "Inferring TCP connection characteristics through passive measurements," in IEEE INFOCOM 2004, Vol. 3, pp. 1582-1592 (DOI 10.1109/INFCOM.2004.1354571), which is incorporated by reference herein in its entirety, discusses techniques involving tracking network packet exchanges to estimate which "flavor" of TCP (for example, Tahoe, Reno, or NewReno) best matches the exchange by creating "replica" models of the TCP sender's state for each flavor, and determining approximated values for CWND and RTT based on the closest model. U.S. Pat. No. 7,636,321, entitled "Method and System for Measuring Round-Trip Time of Packets in a Communications Network," which is incorporated by reference herein in its entirety, describes additional techniques for estimating RTT or SRTT. Accordingly, estimated values for TCP statistics may be used for diagnosing operation of WLANs.

Determining Connection Metrics Based on Collected Layer-4 Statistics

Each collected Layer-4 statistic may be associated with a respective time period, of a plurality of time periods during which collection of Layer-4 statistics is performed; for example, each Layer-4 statistic may be associated with a time period during the Layer-4 statistic was collected (for example, by using a TIMESTAMP statistic associated with a TCP packet). In some implementations, the time periods are of equal duration, and the duration may be configurable. For example, a 24 hour day may be divided into 24 time periods each one hour in duration, as illustrated for each of Days 1-10 in FIG. 3A. In some implementations, the time periods may each be at least 5 minutes in duration. Other example durations for the time periods include, but are not limited to, 5 seconds, 10 seconds, 30 seconds, 1 minute, 2 minutes, 10 minutes, 15 minutes, 20 minutes, 30 minutes, 40 minutes, 45 minutes, 60 minutes, 90 minutes, and 120 minutes. In some implementations, each of the collected Layer-4 statistics may be recorded (for example, a record may be generated for each sent and/or received TCP ACK). Alternatively, a statistically filtered time series may be employed.

For each time period, Layer-4 connection metrics may be determined based on the Layer-4 statistics associated with the time period. In some situations, a Layer-4 connection metric may be determined based on Layer-4 statistics associated with a plurality of time periods; for example, an Average Window Utilization value (discussed below) may be determined based on all of the Layer-4 statistics collected during a day, such as Day 1 illustrated in FIG. 3A. The Layer-4 connection metrics provide partial information about WLAN link conditions. Network performance indicators may be determined based on the Layer-4 connection metrics to obtain a more comprehensive view of link conditions over time.

Below are some example Layer-4 connection metrics that may be used in connection with the TCP statistics discussed above. Similar Layer-4 connection metrics may be used for other Layer-4 protocols. In the below examples, each time period that Layer-4 statistics or metrics are associated with may be referred to as a Sample_Interval.

1. Window Utilization:

One TCP statistic that reflects link conditions is the CWND. The CWND values, however, depend on the available bandwidth and RTT (available bandwidth≈CWND/RTT at steady state). Given the large variations in RTT, looking at absolute value of the CWND statistics alone does not help. The notion of "utilizing" the CWND statistic, however, provides important information about the "relative" WLAN link quality. Whenever a TCP sender (for example, proxy 131 illustrated in FIG. 1A) has packets to send, it will try to fill up the congestion window. If IN_FLIGHT segments are smaller than the CWND, this implies that the WLAN link has sufficient available bandwidth, more than what is required by the TCP sender. Whenever the IN_FLIGHT segments are close to the CWND, this indicates that either the WLAN link is the bottleneck or the available bandwidth is equal to the desired bandwidth. In the event of a timeout or packet loss, the CWND is reduced according to the implementation of the TCP protocol at the sender. In such cases, the IN_FLIGHT segments can exceed CWND. Apart from CWND, the receive window, RWND, should also be accounted for. Even though the WLAN link may have high bandwidth, the client device may not be able to effectively use the available bandwidth due to memory restrictions or other flow control bases. Hence, the use of the IN_FLIGHT segments and the send window, WND, which is the minimum of the congestion window and the receive window.

Based on the foregoing, one connection metric is defined as Window Utilization (WU). The WU metric is based on three additional connection metrics: Instantaneous Window Utilization (IWU), Window Full (WF) and Window Exceeded (WX). By way of example:

$$IWU=IN\_FLIGHT/min(CWND,RWND/MSS) \quad (1)$$

Whenever RWND=0 (Zero Window), IWU is set to 1 (to avoid a divide-by-zero problem).

$$WF=(\# \text{ sample with IWU "close to 1"})/(\text{Total \# samples}) \quad (2)$$

$$WX=(\# \text{ sample with IWU greater than 1})/(\text{Total \# samples}) \quad (3)$$

Where "close to 1" is defined as Full_IWU_Threshold≤IWU≤Exceeded_IWU_Threshold, where Full_IWU_Threshold and Exceeded_IWU_Threshold are configured threshold values (with default=1), and greater than 1 is defined as IWU>Exceeded_IWU_Threshold. The Window Utilization (WU) is then defined as:

$$WU=WF+WX, \text{ when } WX<WX\_Threshold$$

$$WU=1+WX, \text{ when } WX \geq WX\_Threshold$$

The specific way of combining WF and WX give the following interpretation of the WU metric values:

WU less than 1 indicates that very few samples saw send window full or exceeded, which implies that the WLAN link had sufficiently high bandwidth (compared to the application server, WAN or broadband network bandwidth) as well as the connection had insignificant amount of losses on the WLAN link.

WU close to 1 indicates that most sample saw send window fully utilized, which implies that WLAN link bandwidth is less than or just comparable to the broadband network bandwidth, or flow-control at the client device limited the connection bandwidth WU greater than 1 indicates significant packet losses in the WLAN link (for example, due to high interference or congestion levels)

Where (1) "less than 1" is defined as 0≤WU≤Full_WU_Threshold, where Full_WU_Threshold is a configured threshold value, (2) "close to 1" is defined as Full_WU_Threshold<WU≤Exceeded_WU_Threshold, where Exceeded_WU_Threshold is a configured threshold value (with default=1), and (3) "greater than 1" is defined as WU>Exceeded_WU_Threshold.

Instead of defining a single metric WU, the two different metrics WF and WX (Equations (2) and (3) above) can be retained, where WF captures the WLAN link conditions as compared to the broadband (and WAN) link speeds, and WX captures the WLAN link unreliability, independent of the broadband network conditions. Alternatively, instead of binning IWU samples into WF and WX and combining them into WU, a more generic function can be employed to map IWU samples to the WU metric. The method described above, however, provides a simple but useful way of summarizing the IWU samples. Lastly, although flow-control by the client device is captured, the zero window events are not sufficiently captured by this connection metric.

2. Delta Window Utilization and Average Window Utilization:

The Window Utilization (WU) connection metric described above is calculated using the IWU samples over a Sample_Interval. In some cases, for example, when estimating available bandwidth (discussed below), a similar metric may be useful, measured over smaller timescales, to reflect "instantaneous" conditions. Accordingly, instead of using the larger Sample_Interval, a Delta Window Utilization (DeltaWU), measured over a smaller Delta_Interval can be used. For example, a single 60 minute long Sample_Interval may divided into 120 successive 30 second long Delta_Intervals, although other durations for Sample_Interval and Delta_Interval may be used. In this instance the same equations, thresholds and conditions (described above with respect to the determination of the WU metric) are employed. The TIMESTAMP statistics associated with every ACK may be used to bin them into appropriate Delta_Intervals.

A further metric is the Average Window Utilization (Avg_WU). Combining the DeltaWU determined for multiple Delta_Intervals within a Sample_Interval, as employed below with respect to the defined algorithm for the Avg_WU, provides the Average Window Utilization (Avg_WU) over the Sample_Interval. Thus, both WU and Avg_WU are defined over a Sample_Interval, but they are calculated slightly differently. While WU is purely a sample average, the Avg_WU is a mixture of time and sample average. The DeltaWU and Avg_WU metrics are employed for calculating the available connection bandwidth and link capacity estimates (further defined below).

---

Algorithm 1: Avg_WU—Average Window Utilization

N = ceil(Sample_Interval/Delta_Interval)
// Initialize
DeltaWU_vec = rep(0, N)
Sum_n_wx = 0

```
Algorithm 1: Avg_WU—Average Window Utilization

Sum_n_wf = 0
For n in 1:N
    // For current Delta_Interval
    Obtain TCP connection statistics for every ACK with TIMESTAMP
    in [(n − 1) * Delta_Interval, n * Delta_Interval)]
    From these samples
        Measure DeltaWU            // WU defined over Delta_Interval
    DeltaWU_vec[n] = DeltaWU
    If DeltaWU > Exceeded_WU_Threshold    // Window is exceeded
        Sum_n_wx = Sum_n_wx + 1
    Else If DeltaWU > Full_WU_Threshold   // Window is fully
                                             utilized
        Sum_n_wf = Sum_n_wf + 1
    // End if
// End for loop
// Average Window Utilization estimate for the Sample_Interval
If Sum_n_wx > N * WX_Threshold
    // Window Exceeded for significant fraction of time
    Avg_WU = 1 + (Sum_n_wx/N)
Else
    // Fraction of time window was fully utilized
    Avg_WU = (Sum_n_wf + Sum_n_wx)/N
// End if
```

3. Congestion Window Utilization:

The window utilization connection metrics consider the send window, and thus are governed by the minimum of the congestion-controlled and flow-controlled TCP window. Using the IN_FLIGHT and CWND statistics, however, focus only on the congestion in the link. To capture this separately, a Congestion Window Utilization (CWU) metric can be employed. Instead of IWU, Instantaneous Congestion Window Utilization (ICWU) is defined as IN_FLIGHT-ICWND. Using a similar function as with the WU, CWF and CWX (analogous to WF and WX) are determined, and then combined to determine the CWU metric. Also, analogous thresholds (Full_ICWU_Threshold, Exceeded_I-CWU_Threshold, and CWX_Threshold) are utilized to determine the CWU metric, and Full_ICWU_Threshold and Exceeded_ICWU_Threshold are utilized to interpret its values. As with WU (as described above), the ICWU to CWU equations can be generalized, while still retaining the range of metric values and their interpretation. Similarly, DeltaCWU (over the Delta_Interval) and Avg_CWU (time-averaged DeltaCWU over a Sample_Interval) can be defined and determined as described above with respect to the Window Utilization (WU) metric.

4. Receive Window Utilization:

Additional complementary connection metrics (similar to CWU and WU) can further be employed. CWU focuses on the bottleneck link due to congestion-control, and WU considers both congestion-control and flow-controlled link bottlenecks. To focus only on the scenarios when receive window is the bottleneck (flow-controlled) a Receive Window Utilization (RWU) metric can be employed (similar to CWU and WU). By way of example, starting with an Instantaneous Receive Window Utilization (IRWU) being defined as IN_FLIGHT*MSS/RWND, similar thresholds can be employed for binning instantaneous fraction per ACK to get the summary metric Receive Window Utilization (RWU). Similarly, again, DeltaRWU (over Delta_Interval) and Avg_RWU (time-averaged DeltaRWU over a Sample_Interval) can be defined and determined as described above with respect to the Window Utilization (WU) metric.

Alternative techniques for determining a Window Utilization connection metric and/or a Congestion Window Utilization connection metric may be used in situations when CWND is not available or no attempt has been made to collect or estimate CWND. For example, this may occur where passive monitoring of Layer-4 network traffic is performed, as illustrated in FIGS. 2A-2D. As another example, this may occur for a Layer-4 connection, such as a TCP connection, that is not being spoofed by a Layer-4 proxy. Determinations of Window Utilization and Congestion Window Utilization, as discussed previously, utilize three input parts: IN_FLIGHT packets, CWND, and the receive window RWND; and two output parts: WU (indicating a fraction of time that CWND or RWND was a bottleneck) and CWU (a fraction of time that only CWND was a bottleneck). RWND is transmitted in TCP headers, and IN_FLIGHT packets/bytes may be inferred from sequence and ACK values transmitted in TCP headers. If CWND is not used, IN_FLIGHT/RWND may be used to derive RWU (Receive Window Utilization, which is similar to WU) to identify slow client devices (as if a slow receiver is a bottleneck, IN_FLIGHT is usually close to RWND. This approach is much like determining WU−CWU (i.e., the amount of time the receive window was the bottleneck and that the connection is flow-controlled) in Algorithm 8, below.

It is noted that where values are determined for CWU and WU for Layer-4 connections that include network segments outside of a local network delineated by a CPE (for example, network segments extending to or through broadband network 140, WAN 150, and/or remote server 160), the determined values for CWU and WU may not reflect bottlenecks only because of the local network (such as issues with WLAN 112). For example, congestion or losses experienced between CPE 130 and broadband network 140, between broadband network 140 and WAN 150, and/or between WAN 150 and remote server 160 may be reflected in the determined CWU and WU values, and may be more substantial than local network effects on such values. For estimating whether congestion is occurring on the local network side or on the WAN side of a CPE, we can look at packet inter-arrival times at the CPE. If the packet arrival (from server side) is smooth, the congestion is on the WAN side. If the packet arrival is bursty, then the congestion is on the LAN side. "Smooth" and "bursty" packet arrival conditions may be identified based on thresholds for metrics determined based on packet inter-arrival statistics, such as its variance. A congested link may be viewed as where a queue build-up will occur. Before the queue build-up, the packets are sent as per the congestion window, then wait for the ACK. After the queue build-up (congested link), the packets are sent regularly according to the link speed. Similar techniques have been used to infer bottleneck link speeds based on packet inter-arrival statistics in wired networks.

5. Zero Window Fraction:

While connection metrics like WU and RWU address flow-control by the client device, some extreme zero window cases are not sufficiently addressed. For example, if a client device keeps a zero window for a long duration, the TCP sender will not send any packets and there won't be any ACKs. Sample averages for this scenario may not capture the device bottleneck, especially when the sample average will be skewed when the window opens up. Hence, a time average Zero Window Fraction (ZW) metric can be used for the duration when the connection has a zero window.

By way of example, the beginning of a zero window period is marked by an ACK with RWND=0. The next received ACK (either an explicit window update ACK by the receiver/client device or a response to a TCP sender zero window probe message) indicates the end of the zero window period. The Zero Window Fraction (ZW) metric is defined as the fraction of time when the receive window was zero, as follows:

Zero Window Duration (per zero window event) =

$$-1 * \left( \begin{array}{c} (TIMESTAMP \text{ for } ACK \text{ with } RWND = 0) - \\ (TIMESTAMP \text{for next } ACK \text{ with } RWND \mathrel{!}= 0) \end{array} \right),$$

when there is some ACK with RWND != 0 that follows =

$$\left( \begin{array}{c} (TIMESTAMP \text{ for end of current Sample\_Interval}) - \\ (TIMESTAMP \text{for } ACK \text{ with } RWND = 0) \end{array} \right),$$

when there is no subsequent ACK received in the Sample_Interval

The metric of interest, Zero Window (ZW), is then defined as:
ZW=(sum of Zero Window Durations)/Sample_Interval
A high value of ZW indicates a significant duration during which the client device could not accept any additional data, and a threshold of ZW_Threshold is employed as a threshold indication of significant device bottleneck which should be accounted for in LAN health.

6. Average Smoothed Round Trip Time:

An Average Smoothed Round Trip Time (Avg_SRTT) connection metric can be defined as the average of the SRTT samples for the connection logged within a Sample_Interval. The RTT samples for TCP segments over Wi-Fi links vary a lot—in time as well as from device to device. The shared nature of the wireless channel and its varying channel conditions result in time variations. For average or bad channel conditions, RTT variations from device to device can be significant due to the protocol features supported by the wireless access point and the client devices, and the respective configurations. Some of such features include, for example, antenna performance, MIMO, packet capture capabilities, supported PHY data rates, rate-adaptation algorithms, RTS-CTS, QoS-priority, and Block-ACK. Despite these differences, high average RTT can be generally viewed as an indication of poor link within the WLAN. Based on some protocol parameters and empirical observations, the thresholds Moderate_RTT_Threshold and High_RTT_Threshold are configured to indicate high levels of interference and/or collisions.

Further, the Avg_SRTT metric assumes that high SRTT is due to poor link conditions. However, RTT can be increased due to peculiar settings of the home network configuration, where queuing delays can be introduced due to segmentation offloading, traffic shaping or heavy buffering in the wireless access point. Accordingly, a further metric is defined below—available connection bandwidth, which addresses such situations. But even without estimated available bandwidth, the Avg_SRTT metric works in typical home network scenarios. Additionally, the SRTT variable used by TCP state machine discards RTT samples for retransmitted (by TCP) segments. One can even include such discarded RTT samples (discarded by TCP state machine), to calculate the Avg_SRTT metric. Including such RTT samples, however, can skew the averages, hence the metric needs to be interpreted appropriately.

7. Available Connection Bandwidth:

A direct measure of link or connection quality is the available bandwidth/data rate. Connection "goodput," counted as the bytes transmitted per unit time, reflects only the partial conditions. For example, goodput can be low because the sender (either the application server or the proxy sender at the CPE—the client ST) itself does not have data to transmit all the time. Applications like Youtube and Netflix will have low goodput because of time-spacing while downloading the video segments. To estimate the true WLAN conditions, the available bandwidth should be determined, that is, the maximum data rate the connection can achieve within the WLAN, provided the link and traffic conditions for other connections do not change.

At steady state, the TCP send window (WND) divided by the RTT gives an estimate of this available connection bandwidth (ConnBW). The send window accounts for both the congestion window and the receive window, and thus WND/SRTT reflects the minimum of congestion-controlled and flow-controlled bandwidth. This estimate, however, can be inaccurate in many cases. Firstly, both WND and SRTT can vary a lot, especially in Wi-Fi links in the WLAN. Hence, their mean values should be used at the appropriate timescale, Delta_Interval. Secondly, if the sender does not send a sufficient number of packets, the WND variable may not be updated to reflect true value of the send window that can be reached. Hence, the mean(WND)/mean(RTT) estimate provides a good approximation when the mean is determined over appropriate timescales, and, only in intervals when the send window is sufficiently utilized. Based on a combination of these observations, an algorithm for estimating available connection bandwidth (ConnBW) is defined as follows:

---

Algorithm 2: ConnBW—Available Connection Bandwidth

```
N = ceil(Sample_Interval/Delta_Interval)
HIGH_BW = 1e9     // A very high value for connection bandwidth
// Initialize
ConnBW_vec = rep(0, N)
DeltaWU_vec = rep(0, N)
Sum_n = 0
Sum_ConnBW = 0
For n in 1:N
    // For current Delta_Interval
    Obtain TCP connection statistics for every ACK with TIMESTAMP
    in [(n - 1) * Delta_Interval, n * Delta_Interval)]
    From these samples
        Measure DeltaWU
        // Find goodput using SND_NXT or SND_UNA statistics
        Goodput = Total bytes sent * 8/Delta_Interval
        // Estimate current bandwidth as mean(WND)/mean(RTT)
        ConnBW_cur = mean(min(CWND, RWND/MSS) * 8 *
        MSS)/mean(SRTT)
        // Correct the estimate if lower than observed goodput
        ConnBW_cur = max(ConnBW_cur, Goodput)
        DeltaWU_vec[n] = DeltaWU
        ConnBW_vec[n] = ConnBW_cur
        If DeltaWU > Full_WU_Threshold
            // Window is sufficiently utilized (full or exceeded)
            Sum_ConnBW = Sum_ConnBW + ConnBW_cur
            Sum_n = Sum_n + 1
        // End if
// End for loop
// Average Connection Bandwidth estimate for the Sample_Interval
If Sum_n > 0
    ConnBW = Sum_ConnBW/Sum_n
Else
    ConnBW = HIGH_BW
// End If
```

---

By looking at the appropriate timescale of Delta_Interval, the algorithm obtains meaningful averages. Further, averaging over multiple Delta_Intervals provides a good approximation of the true available bandwidth. The algorithm ignores the mean(WND)/mean(RTT) estimate for intervals when the window is not fully utilized (intervals when DeltaWU<Full_WU_Threshold). Hence, for a Sample_Interval, if Avg_WU is small (only a few DeltaWU≥Full_WU_Threshold), then the ConnBW estimate may not be accurate, and should be used cautiously. Accordingly, the ConnBW metric is more accurate when Avg_WU>Full_AvgWU_Threshold. The accuracy of the connection bandwidth estimate, however, can be improved. By way of example, the samples can be identified and removed when the connection is in the slow-start phase. By way of further example, the congestion-controlled bandwidth and the flow-controlled bandwidth can be separately estimated. Congestion-controlled bandwidth can be obtained by ignoring RWND in the above algorithm and using the CWU instead of the WU metric. Similarly, flow-controlled bandwidth can be determined by ignoring CWND and focusing on the RWND and RWU statistics. Aside from these methods for improving the accuracy of the connection bandwidth estimate, the version as described above provides a sufficiently accurate approximation.

Determining Network Link Conditions for Period Covered by the Tcp Statistics

In cases where connections can be mapped to the different respective client devices, metrics for (the 'logical') link to that device can be obtained. For example, when a NAT function is disabled at wireless access point 120, or when a NAT table from wireless access point 120 is made available to CPE 130, certain connection metrics for the links to the respective client devices can be obtained (as described below). In such example embodiments, the notion of a link to a respective client device refers to the logical link to the respective client device, including a wireless network link. If NAT table information is not available, the connections are combined to obtain metrics for the "aggregate WLAN link" to the respective client device(s) on the WLAN of interest.

1. Average Link Utilization:

Similar to the window utilization connection metrics (WU and Avg_WU) described above for each connection, a link utilization metric (Avg_LU) can be determined as an indicator of whether the overall link was underutilized, fully utilized or experienced significant losses. The link utilization metric is determined by combining the DeltaWU metrics for each of the connections. For a given Delta_Interval, if the window is exceeded for any of the connections (DeltaWU>Exceeded_WU_Threshold), the link can be considered as being "lossy." If the link is not lossy, but the window is full for any of the (DeltaWU>Full_WU_Threshold), the link can be considered as being "Full." Then the average link utilization for the sample interval is defined to reflect the time averages for the link to be full or lossy. The details of the algorithm for the Avg_LU are provided, as follows:

---
Algorithm 3: Avg_LU—Average Link Utilization
---

N = ceil(Sample_Interval/Delta_Interval)
// Initialize
DeltaLX_vec = rep(0, N)
DeltaLF_vec = rep(0, N)
Sum_n_lx = 0
Sum_n_lf = 0
For n in 1:N
    // For current Delta_Interval
    For each connection to the client device of interest
      Obtain TCP connection statistics for every ACK with
      TIMESTAMP in [(n − 1) * Delta_Interval, n * Delta_Interval)]
      From these samples
        Measure DeltaWU    // Per connection ---
Algorithm 3: Avg_LU—Average Link Utilization
---

If DeltaWU > Exceeded_WU_Threshold
        // Window is exceeded
        DeltaLX_vec[n] = DeltaLX_vec[n] + 1
      Else If DeltaWU > Full_WU_Threshold
        // Window is sufficiently fully utilized
        DeltaLF_vec[n] = DeltaLF_vec[n] + 1
      // End if
    // End for each connection
    If DeltaLX_vec[n] > 0
      // At least one connection had window exceeded
      Sum_n_lx = Sum_n_lx + 1
    Else If DeltaLF_vec[n] > 0
      // At least one connection had window fully utilized
      Sum_n_lf = Sum_n_lf + 1
    // End If
// End for each Delta_Interval
// Average Link Utilization estimate for the Sample_Interval
If Sum_n_lx > N * LX_Fraction_Threshold
    // Lossy Link for significant fraction of time
    Avg_LU = 1 + (Sum_n_lx/N)
Else
    // Fraction of time link was fully utilized
    Avg_LU = (Sum_n_lf + Sum_n_lx)/N
// End If

---

A relatively low value of Avg_LU (e.g., Avg_LU≤Full_AvgLU_Threshold) indicates that (for most of the time) the link did not experience significant losses, and none of the connections experienced bottleneck conditions (congestion or flow-control). A relatively high value of Avg_LU (e.g., Avg_LU>Exceeded_AvgLU_Threshold), indicates that, for at least a significant fraction of time (LX_Fraction_Threshold), the link had at least one connection experiencing high losses. Otherwise, an Avg_LU that is between Full_AvgLU_Threshold and Exceeded_AvgLU_Threshold indicates that the link was fully utilized.

2. Link Capacity:

Link capacity is the data rate supported by the (logical) link under the given channel conditions. One method for estimating the link capacity metric (LinkCapacity) comprises adding the goodput for each active connection. A better estimate of the link capacity can be determined based on available connection bandwidth estimates. More specifically, the link capacity can be determined by summing the connection bandwidth for each active connection, provided the connections are utilizing the available bandwidth (otherwise, the sum will be an overestimate). For example, two connections, if not transmitting simultaneously, will each see the available bandwidth close to the link capacity, where summing them will give an estimate double the actual capacity. To avoid this problem, the window utilization metrics can be used to identify which connections are actively using the link and which are using them only partially. The connection bandwidths can then be appropriately summed to determine a good estimate of the link capacity. Also, if Avg_LU≤Full_AvgLU_Threshold, then the link was not fully utilized, and the LinkCapacity estimate may not be accurate. Otherwise, the algorithm provides a good estimate. A detailed algorithm for determining the LinkCapacity metric is provided, as follows:

---
Algorithm 4: LinkCapacity—Link Capacity Estimate
---

N = ceil(Sample_Interval/Delta_Interval)
HIGH_CAPACITY = 1e9    // A very high value for link capacity
// Initialize ---
Algorithm 4: LinkCapacity—Link Capacity Estimate
---

```
DeltaLU_vec = rep(0, N)
LinkCapacity_vec = rep(0, N)
Sum_n = 0
Sum_LinkCapacity = 0
For n in 1:N
    // For current Delta_Interval
    For each connection to the client device of interest
        Obtain TCP connection statistics for every ACK with
        TIMESTAMP in [(n – 1) * Delta_Interval, n * Delta_Interval)]
        From these samples
            Measure DeltaWU       //Per connection
            // Find goodput using SND.NXT or SND.UNA variables
            Goodput = Total Bytes sent * 8/Delta_Interval
            // Estimate current bandwidth as mean(WND)/mean(RTT)
            ConnBW_cur = mean(min(CWND – 2, RWND/MSS) * 8 *
MSS)/mean(SRTT)
            // Correct the estimate if lower than observed goodput
            ConnBW_cur = max(ConnBW_cur, Goodput)
            If DeltaWU > FullWU_Threshold
                // Window is sufficiently fully utilized
                // Hence the connection bandwidth estimate can be used
                LinkCapacity_vec[n] = LinkCapacity_vec[n] + ConnBW_cur
                DeltaLU_vec[n] = 1 // Flag to indicate that the link is utilized
            Else
                LinkCapacity_vec[n] = LinkCapacity_vec[n] + Goodput
            // End if
    // End for each connection
    If DeltaLU_vec[n] > 0
        // Link was utilized in this Delta_Interval
        Sum_LinkCapacity = Sum_LinkCapacity + LinkCapacity_vec[n]
        Sum_n = Sum_n + 1
    // End if
// End for each Delta_Interval
// Average Link Capacity estimate for the Sample_Interval
If Sum_n > 0
    LinkCapacity = Sum_LinkCapacity/Sum_n
Else
    LinkCapacity = HIGH_CAPACITY
// End If
```

Diagnosing LAN Conditions Per Connection

The connection metrics described above reveal partial information about the underlying WLAN link conditions. Based on these connection metrics, the appropriate combination of them provides network information or decision regions for diagnosing the health of the WLAN link conditions for a connection of interest. According to further example embodiments, the decision regions can be defined and determined by utilizing a subset of the TCP metrics defined above. For example, below is described an algorithm useful for evaluating conditions for a connection on a WLAN.

Queuing of packets in the path between a CPE (such as CPE 130 illustrated in FIG. 1A) and a client device can impact RTT values, which (in some cases) can lead to incorrect inferences from the Avg_SRTT metric. Hence, instead of Avg_SRTT values, the ConnBW (Available Connection Bandwidth) metric can be used. Moreover, the ConnBW metric provides a direct and meaningful interpretation of its value. Also, the Avg_WU metric can be used instead of the WU metric. This algorithm utilizes the thresholds Exceeded_AvgWU_Threshold, Full_AvgWU_Threshold, Moderate_AvgWU_Threshold, and Low_BW_Threshold.

The below algorithm classifies WLAN link conditions for a TCP connection as GOOD, MARGINALLY GOOD, MARGINALLY POOR, or POOR. For a GOOD condition, there is a low Avg_WU, indicating there is sufficient available bandwidth (for example, greater than a broadband bandwidth provided by a CPE). For a MARGINALLY GOOD condition, Avg_WU is around a value of 1 and there is at least moderate ConnBW (send window fully utilized but connection has high bandwidth), or there is at least moderate ConnBW but also significant losses. High losses on a MARGINALLY GOOD connection will typically result in high jitter. For a MARGINALLY POOR condition, the send window is fully utilized but connection bandwidth is moderately low. However, lots of MARGINALLY POOR connections can be considered as an indication of self-congestion and not necessarily poor WLAN conditions overall. For a POOR condition, there is a significant fraction of zero wait time (indicating a client device receive buffer bottleneck), the send window is fully utilized but connection bandwidth is low, or the WLAN connection has high losses as well as moderate to low bandwidth.

---
Algorithm 5: Using Available Bandwidth, Avg_WU and ZW per Connection
---

```
If ZW > ZW_Threshold
    POOR Client Device
    // Client device receive buffer bottleneck
Else If Avg_WU < Full_AvgWU_Threshold
    GOOD WLAN Connection
    // Send window is underutilized
Else If Avg_WU < Exceeded_AvgWU_Threshold
    If ConnBW > Moderate_BW_Threshold
        MARGINALLY GOOD WLAN Connection
        // Send window fully utilized but connection has high bandwidth
    Else If ConnBW > Low_BW_Threshold
        MARGINALLY POOR WLAN Connection
        // Window fully utilized but connection bandwidth moderate low
    Else
        POOR WLAN Connection
        // Send window fully utilized and connection bandwidth is low
    // End If
Else If ConnBW > Moderate_BW_Threshold
    MARGINALLY GOOD WLAN Connection
    // WLAN connection has high bandwidth even though significant
    losses
Else
    POOR WLAN Connection
    // WLAN connection has high losses as well as moderate to low
    bandwidth
// End If
```

Aggregating Conditions for Multiple Connections to Diagnose WLAN Health:

The connection level diagnosis is appropriately combined to determine a summary WLAN diagnosis. This can be performed even in the presence of multiple devices, by summarizing the fraction of connections classified into different categories.

---
Algorithm 6: Aggregating Multiple Connections for WLAN Health Diagnostics
---

```
ActiveConnCount = 0
GoodCxns, PoorCxns, MarginalGoodCxns, MarginalPoorCxns= 0
For Every Connection within the Sample Interval
    Obtain LAN verdict per connection: GOOD, POOR, MARGINALLY
    GOOD, or MARGINALLY POOR (see, for example, Algorithm 5)
    If ((Num_ACKs > Min_ACKs or ZW > ZW_Threshold) &
        Connection_Duration > Min_Duration)
        ActiveConnCount = ActiveConnCount + 1
        Increase count for GoodCxns, PoorCxns, MarginalGoodCxns, and
        MarginalPoorCxns according to condition determined for
        connection
    // End If
//End For Loop
Calculate number of connections with GOOD, POOR, MARGINALLY
GOOD, MARGINALLY POOR or MARGINAL labels
If Total_Connections ≥ Hi_Conn_Threshold
```

| Algorithm 6: Aggregating Multiple Connections for WLAN Health Diagnostics |
|---|
| //report health only if there are reasonable number of connections<br>   HI = Fraction of GOOD + MARGINALLY GOOD connections<br>Else<br>   //otherwise, report good health<br>   HI = 1<br>// End If |

Connections with a small number of ACKs may not yield enough samples to arrive at meaningful connection metrics. Also, connections that are active with short durations within a Sample_Interval (time between first and last ACK sample within a Sample_Interval), may yield biased results, and may not reflect the average link conditions. Hence, such connections are filtered out, and not considered "active" within the Sample_Interval. For the remaining significant connections, the algorithm keeps a count and fraction of the number of connections that fall into different categories. Even a small fraction of connections classified as POOR can indicate the presence of at least one client device with poor WLAN link conditions. Further, MARGINALLY POOR connections can indicate the presence of congestion in the WLAN. The congestion, however, may be a result of a lot of connections within the client network, and not necessarily congestion from neighboring home area networks. Hence, if a large number of connections are labelled MARGINALLY POOR (but negligible fractions of connections in the POOR category), it may be diagnosed as a case of self-congestion.

Diagnosing Health of Individual Client Devices:

When mapping connections to specific client devices is possible, the link capacity to the client device or other connection metrics can be estimated. This is possible, for example, when, in a situation that a NAT is used, a NAT/ARP table is made available to a CPE or proxy, or if IPv6 is being used (and no NAT is being performed). Similar to the available bandwidth estimate (ConnBW metric) and window utilization (WU metric) (Algorithm 5, above), the link capacity estimate (LinkCapacity metric), combined with Average Link Utilization (Avg_LU) metric, can be used to diagnose the WLAN health. Instead of classifying the link conditions per connection, the overall quality of the WLAN link to a particular client device is being classified. If client devices cannot be individually identified because of a NAT, the algorithm will aggregate all the connections and report a single Link Capacity metric for the overall WLAN link (total capacity of the path to all the client devices in the WLAN). The interpretation of the different decision regions—GOOD, POOR, MARGINALLY GOOD, and MARGINALLY POOR, is similar as in Algorithm 5.

| Algorithm 7: Average Link Utilization and Link Capacity |
|---|
| For Every Client Device  // Identified using destination IP<br>   Calculate Connection Metrics for every connection to the device<br>   Calculate Link Metrics - Avg_LU and LinkCapacity<br>   If ZW > ZW_Threshold for any one connection<br>     POOR Client Device<br>     // Client device zero window bottleneck<br>   Else If Avg_LU < Full_AvgLU_Threshold<br>     GOOD WLAN Link<br>     // Link is underutilized<br>   Else If Avg_LU < Exceeded_AvgLU_Threshold<br>     If LinkCapacity > Moderate_BW_Threshold<br>       MARGINALLY GOOD WLAN Link<br>       // Link is fully utilized but link capacity is high<br>     Else If LinkCapacity > Low_BW_Threshold<br>       MARGINALLY POOR WLAN Link<br>       // Link is fully utilized, but capacity is moderately low<br>     Else<br>       POOR WLAN Link<br>       // Link is fully utilized and link capacity is low<br>     // End If<br>   Else If LinkCapacity > Moderate_BW_Threshold<br>     MARGINALLY GOOD WLAN Link<br>     // Link has high capacity even though significant losses<br>   Else<br>     POOR WLAN Link<br>     // Link has high losses as well as moderate to low bandwidth<br>   // End If<br>// End for every client device |

Determining Network Performance Indicators Based on Layer-4 Metrics

Figure 3A:
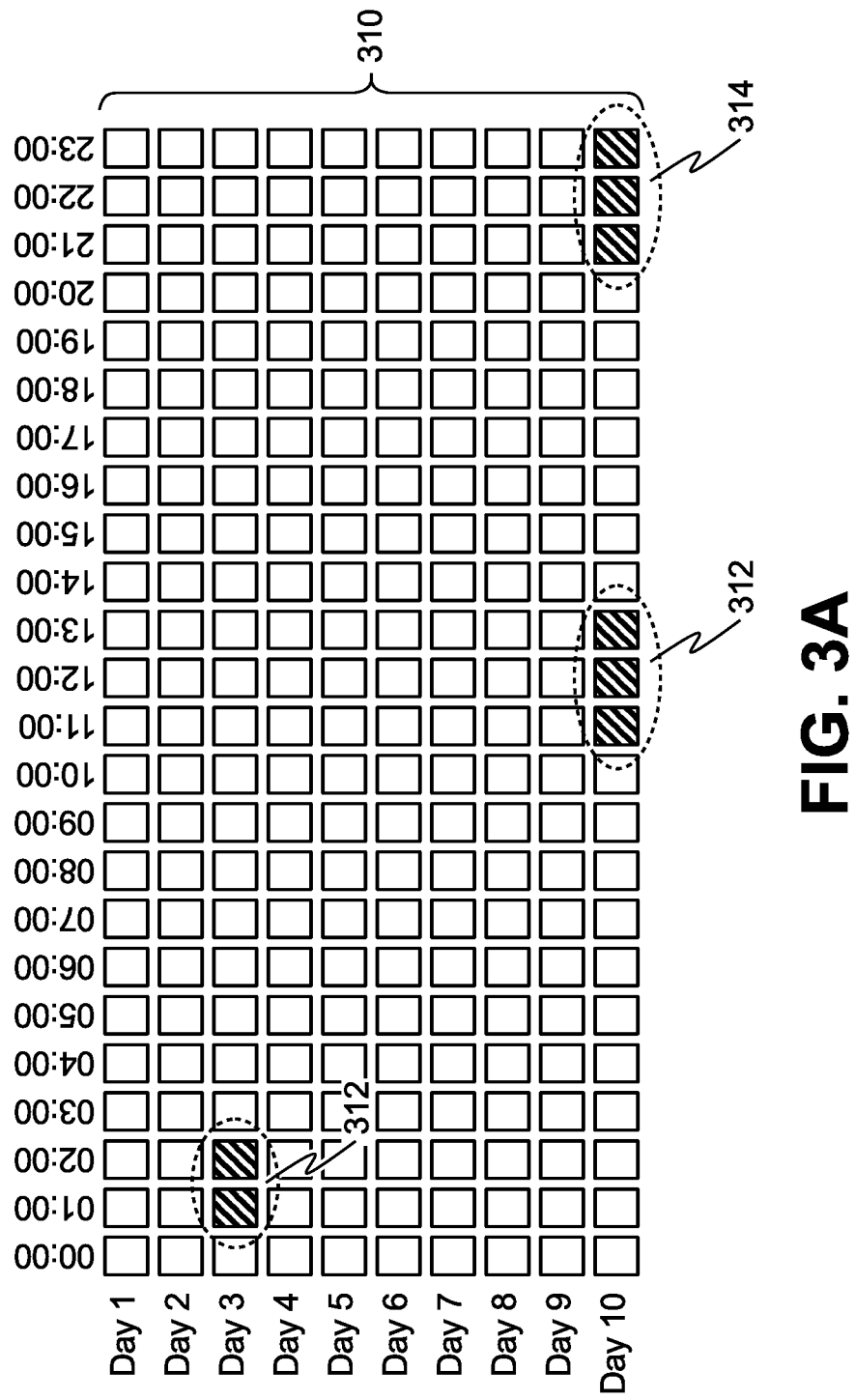
FIG. 3A illustrates a plurality of time periods spanning a plurality of days over which Layer-4 statistics have been collected.

FIG. 3A illustrates a plurality of time periods 310 spanning a plurality of days over which Layer-4 statistics have been collected, and which are associated with the collected Layer-4 statistics. In the example illustrated in FIG. 3A, Layer-4 statistics have been collected over ten days (Day 1 through Day 10), with each day divided into 24 one hour long time periods, for a total of 240 time periods 310 illustrated in FIG. 3A, and the collected Layer-4 statistics are associated with respective time periods 310. However, during 8 of those time periods 310, Layer-4 statistics have not been captured. During the five time periods 312 on Days 3 and 10, Layer-4 statistics were not captured, although Layer-4 statistics were captured during preceding or succeeding time periods 310. In some situations, this may be a result of, for example, a capturing device not being active or powered on during these time periods 312. Time periods 314, on the other hand, have either not occurred of elapsed yet; for example, the current time may be 20:55 on Day 10. Accordingly, FIG. 3A illustrates a total of 232 time periods (which are unshaded in FIG. 3A) during which Layer-4 statistics were being captured.

Figure 3B:
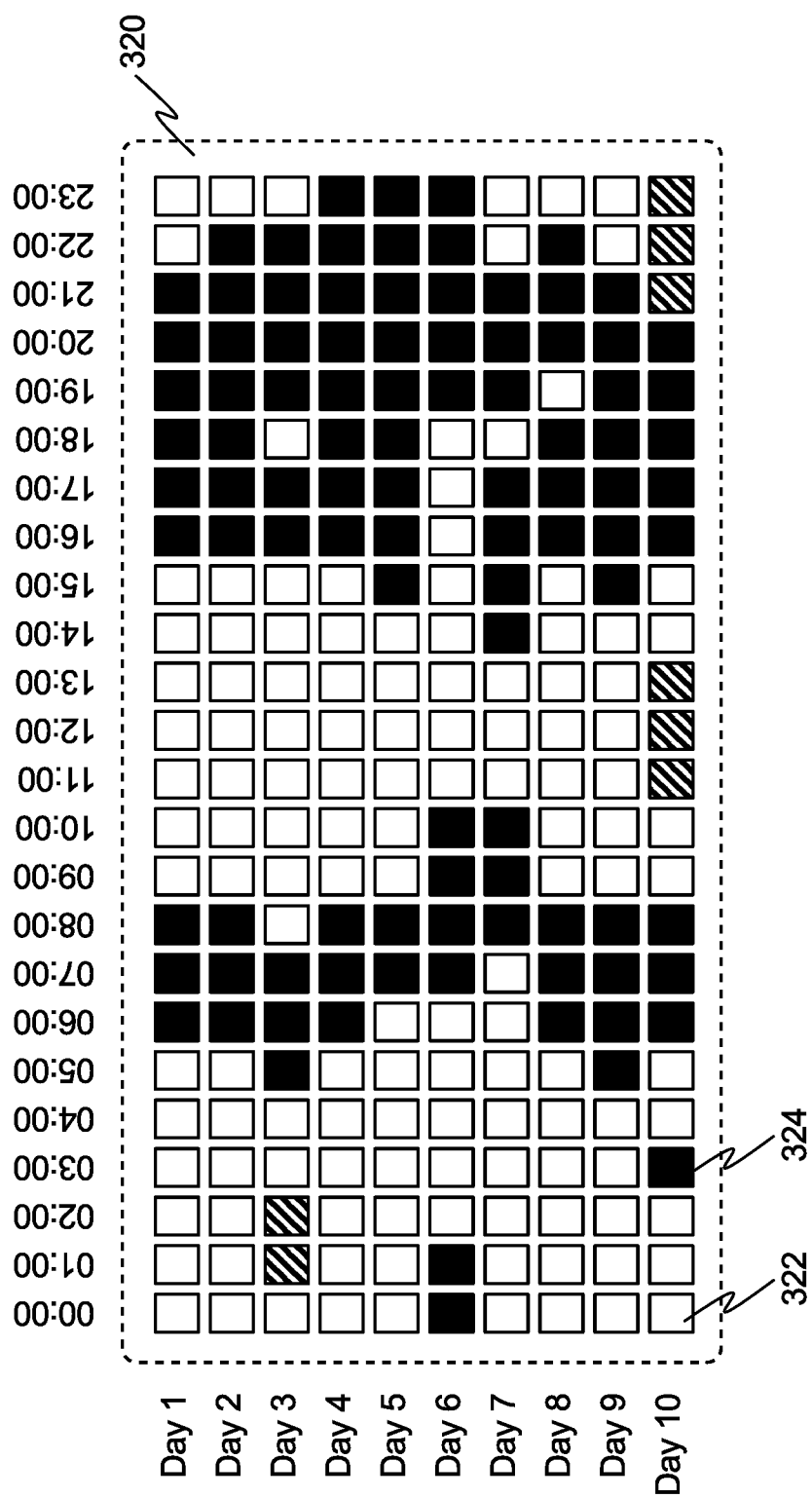
FIG. 3B illustrates an example of determining network performance indicators based on Layer-4 statistics collected for the plurality of time periods illustrated in FIG. 3A.

FIG. 3B illustrates an example of determining network performance indicators based on Layer-4 statistics associated with (or, in many instances, collected during) the plurality of time periods 310 illustrated in FIG. 3A. In the example illustrated in FIG. 3B, a plurality of network performance indicators is determined based on a group 320 of the time periods 310, where the group 320 includes all of the time periods 310 for which Layer-4 statistics have been collected (the 232 time periods discussed with respect to FIG. 3A). For example, values for the following network performance indicators may be determined for group 320:

CountSlowDev=The number of time periods with a slow device (for example, TCP traffic is flow-controlled by the client device, such as by being bottlenecked by the receive window)

CountBadPeriod=The number of time periods with at least one device with bad WLAN conditions (which may be identified by, for example, TCP statistics for RTT, CWND, or retransmissions)

CountBadSlowDev=The number of time periods with a slow device as well as bad link conditions.

Additionally, other values may be determined for group 320, such as:

CountTotal=The number of time periods for which Layer-4 statistics were collected. In the example illustrated in FIG. 3B, CountTotal=232.

Count=The number of usable time periods (which a significant amount of traffic, in other words, the observed amount of network traffic was active). Whether a time period is considered to be active may be based on, for example, a threshold number of samples being collected in the time period, or a total number of bytes sent and/or received. In the example illustrated in FIG. 3B, solid shaded time periods, such as time period 324, are such time periods, whereas unshaded time periods, such as time period 322, did not have enough traffic to be considered active. Thus, in the example illustrated in FIG. 3B, Count=100.

NumDays=The number of days for which Layer-4 statistics-based information is available. In the example illustrated in FIG. 3B, NumDays=10.

Algorithm 8, below, illustrates an example of how values may be determined for CountTotal and Count, and the network performance indicators CountSlowDev, CountBadPeriod, and CountBadSlowDev. Each of these network performance indicators is determined based on Layer-4 statistics associated with (or, in many instances, collected during) a plurality of time periods (and Layer-4 connection metrics derived therefrom), with the plurality of time periods including a first time period and a second time period that neither overlaps nor is consecutive with the first time period. In some instances, the first time period is during a first day, and the second time period is during a second day different from the first day. In the below algorithm, ActiveConnCount is the number of Layer-4 connections that were active (for example, for which a TCP ACK occurred or a threshold number of TCP ACKs occurred) within a time period.

---

Algorithm 8: Network Performance Indicators Based on Level-4 Statistics

```
For Each Time Period in a Group (such as group 320, group 330, or group 350)
    CountTotal = CountTotal + 1   // number of time periods available
    For each Stack // iterate over various groups (e.g., TCP over
    IPv4, TCP/IPv6, etc.)
        If (Samples >= threshSample || ActiveConnCount >=
        threshConnCount)
            Count = Count + 1
            // Count = Number of periods with significant traffic
            Break loop
        // End If
    For each Stack
        If (WU > threshWUFull && (WU - CWU) > threshWUDiff)
            CountSlowDev = CountSlowDev + 1
            // CountSlowDev = Number of periods with slow device
            Break loop
        // End If
    For each Stack
        If (!(WU > threshWUFull && (WU - CWU) > threshWUDiff)
            && (HI <= threshBadHI ||
            (PoorCxns + MarginalPoorCxns) >= threshPoorCxns))
            CountBadPeriod = CountBadPeriod + 1
            // CountBadPeriod = Number of periods with at least one
            bad device
            Break loop
        // End If
    For each Stack
        If ((WU > threshWUFull && (WU - CWU) > threshWUDiff)
            && (HI <= threshBadHI ||
            (PoorCxns + MarginalPoorCxns) >= threshPoorCxns))
            CountBadSlowDev = CountBadSlowDev + 1
            // CountBadSlowDev = Number of bad periods with
            slow device
            Break loop
        // End If
// End for each time period in a group
```

---

As mentioned previously, in some examples certain TCP statistics, such as CWND, may not be available if passive monitoring, such as via monitoring device 210 or wireless monitoring device 230, is used to collect Layer-4 statistics. Although such statistics may be estimated, which may allow Algorithm 8 to be used in connection with collection via passive monitoring, alternatively, different techniques may be used for determining the network performance indicators CountSlowDev, CountBadPeriod, and CountBadSlowDev. Two such techniques are illustrated by Algorithms 9 and 10, below.

---

Algorithm 9: Determining Network Performance Indicators - Alternate #1

```
For Each Time Period in a Group
    CountTotal = CountTotal + 1 // number of time periods available
    For each Stack // iterate over various groups (e.g., TCP over
    IPv4, TCP/IPv6, etc.)
        If (Samples >= threshSample || ActiveConnCount >=
        threshConnCount)
            Count = Count + 1
            Break loop
        // End If
    For each Stack
        If (RWU > threshWUFull) // only uses IN_FLIGHT and receive
        window
            CountSlowDev = CountSlowDev + 1
            Break loop
        // End If
    For each Stack
        If (!(RWU > threshRWUFull) &&
            (HI <= threshBadHI ||
            (PoorCxns + MarginalPoorCxns) >= threshPoorCxns))
            CountBadPeriod = CountBadPeriod + 1
            Break loop
        // End If
    For each Stack
        If ((RWU > threshRWUFull) &&
            (HI <= threshBadHI ||
            (PoorCxns + MarginalPoorCxns) >= threshPoorCxns))
            CountBadSlowDev = CountBadSlowDev + 1
            Break loop
        // End If
// End for each time period in a group
```

---

Algorithm 10: Determining Network Performance Indicators - Alternate #2

```
For Each Time Period in a Group
    CountTotal = CountTotal + 1 // number of time periods available
    For each Stack // iterate over various groups (e.g., TCP over IPv4,
    TCP/IPv6, etc.)
        If (Samples >= threshSample || ActiveConnCount >=
        threshConnCount)
            Count = Count + 1
            Break loop
        // End If
    For each Stack
        If (RWU > threshRWUFull) // only uses IN_FLIGHT and receive
        window
            CountSlowDev = CountSlowDev + 1
            Break loop
        // End If
    For each Stack
        If ((RWU <= threshRWUFull) &&
            (AvgRTT > threshRTT || AvgPRR > threshPRR))
            CountBadPeriod = CountBadPeriod + 1
            Break loop
        // End If
    For each Stack
        If ((RWU > threshRWUFull) &&
            (AvgRTT > threshRTT || AvgPRR > threshPRR))
            CountBadSlowDev = CountBadSlowDev + 1
            Break loop
```

Algorithm 10: Determining Network Performance
Indicators - Alternate #2

```
    // End If
// End for each time period in a group
```

In the above algorithm, PRR (from which AvgPRR may be derived) is the Packet Retransmission Ratio, which may serve as a useful indication of congestion. For detecting the performance bottlenecks in the WLAN, PRR can be determined for TCP packets sent from the CPE to client device. PRR can be obtained by simply monitoring the TCP sequence numbers and counting the ratio of duplicates (retransmitted) packets to all the packets. Since the packets are being monitored at or close to the LAN, any retransmitted packet are indicative of/because of local packet losses. Hence, PRR indirectly captures packet loss. Alternatively, PLR (packet loss ratio) may be similarly used. For PLR, more information from TCP headers, for example sequence numbers in Duplicate ACKs & SACK, if being used, can be utilized to distinguish, to the extent possible, between packets actually lost & spuriously retransmitted packets. For example, even if only the first packet is lost, the entire send window worth of packets may be retransmitted.

Using the above values CountTotal, Count, NumDays, CountSlowDev, CountBadPeriod, and CountBadSlowDev, a summary value, SummaryOverall, can be determined as follows:

Algorithm 11: Determining Summary from Network
Performance Indicators

```
If ((CountBadPeriod > threshold_BadPeriodCount) &&
   (CountBadPeriod/Count > threshold_BadPeriodFraction))
        // Significant percentage of bad WLAN time periods
        SummaryOverall = 1
Else If ((CountBadSlowDev > threshold_BadDevSlowCount) &&
   (CountBadSlowDev/Count > threshold_BadSlowDevFraction))
        // At least one slow device is present
        SummaryOverall = 2
Else If ((CountBadPeriod > threshold_BadPeriodCount) &&
   (CountBadPeriod/Count > threshold_BadPeriodFractionLow))
        // Non-negligible percentage of bad WLAN time periods
        SummaryOverall = 3
Else
        // No significant fraction of bad WLAN time periods
        SummaryOverall = 0
// End If
```

Figure 3C:
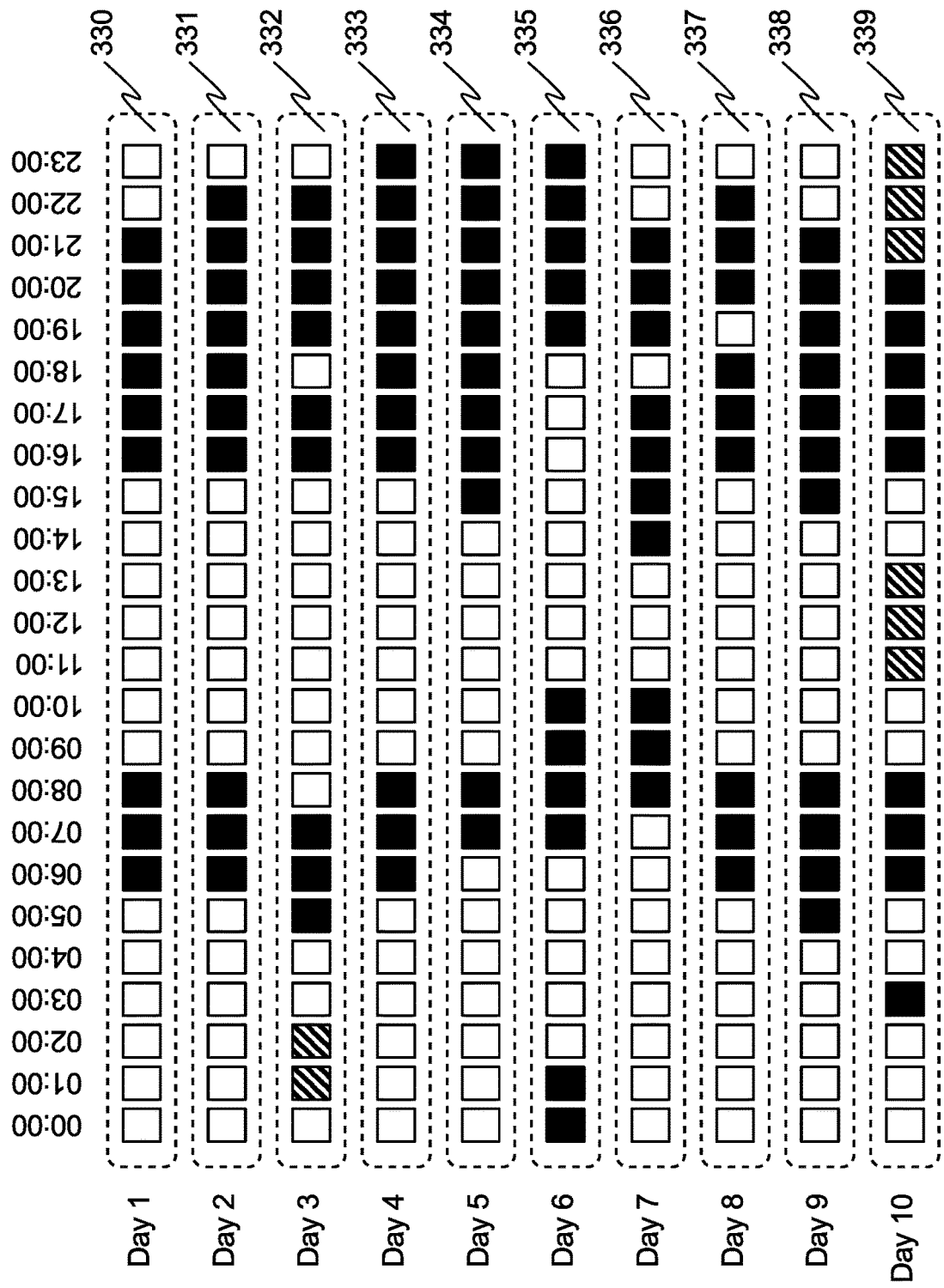
FIG. 3C illustrates an example of determining network performance indicators based on Layer-4 statistics collected for the plurality of time periods illustrated in FIG. 3A, wherein the time periods are grouped according to the day on which they occurred. Such grouping of time periods may also be performed in connection with Layer-1 and/or Layer-2 statistics.

FIG. 3C illustrates an example of determining network performance indicators based on Layer-4 statistics associated with (or, in many instances, collected during) the plurality of time periods 310 illustrated in FIG. 3A, wherein the time periods are grouped according to the day on which they occurred. Such grouping of time periods may also be performed in connection with Layer-1 and/or Layer-2 statistics. The time at which days are considered to begin may be based on, for example, a time zone associated with a physical location of a CPE, or may be at an arbitrary time (for example, beginning with initiating the collection of Layer-4 statistics). For example, the time periods 310 included in group 330 are each from Day 1, the time periods 310 included in group 331 are each from Day 2, and so on. Arrays of counters, CountTotal_byDate[ ], Count_byDate[ ], CountSlowDev_byDate[ ], CountBadPeriod_byDate[ ], and CountBadSlowDev_byDate[ ], are used to store values for each of groups 330-339. These values are calculated in much the same manner that CountTotal, Count, CountSlowDev, CountBadPeriod, and CountBadSlowDev are calculated for group 320 illustrated in FIG. 3B. In the example illustrated in FIG. 3C, CountTotal_byDate[ ]={24 (for group 330), 24, 22, 24, 24, 24, 24, 24, 24, 18 (for group 339)} and Count_byDate[ ]={9 (for group 330), 10, 9, 11, 11, 11, 10, 9, 11, 9 (for group 339)}. Additionally, values for an array of summary values, Summary_byDate[ ], are determined for each of groups 330-339, much in the same manner that the summary value SummaryOverall is determined for group 320 illustrated in FIG. 3B.

Figure 3D:
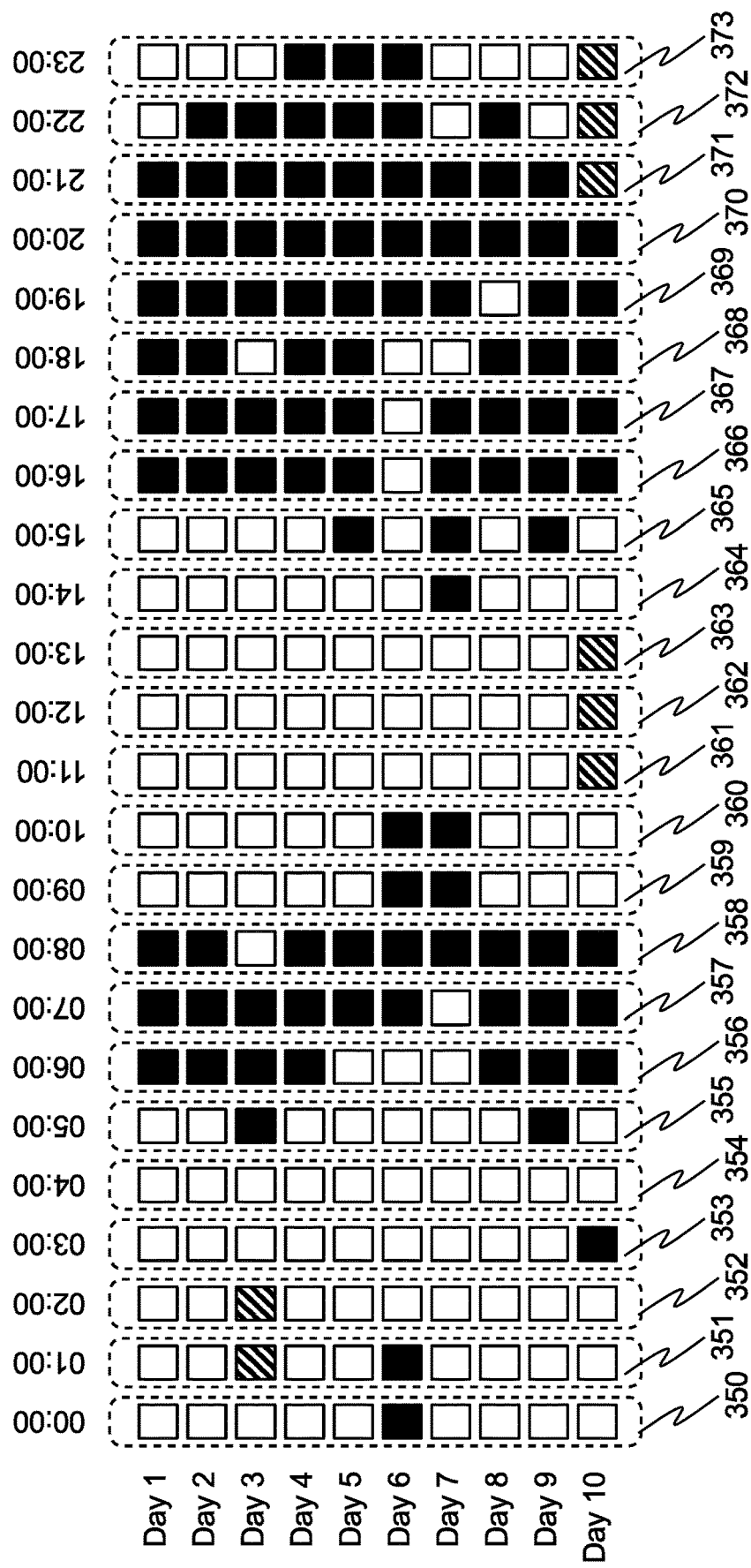
FIG. 3D illustrates an example of determining network performance indicators based on Layer-4 statistics collected for the plurality of time periods illustrated in FIG. 3A, wherein the time periods are grouped according to the time periods having each covered a particular time of day across multiple days. Such grouping of time periods may also be performed in connection with Layer-1 and/or Layer-2 statistics.

FIG. 3D illustrates an example of determining network performance indicators based on Layer-4 statistics associated with (or, in many instances, collected during) the plurality of time periods 310 illustrated in FIG. 3A, wherein the time periods are grouped according to the time periods having each covered a particular time of day across multiple days. Such grouping of time periods may also be performed in connection with Layer-1 and/or Layer-2 statistics. For example, the time periods 310 included in group 350 each cover the time of day 00:30 on Days 1-10 (additionally, the time periods in group 350 each cover the time period 00:00-00:59 on Days 1-10), the time periods 310 included in group 351 each cover the time of day 01:30 on Days 1-10, and so on. Arrays of counters, CountTotal_byPeriod[ ], Count_byPeriod[ ], CountSlowDev_byPeriod[ ], CountBadPeriod_byPeriod[ ], and CountBadSlowDev_byPeriod[ ], are used to store values for each of groups 350-373. These values are calculated in much the same manner that CountTotal, Count, CountSlowDev, CountBadPeriod, and CountBadSlowDev are calculated for group 320 illustrated in FIG. 3B. In the example illustrated in FIG. 3D, CountTotal_byPeriod[ ]={10 (for group 350), 9, 9, 10, 10, 10, 10, 10, 10, 10, 10, 9, 9, 9, 10, 10, 10, 10, 10, 10, 10, 9, 9, 9 (for group 373)} and Count_byPeriod[ ]={1 (for group 330), 1, 0, 1, 0, 2, 7, 9, 9, 2, 2, 0, 0, 0, 1, 3, 9, 9, 7, 9, 10, 9, 6, 3 (for group 373)}. Additionally, values for an array of summary values, Summary_byPeriod[ ], are determined for each of groups 350-373, much in the same manner that the summary value SummaryOverall is determined for group 320 illustrated in FIG. 3B.

Figure 4A:
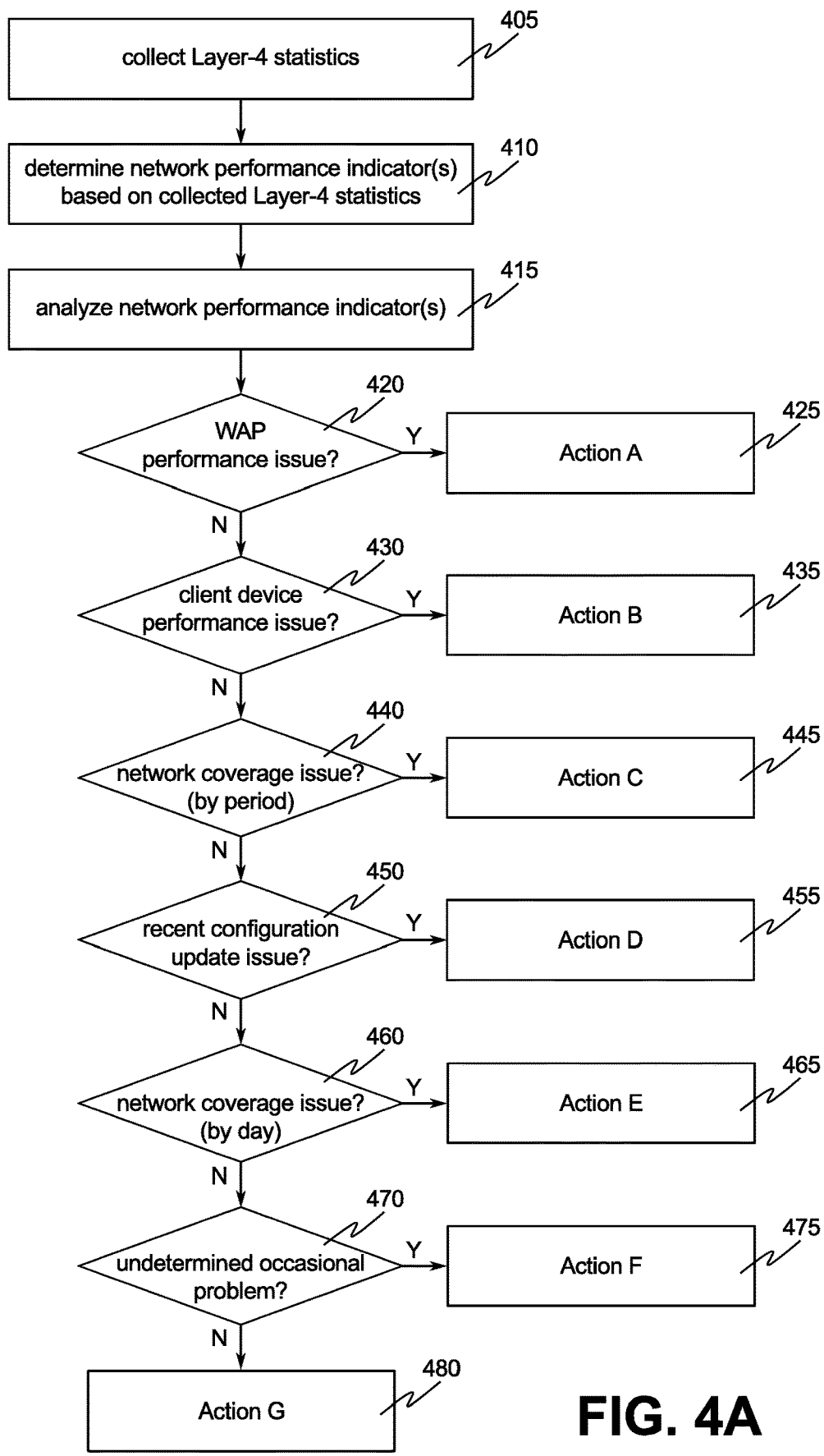
FIGS. 4A and 4B illustrate methods for automatically diagnosing and improving operation of a wireless communication network based on Layer-4 statistics.

FIG. 4A illustrates methods for automatically diagnosing and improving operation of a wireless communication network based on Layer-4 statistics. At 405, Layer-4 statistics are collected during a plurality of time periods, much as discussed above with respect to FIG. 3A. Collection of the Layer-4 statistics may be performed by, for example, CPEs 130, 132, 240, and 250, proxies 131, 133, 141, and 171, client gateway/router 170, and monitoring devices 210, 230, 242, and 252. The Layer-4 statistics may be collected by multiple devices; for example, CPE 220 and monitoring device 230 may each be configured to collect Layer-4 statistics. The Layer-4 statistics may be stored by a device (or devices) which collects the statistics, or another computing device (or devices); for example, the collected Layer-4 statistics may be transferred from a device (or devices) which collects and/or stores the Layer-4 statistics via broadband network 140 to a network node operated by a communication service provider that is configured to receive and/or store the Layer-4 statistics. Processing of the Layer-4 statistics, such as to determine Layer-4 connection metrics as discussed above, may be performed by a device (or devices) which collects or stores the Layer-4 statistics, or another computing device (or devices); for example, the collected Layer-4 statistics may be transferred from a device which collects or stores the Layer-4 statistics via broadband network 140 to a network node operated by a communication service provider that is configured to process the Layer-4 statistics. In some implementations, Layer-4 connection metrics may be determined by a device which collects Layer-4 statistics, and the device provides the determined Layer-4 connection metrics to another computing device for further use.

At 410, a computing device determines one or more network performance indicators based on the collected Layer-4 statistics, much as discussed above in connection with FIGS. 3B-3D. In some implementations, the network performance indicators may be determined based on the Layer-4 connection metrics. In some implementations, the network performance indicators may be determined based on the Layer-4 connection metrics. In some implementations, the network performance indicators (or a portion of the network performance indicators) may be determined by a device which collected the Layer-4 statistics the network performance indicators are based on, and, in some examples, the device may provide the network performance indicators determined by the device to another computing device for further use.

At 415, the network performance indicators are analyzed, using program instructions provided by an analysis module, to determine whether a wireless communication network, such as WLAN 112, has experienced a performance issue. At 420, the program instructions provided by the analysis module cause a computing device to determine whether there is a wireless access point performance issue. For example, the computing device may determine whether:

If (SummaryOverall==1) && (NumDays> threshNumDays))

If so ('Y'), at 425 it is determined that an Action A, which is a diagnostic action, a corrective action, or a maintenance action, is to be performed, and as a result the Action A is subsequently performed. Otherwise ('N'), at 430, the program instructions provided by the analysis module cause a computing device to determine whether there is a client device performance issue. For example, the computing device may determine whether:

If (SummaryOverall==2)

If so ('Y'), at 435 it is determined that an Action B, which is a diagnostic action, a corrective action, or a maintenance action, is to be performed, and as a result the Action B is subsequently performed. Otherwise ('N'), at 440, the program instructions provided by the analysis module cause a computing device to determine whether there is a network coverage or location issue by time period. For example, the computing device may determine whether:

If (Summary_byPeriod[ ]=1) for any of the groups 350-373 in FIG. 3D

If so ('Y'), at 445 it is determined that an Action C, which is a diagnostic action, a corrective action, or a maintenance action, is to be performed, and as a result the Action C is subsequently performed. Otherwise ('N'), at 450, the program instructions provided by the analysis module cause a computing device to determine whether there is an issue caused by a recent configuration update. For example, the computing device may determine whether:

If (Summary_byDate[ ]==1) for days only in the recent past

If so ('Y'), at 455 it is determined that an Action D, which is a diagnostic action, a corrective action, or a maintenance action, is to be performed, and as a result the Action D is subsequently performed. Otherwise ('N'), at 460, the program instructions provided by the analysis module cause a computing device to determine whether there is a network coverage or location issue by date. For example, the computing device may determine whether:

If (Summary_byDate[ ]==1) for any of the days

If so ('Y'), at 465 it is determined that an Action E, which is a diagnostic action, a corrective action, or a maintenance action, is to be performed, and as a result the Action E is subsequently performed. Otherwise ('N'), at 470, the program instructions provided by the analysis module cause a computing device to determine whether there have been occasional WLAN performance problems, with an undetermined cause. For example, the computing device may determine whether:

If (SummaryOverall==3)

If so ('Y'), at 475 it is determined that an Action F, which is a diagnostic action, a corrective action, or a maintenance action, is to be performed, and as a result the Action F is subsequently performed. Otherwise ('N'), at 480 it is determined that an Action G, which is a diagnostic action, a corrective action, or a maintenance action, is to be performed, and as a result the Action G is subsequently performed. Examples of Actions A-G are discussed below. It is noted that an action (such as Action C) does not have to be performed immediately after a determination that the action is to be performed (such as the condition at 440 for Action C testing positive); for example, a flag may be set for the action to be performed at a later time.

In some examples, a wireless access point, such as wireless access point 120, CPE 132, or CPE 250, may provide an interface for accessing and/or controlling settings and/or operation of the wireless access point. For example, wireless access point 120 may provide an HTTP-based interface for accessing and/or controlling settings and/or operation of wireless access point 120, and a CPE, such as CPE 130 illustrated in FIG. 1A, may be configured to utilize the HTTP-based interface to access and/or control settings and/or operation of the wireless access point 120. The HTTP-based interface may be specifically implemented for program-based access, such as by providing a SOAP (Simple Object Access Protocol) based web service. The HTTP-based interface may instead be designed for an end user to access and control via a web browser, and a CPE may be configured to programmatically access this interface to access and/or control various settings and/or operations made available via the interface. In examples in which a device that includes wireless data communication capability (and accordingly functions as a wireless access point, such as CPE 132 illustrated in FIG. 1B) also determines that an action should be performed at a wireless access point, the interface for accessing and/or controlling settings and/or operation of the wireless access point may be provided via inter-process communication within the device or directly executing shell scripts or driver commands.

In some examples, Action A may include issuing a message indicating there is a potential wireless access point performance issue, and instructing or suggesting reconfiguration of a wireless access point or upgrading the wireless access point. In some examples, Action A may include causing a wireless access point, such as via an interface provided by wireless access point 120, CPE 132, or CPE 250 for accessing and/or controlling settings and/or operation of wireless access point 120, CPE 132, or CPE 250, to change a radio channel on which it is operating. In some examples, Action A may include causing a wireless access point, such as via the interface provided by a wireless access point mentioned above, to reboot. In some examples, Action A may include causing a Layer-4 proxy, for example a Layer-4 proxy included in a CPE, wireless access point, or client gateway/router to spoof all connections to limit retransmissions to a local segment only. In some examples, Action A may include causing a network element to rate limit connections within broadband network 140 to match the speed of a wireless access point, to avoid queue build-up at a CPE.

In some examples, Action B may include issuing a message indicating there is a potentially slow client device, and suggesting upgrading old client devices. In some situations, it may be possible to identify which particular client device or client devices have poor performance, and the message may identify the responsible client device(s). In some examples, Action B may include causing a wireless access point, such as via the interface provided by a wireless access point mentioned above, to reassign one or more slower client devices from a first band (for example, the 5 GHz U-NII band) to a second band (for example, the 2.4 GHz ISM band), thereby allowing other client devices operating on the first band to not be bottlenecked by a slow client device. In some examples, Action B may include causing a network element (for example, a proxy such as proxy 131) to rate-limit slow connections to match device speeds, to avoid queue build-up at a CPE.

In some examples, Action C may include issuing a message indicating there is a possible bad client device, bad location, or source of interference that is repeatedly appearing at a particular time of day. For example, if (Summary_byPeriod[ ]==1) for group 367 illustrated in FIG. 3D, the message may indicate the problem has been occurring around 17:00-17:59. In some examples, Action C may include causing a wireless access point, such as via the interface provided by a wireless access point mentioned above, to prioritize client devices with poor connectivity, for fairness. In some examples, Action C may include causing a wireless access point, such as via the interface provided by a wireless access point mentioned above, to deprioritize client devices with poor connectivity, for the benefit of other client devices. In some examples, Action C may include causing a network element (for example, a proxy such as proxy 131) to rate-limit connections with poor WLAN links to match device speeds, to avoid queue build-up at a CPE. In some examples, Action C may include identifying a time of day with a recurring network coverage issue and proactively acting to allocate network resources accordingly.

In some examples, Action D may include issuing a message indicating a recent but persistent WLAN performance degradation has been identified, and inquiring about recent configuration or location changes that may assist in pin-pointing the cause. In some examples, Action D may include causing a wireless access point, such as via the interface provided by a wireless access point mentioned above, to revert to an old configuration. In some examples, Action D may include causing a Layer-4 proxy, for example a Layer-4 proxy included in a CPE, wireless access point, or client gateway/router to spoof all connections. In some examples, Action D may include causing a network element (for example, a proxy such as proxy 131) to rate-limit all connections to limit queue build-up in a CPE.

In some examples, Action E may include issuing a message indicating there have been poor WLAN conditions on the dates for which (Summary_byDate[ ]==1). In some examples, Action E may include causing a wireless access point, such as via the interface provided by a wireless access point mentioned above, to prioritize client devices with poor connectivity, for fairness. In some examples, Action E may include causing a wireless access point, such as via the interface provided by a wireless access point mentioned above, to deprioritize client devices with poor connectivity, for the benefit of other client devices. In some examples, Action E may include causing a network element (for example, a proxy such as proxy 131) to rate-limit connections with poor WLAN links to match device speeds, to avoid queue build-up at a CPE. In some examples, Action E may include identifying a day of the week with a recurring network coverage issue and proactively acting to allocate network resources accordingly.

In some examples, Action F may include issuing a message directing a user to contact advanced technical support to resolve a situation resulting in intermittent bad WLAN conditions. In some examples, Action F may include causing a wireless access point, such as via the interface provided by a wireless access point mentioned above, to reboot. In some examples, Action F may include continuing to monitor for periods of degraded WLAN conditions, then causing a network element (for example, a proxy such as proxy 131) to spoof and/or rate limit all connections.

In some examples, Action G may include issuing a message indicating there are no significant problems detected on a WLAN of interest. In some examples, Action G may include storing a backup of configuration settings for a wireless access point as a "last good configuration." For example, this may be performed via the interface provided by a wireless access point mentioned above. In some examples, Action G may include causing a network element (for example, a proxy such as proxy 131) to avoid spoofing connections if there are limited spoofing resources available in a CPE and/or a broadband network (for example, where a distributed PEP architecture is employed by a communications network provider).

Figure 4B:
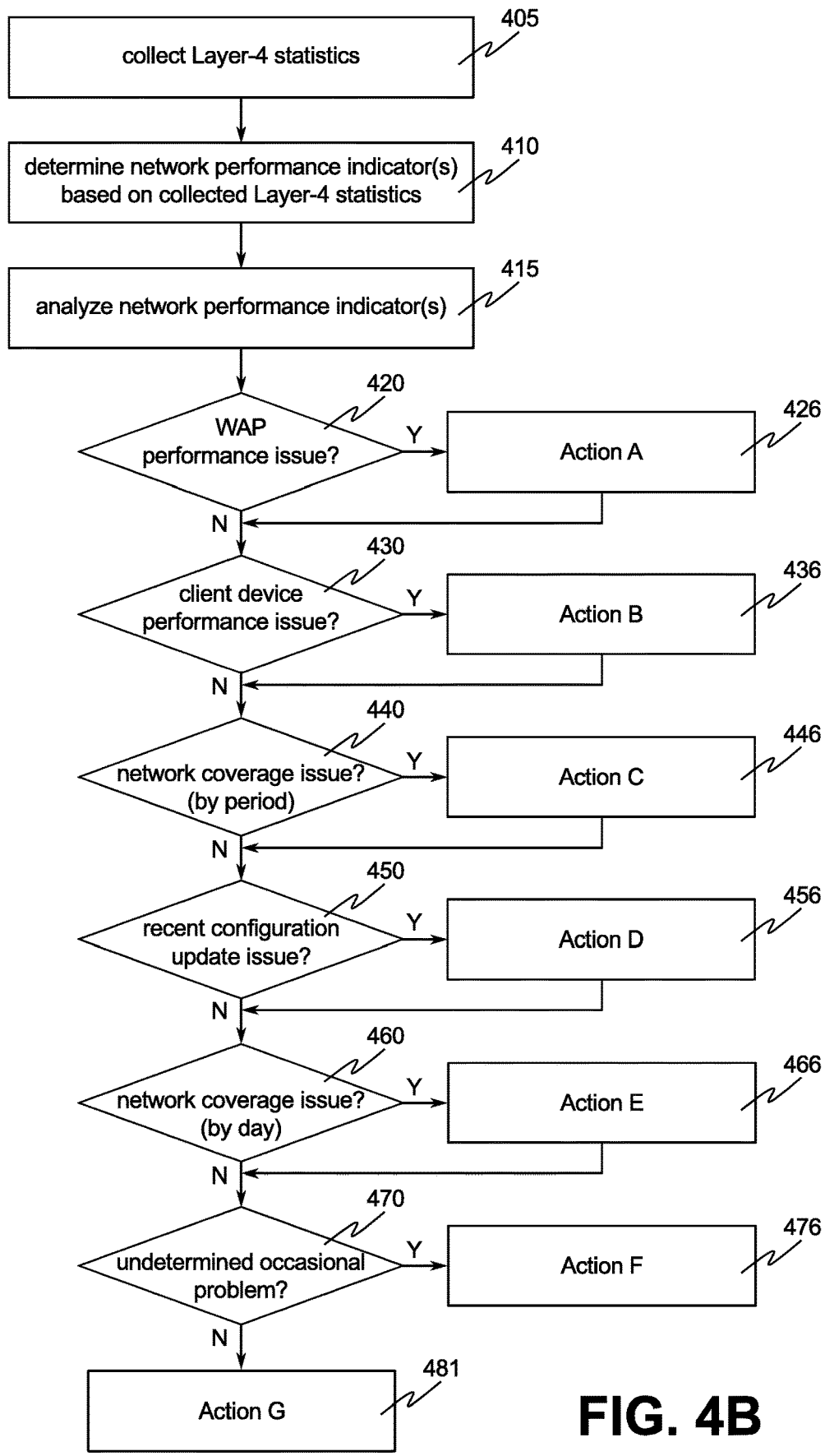

FIG. 4A illustrates an example in which conditions are tested at 420, 430, 440, 450, 460, and 470 in sequence and only one of Actions A-G is performed. For example, in the example illustrated in FIG. 4A, if the condition at 430 tests positive ('Y'), as a result Action B at 435 is performed, and conditions are not tested at 440, 450, 460, and 470. However, in some examples additional conditions may be tested after a condition tests positive. FIG. 4B illustrates one such example. In FIG. 4B, at 426 Action A (discussed above) is performed as a result of the determination at 420; at 436 Action B (discussed above) is performed as a result of the determination at 430; at 446 Action C (discussed above) is performed as a result of the determination at 440; at 456 Action D (discussed above) is performed as a result of the determination at 450; at 466 Action E (discussed above) is performed as a result of the determination at 460; at 476 Action F (discussed above) is performed as a result of the determination at 470; at 481 Action G (discussed above) is performed as a result of the determination at 470. In the example illustrated in FIG. 4B, if the condition at 430 tests positive ('Y'), as a result Action B at 436 is performed, and conditions may still be tested at 440, 450, 460, and 470, and one or more of Actions C-G may be performed in addition to Action B. An action (such as Action C) does not have to be initiated or completed before testing the next condition; for example, if the condition at 430 tests positive ('Y'), a flag may be set for Action B to be performed at a later time, and the process illustrated in FIG. 4B may proceed to 440 before Action B is either initiated or completed (and in some situations, Action C might be initiated or completed before Action B, even if a determination to perform Action C occurs after a determination to perform Action B). If more than one of Actions A-G are performed, in some instances the actions, or portions of the actions, may be performed or initiated concurrently; for example, a single command might be issued to wireless access point 120 that causes multiple actions to be performed. In some instances, if conflicting actions are identified, only a subset of nonconflicting actions may be performed.

Although the examples illustrated in FIGS. 4A and 4B illustrate 420, 430, 440, 450, 460, and 470 being performed in a particular order, this is merely illustrative. In some implementations, 420, 430, 440, 450, 460, and 470 may be performed in a different order than illustrated in FIGS. 4A and 4B. In some implementations, two or more of 420, 430, 440, 450, 460, and 470 may be performed concurrently. In some implementations, the processes illustrated in FIGS. 4A and 4B would be repeated for each of a plurality of wireless access points or for each of a plurality of WLANs. For example, with reference to the example illustrated in FIG. 1A, network addressing information may be used to distinguish Layer-4 traffic associated with a first WLAN 112 and/or a first wireless access point 120 from Layer-4 traffic associated with a second WLAN (not illustrated in FIG. 1A) operated by one or more of wireless access points 122a to 122n and/or a second wireless access point 122a. Where the Layer-4 traffic can be distinguished in such a manner, and separate sets of Layer-4 statistics collected, the sets of Layer-4 statistics may be processed separately in order to diagnose and improve operation of the sources of the sets of Layer-4 statistics separately.

Collecting Layer-1 and/or Layer-2 Statistics

As noted previously, the various examples illustrated in FIGS. 1A-1F and 2A-2F may be configured to collect Layer-1 and/or Layer-2 statistics for one or more WLANs of interest (such as WLAN 112 illustrated in each of FIGS. 1A-1F and 2A-2F). For example, in the example illustrated in FIG. 1B, CPE 132 and/or proxy 133 may be configured to collect Layer-1 and/or Layer-2 statistics. As another example, in the example illustrated in FIG. 2D, CPE 250 and/or monitoring device 252 may be configured to collect Layer-1 and/or Layer-2 statistics. As another example, in the example illustrated in FIG. 2B, monitoring device 230 may be configured to collect Layer-1 and/or Layer-2 statistics. As another example, one or more wireless access point, such as wireless access point 120 illustrated in FIGS. 1A, 1C-1F, 2A-2C, and 2E, may be configured to collect Layer-1 and/or Layer-2 statistics. Collected Layer-1 and/or Layer-2 statistics collected by one or more devices, or information based thereon such statistics, may be provided to a system for analysis, in connection with information based on collected Layer-4 statistics and/or separate from such Layer-4 information.

The following examples of Layer-1 and/or Layer 2 statistics relating to overall wireless communications may be collected:

TX_FRAMES—Number of transmitted frames. In some implementations, TX_PACKETS, a number of transmitted packets (a packet may be divided into one or more frames), may be used instead.

RX_FRAMES—Number of received frames. In some implementations, RX_PACKETS, a number of received packets, may be used instead.

TX_FRAME_ERRS—Number of frames that failed to be transmitted correctly, usually resulting in a retry. In some implementations, TX_PACKET_ERRS, a number of transmitted packets that experienced errors, may be used instead.

RX_FRAME_ERRS—Number of received frames that were not received correctly. In some implementations, RX_PACKET_ERRS, a number of received packets that experienced errors, may be used instead.

RETRY_COUNT—Number of frames transmitted and/or received with the RETRY bit set.

CHANNEL_UTIL—Channel utilization; how much wireless traffic a wireless access point observes on its channel, from all sources.

TX_BYTES—Number of transmitted bytes.

RX_BYTES—Number of received bytes.

The following examples of Layer-1 and/or Layer 2 statistics may be collected with respect to each client device (the "DEVX" portion of the listed names is used to denote client device X, and there would be a respective value for each collected statistic for each client device):

RSSI_DEVX (received signal strength indicator)—Strength of a signal received from the client device. May be expressed in dBm or various vendor-specific units or values.

SNR_DEVX (signal-to-noise ratio)—SNR is an alternative signal strength indication. For example, an SNR of 20 dB with a noise floor of −85 dBm is equivalent to an RSSI of −65 dBm.

PHYRATE_DEVX—Each client device communicates at a respective PHY data rate with a wireless access point in response to network conditions. For example, although 802.11g has a maximum data rate of 54 Mbps, other data rates with varying modulation types, such as 1, 2, 5.5, 6, 9, 11, 12, 18, 24, 36, and 48 Mbps, may be used.

TX_POWER_DEVX—Power being used for transmission to the client device.

TX_FRAMES_DEVX/TX_PACKETS_DEVX—See above description of TX_FRAMES and TX_PACKETS.

RX_FRAMES_DEVX/RX_PACKETS_DEVX—See above description of RX_FRAMES and RX_PACKETS.

TX_FRAME_ERRS_DEVX/TX_PACKET_ERRS_DEVX—See above description of TX_FRAME_ERRS and TX_PACKET_ERRS.

RX_FRAME_ERRS_DEVXIRX_PACKET_ERRS_DEVX—See above description of RX_FRAME_ERRS and RX_PACKET_ERRS.

TX_BYTES_DEVX—Number of bytes transmitted to the client device.

RX_BYTES_DEVX—Number of bytes received from the client device.

CONNECTED_DEVX—Whether the client device is connected to the WLAN.

In some implementations, some or all statistics relating to frame counts (such as TX_FRAME_COUNT or RX_ERR_COUNT) may exclude certain types or subtypes of frames. All control type frames may be excluded. Some control frame subtypes may be excluded (for example, RTS and/or CTS frames). All management type frames may be excluded. Some management frame subtypes may be excluded (for example, authentication, beacon, association request, and/or association response frames). Some data frame subtypes may be excluded (for example, Null, CF-ACK, CF-Poll, and/or CF-ACK+CF-Poll frames).

In some implementations, separate statistics may be collected per radio (for example, a wireless access point may include multiple radio devices). In some implementations, separate statistics may be collected per band (for example, a wireless access point may be capable of communicating via the 2.4 GHz ISM band and the 5 GHz U-NII radio band, either simultaneously or selectively). In some implementations, separate statistics may be collected per channel (for example, a wireless access point may be capable of communicating on multiple channels within a single band, either simultaneously or selectively).

In some examples, such statistics may be collected in response to a predetermined number of frames having been transmitted and/or received, either with all client devices or per client device; for example, after every 1000 frames transmitted to a client device. In some examples, such statistics may be collected in response to a passage of time; for example, a "polling" mechanism may be used to periodically collect such statistics, such as approximately each 10 milliseconds, 20 milliseconds, 50 milliseconds, 100 milliseconds, 200 milliseconds, 600 milliseconds, 1 second, 2 seconds, 5 seconds, 10 seconds, 30 second, 1 minute, 2 minutes, 10 minutes, 15 minutes, 20 minutes, 30 minutes, 40 minutes, 45 minutes, 60 minutes, 90 minutes, and 120 minutes.

Determining Link Condition Metrics Based on Collected Layer-1 and/or Layer-2 Statistics Each collected Layer-1 or Layer-2 statistic may be associated with a respective time period, of a plurality of time periods during which collection of Layer-1 and/or Layer-2 statistics is performed; for example, each Layer-1 or Layer-2 statistic may be associated with a time period during the Layer-1 or Layer-2 statistic was collected. For example, a 24 hour day may be divided into 24 time periods each one hour in duration, as illustrated for each of Days 1-10 in FIG. 3A. In some implementations, the time periods may each be at least 5 minutes in duration. Other example durations for the time periods include, but are not limited to, 5 seconds, 10 seconds, 30 seconds, 1 minute, 2 minutes, 10 minutes, 15 minutes, 20 minutes, 30 minutes, 40 minutes, 45 minutes, 60 minutes, 90 minutes, and 120 minutes. In some implementations, each of the collected Layer-1 or Layer-2 statistics may be recorded. Alternatively, a statistically filtered time series may be employed.

For each time period, link condition metrics may be determined based on the Layer-1 and/or Layer-2 statistics collected during the time period. The link condition metrics provide partial information and WLAN link conditions. Network performance indicators may be determined based on the link condition metrics to obtain a more comprehensive view of link conditions over time. Such network performance indicators may be further based on Layer-4 connection metrics. Below are some example link condition metrics that may be used in connection with the Layer-1 and/or Layer-2 statistics discussed above. Similar link condition metrics may be used for other Layer-1 technologies or Layer-2 protocols. In the below examples, each time period that Layer-1 or Layer-2 statistics or link condition metrics are associated with may be referred to as a Sample_Interval. In some examples, the length of the Sample_Interval used for Layer-1 and/or Layer-2 statistics or link condition metrics may be different from the length of the Sample_Interval used for Layer-4 statistics and metrics. In some implementations, Sample_Intervals may be the same as the time periods used below for determining network performance indicators based on Layer-1 and/or Layer-2 statistics.

The following examples of link connection metrics relating to overall wireless communications may be determined based on Layer-1 and/or Layer-2 statistics:

avgUsage—Average usage (in Kbps transmitted and/or received, for example) over a Sample_Interval.

avgChUtil—Average channel utilization over a Sample_Interval.

AvgFER—Average frame error rate over a Sample_Interval. In some implementations, AvgPER, average packet error rate over a Sample_Interval, may be used instead.

The following examples of link connection metrics may be determined for each client device (the "DevX" portion of the listed names is used to denote client device X, and there would be a respective value for each link connection metric for each client device):

avgRSSI_DevX—Average RSSI over a Sample_Interval. In some implementations, AvgSNR_DevX, average SNR over a Sample_Interval, may be used instead.

avgPhyRate_DevX—Average of PHY data rate of frames sent to/from the client device over a Sample_Interval.

avgFER_DevX—Average frame error rate for communications (transmit and/or receive) with the client device over a Sample_Interval. In some implementations, avgPER_DevX, average packet error rate for communications with the client device, may be used instead.

Algorithm 12 illustrates examples of determining the above link condition metrics. In some implementations, separate link connection metrics may be determined per radio (for example, a wireless access point may include multiple radio devices). In some implementations, separate link connection metrics may be determined per band (for example, a wireless access point may be capable of communicating via the 2.4 GHz ISM band and the 5 GHz U-NII radio band, either simultaneously or selectively). In some implementations, separate link connection metrics may be determined per channel (for example, a wireless access point may be capable of communicating on multiple channels within a single band, either simultaneously or selectively).

---

Algorithm 12: Link Condition Metrics Based on Level-1 and/or Level-2 Statistics

For Each Sample_Interval
    avgUsage = (total of TX_BYTES and/or RX_BYTES in Sample_Interval) / Sample_Interval
    avgChUtil = arithmetic average of CHANNEL_UTIL over Sample_Interval
    avgFER = (total of TX_FRAME_ERRS and/or
        RX_FRAME_ERRS in Sample_Interval) /
        (total of TX_FRAMES and/or
        RX_FRAMES in Sample_Interval)
    avgPER = (total of TX_PACKET_ERRS and/or
        RX_PACKET_ERRS in Sample_Interval) /
        (total of TX_PACKETS and/or
        RX_PACKETS in Sample_Interval)
    For each Client Device (Dev X)
        avgRSSI_DevX = arithmetic average of RSSI_DEVX for client device over Sample_Interval
        avgPhyRate_DevX = arithmetic average of PHYRATE_DEVX for client device over Sample_Interval
        avgFER_DevX = (total of TX_FRAME_ERRS_DEVX and/or
            RX_FRAME_ERRS_DEVX in Sample_Interval) /
            (total of TX_FRAMES_DEVX and/or
            RX_FRAMES_DEVX in Sample_Interval)
        avgPER_DevX = (total of TX_PACKET_ERRS_DEVX and/
            or RX_PACKET_ERRS_DEVX in Sample_Interval) /
            (total of TX_PACKETS_DEVX and/or
            RX_PACKETS_DEVX in Sample_Interval)
    // End for each client device
// End for each Sample_Interval

---

Determining Network Performance Indicators Based on Layer-1 and/or Layer-2 Metrics In much the same manner described above with respect to FIGS. 3A and 3B in connection with determining network performance indicators based on Layer-4 metrics, network performance indicators may be determined which are each based on Layer-1 and/or Layer-2 statistics associated with multiple time periods. For example, if FIGS. 3A-3D were viewed as illustrating a plurality of time periods 310 spanning a plurality of days over which Layer-1 and/or Layer-2 statistics have been collected (rather than Layer-4 statistics, as previously discussed above), then during 8 of those time periods 310 (specifically, the 5 time periods 213 and the 3 time periods 314), Layer-1 and Layer-2 statistics have not been captured. Accordingly, FIG. 3A would illustrate a total of 232 time periods (which are unshaded in FIG. 3A) during which Layer-1 and/or Layer-2 statistics were being captured.

Network performance indicators may be determined based on Layer-1 and/or Layer-2 statistics associated with (or, in many instances, collected during) the plurality of time periods 310 illustrated in FIG. 3A. Such network performance indicators may be determined based on a group 320 (illustrated in FIG. 3B) of the time periods 310, where the group 320 includes all of the time periods 310 for which Layer-1 and/or Layer-2 statistics have been collected (the 232 time periods discussed above with respect to FIG. 3A). For example, values for the following network performance indicators may be determined for group 320:

CountCongestedChannel—The number of time periods in which average channel utilization exceeds a threshold amount, which may indicate congestion on the associated channel, which may be the result of other wireless devices utilizing the channel.

CountLossyChannel—The number of time periods which appear to be experiencing high frame or packet losses due to interference.

Additionally, other values may be determined for group 320, such as:

Count12Total—The number of time periods for which Layer-1 and/or Layer-2 statistics were collected. If the example illustrated in FIG. 3B is viewed as applying to Level-1 and/or Level-2 statistics, CountTotal=232.

Count12—The number of usable time periods (which a significant amount of traffic, in other words, the observed amount of network traffic was active). Whether a time period is considered to be active may be based on, for example, a threshold number of samples being collected in the time period, a threshold number of packets or frames sent and/or received, or a total number of bytes sent and/or received. If the example illustrated in FIG. 3B is viewed as applying to Level-1 and/or Level-2 statistics such that solid shaded time periods, such as time period 324, are such time periods, whereas unshaded time periods, such as time period 322, did not have enough traffic to be considered active, then Count=100.

NumDays—The number of days for which Layer-1 and/or Layer-2 statistics-based information is available. If the example illustrated in FIG. 3B is viewed as applying to Level-1 and/or Level-2 statistics, NumDays=10.

Also, other network performance indicators may be determined for group 320 for each client device (these network performance indicators may also be referred to as "client device performance indicators"), such as:

CountBadLocation_DevX—The number of time periods in which it appears that the particular client device is poorly located with respect to the wireless access point. This may be a result of, for example, the client device being in a poor physical location or orientation (for example, an antenna may be poorly positioned) and/or the wireless access point being in a poor physical location or orientation.

Also, other values may be determined for group 320 for each client device, such as:

Count_DevX—The number of time periods during which a particular client device was connected to a WLAN or to a wireless access point.

Algorithm 13, below, illustrates an example of how values may be determined for Count12Total, Count12, and Count_DevX (for each client device), and the network performance indicators CountCongestedChannel, CountLossyChannel, and CountBadLocation_DevX (for each client device). Each of these network performance indicators is determined based on Layer-1 and/or Layer-2 statistics associated with (or, in many instances, collected during) a plurality of time periods (and link condition metrics derived therefrom), with the plurality of time periods including a first time period and a second time period that neither overlaps nor is consecutive with the first time period. In some instances, the first time period is during a first day, and the second time period is during a second day different from the first day.

---

Algorithm 13: Network Performance Indicators Based on Level-1 and/or Level-2 Statistics For Each Time Period in a Group (such as group 320, group 330, or group 350)
    Count12Total = Count12Total + 1 // number of time periods available
    For each Band // a WAP may operate both 2.4/5 GHz, for example
        If (avgUsage >= threshUsage)
            Count12 = Count12 + 1
            // Count12 = Number of periods with significant traffic
            Break loop
        // End If
    // End for each band
    For each Band
        If (avgChUtil >= threshChUtil)
            CountCongestedChannel = CountCongestedChannel + 1
            // CountCongestedChannel = Number of periods with congested channel
            Break loop
        // End If
    // End for each band
    For each Band
        If (avgPER >= threshPER)
            CountLossyChannel = CountLossyChannel + 1
            // CountLossyChannel = Number of periods with high packet losses due to interference (alternatively may be based on avgFER)
            Break loop
        // End If
    // End for each band
    For each client device (_DEVX or _DevX)
        If (CONNECTED_DEVX)
            Count_DevX = Count_DevX + 1
            If ((avgRSSI_DevX < threshRSSI) ||
            (avgPhyRate_DevX < threshPhyRate) ||
            (avgPER_DevX > threshPERbyDev))
                CountBadLocation_DevX = CountBadLocation_DevX + 1
                // CountBadLocation_DevX = Number of bad periods with poor location for client device X
                Break loop
            // End If
        // End If
    // End for each client device
// End for each time period in a group

---

Additional network performance indicators may be determined for group 320 based on the values and network performance indicators determined in Algorithm 12 (accordingly, these additional network performance indicators are also determined based on the collected Later-1 and/or Layer-2 statistics and link condition metrics derived therefrom), such as:

CountBadDevices—The number of client devices, out of a total of CountDevices, for which there is a persistently bad link, suggesting a client device with insufficient wireless capabilities.

CountBadLocation—The number of client devices, out of a total of CountDevices, which appear to be experiencing recurring device location issues.

Algorithm 14, below, illustrates an example of how values may be determined for the network performance indicators CountBadDevices and CountBadLocation. Each of these network performance indicators is determined based on Layer-1 and/or Layer-2 statistics associated with (or, in many instances, collected during) a plurality of time periods (and link condition metrics derived therefrom), with the plurality of time periods including a first time period and a second time period that neither overlaps nor is consecutive with the first time period. In some instances, the first time period is during a first day, and the second time period is during a second day different from the first day.

Algorithm 14: Additional Network Performance Indicators Based on Level-1/-2 Statistics

```
For Each Client Device (Dev X)
    CountDevices = CountDevices + 1 // number of observed client devices
    If ((Count_DevX >= threshMinPeriods) &&
       ((CountBadLocation_DevX / Count_DevX) >= threshBadLocFractionHigh))
           CountBadDevices = CountBadDevices + 1
           // CountBadDevices = Number of devices with persistent bad link
           Optional: cause Action J to be performed for the client device
               (see FIGS. 5A and 5B and related discussion)
           Break loop
       // End If
    If ((Count_DevX >= threshMinPeriods) &&
       ((CountBadLocation_DevX / Count_DevX) >= threshBadLocFractionLow))
           CountBadLocation = CountBadLocation + 1
           // CountBadLocation = Number of client devices in poor locations
           Optional: cause Action K to be performed for the client device
               (see FIGS. 5A and 5B and related discussion)
           Break loop
       // End If
// End for each client device
```

Much as discussed with respect to FIG. 3C in connection with Layer-4 statistics, network performance indicators may be determined based on Layer-1 and/or Layer-2 statistics associated with groups of time periods, wherein the time periods are grouped according to the day on which they occurred (FIG. 3C illustrates similar groups 330-339 in connection with Layer-4 statistics). The time at which days are considered to begin may be based on, for example, a time zone associated with a physical location of a CPE, or may be at an arbitrary time (for example, beginning with initiating the collection of Layer-1 or Layer-2 statistics). Arrays of counters, Count12Total_byDate[ ], Count12_byDate[ ], CountCongestedChannel_byDate[ ], CountLossyChannel_byDate[ ], Count_DevX_byDate[ ] (may be a two-dimensional array, for example), CountBadLocation_DevX_byDate[ ] (may be a two-dimensional array, for example), CountDevices_byDate[ ], CountBadDevices_byDate[ ], and CountBadLocation_byDate[ ] are used to store values for each of the groups. These values are calculated in much the same manner for their respective groups that Count12Total, Count12, CountCongestedChannel, CountLossyChannel, Count_DevX, CountBadLocation_DevX, CountDevices, CountBadDevices, and CountBadLocation are described above as being calculated for group 320.

Much as discussed with respect to FIG. 3D in connection with Layer-4 statistics, network performance indicators may be determined based on Layer-1 and/or Layer-2 statistics associated with groups of time periods, wherein the time periods are grouped according to the time periods having each covered a particular time of day across multiple days (FIG. 3D illustrates similar groups 350-373 in connection with Layer-4 statistics). Arrays of counters, Count12Total_byPeriod[ ], Count12_byPeriod[ ], CountCongestedChannel_byPeriod[ ], CountLossyChannel_byPeriod[ ], Count_DevX_byPeriod[ ] (may be a two-dimensional array, for example), CountBadLocation_DevX_byPeriod[ ] (may be a two-dimensional array, for example), CountDevices_byPeriod[ ], CountBadDevices_byPeriod[ ], and CountBadLocation_byPeriod[ ] are used to store values for each of the groups. These values are calculated in much the same manner for their respective groups that Count12Total, Count12, CountCongestedChannel, CountLossyChannel, Count_DevX, CountBadLocation_DevX, CountDevices, CountBadDevices, and CountBadLocation are described above as being calculated for group 320.

Figure 5A:
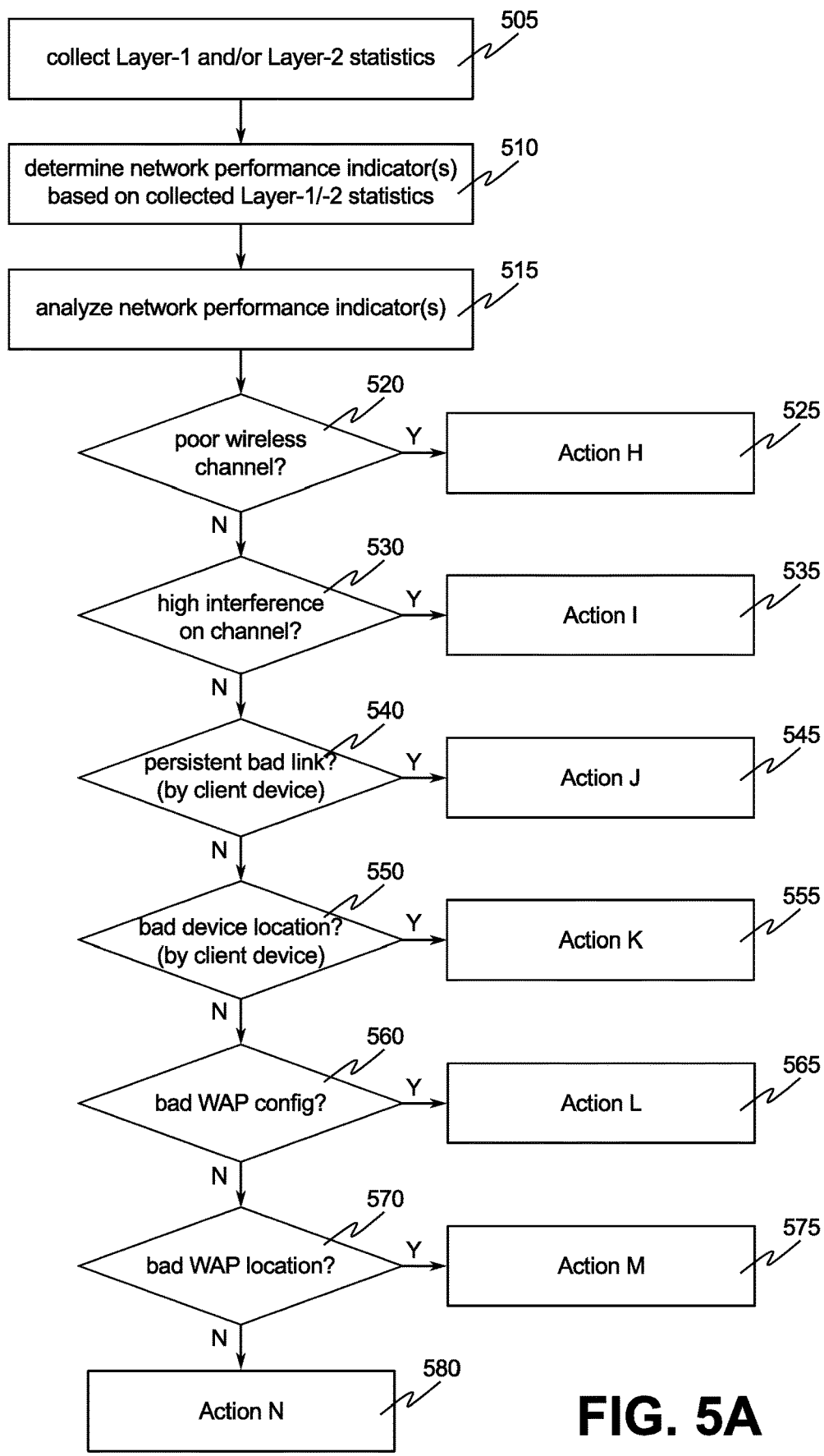
FIGS. 5A and 5B illustrate methods for automatically diagnosing and improving operation of a wireless communication network based on Layer-1 and/or Layer-2 statistics.

FIG. 5A illustrates methods for automatically diagnosing and improving operation of a wireless communication network based on Layer-1 and/or Layer-2 statistics. At 505, Layer-1 and/or Layer-2 statistics are collected during a plurality of time periods, much as discussed above and much as discussed above with respect to collection of Layer-4 statistics in connection with FIG. 3A. Collection of the Layer-1 and/or Layer-2 statistics may be performed by, for example, wireless access points 120 and 122a to 122n illustrated in FIGS. 1A, 1C-1F, 2A-2C, 2E, and 2F, CPEs 132 and 250, and monitoring devices 230 and 252. The Layer-1 and/or Layer-2 statistics may be collected by multiple devices; for example, a plurality of the wireless access points 120 and 120a to 122n may be configured to collect Layer-1 and/or Layer-2 statistics for respective WLANs. The Layer-1 and/or Layer-2 statistics may be stored by a device (or devices) which collects the statistics, or another computing device (or devices); for example, the collected Layer-1 and/or Layer-2 statistics may be transferred from a device which collects and/or stores the Layer-1 and/or Layer-2 statistics via broadband network 140 to a network node operated by a communication service provider that is configured to receive and/or store the Layer-1 and/or Layer-2 statistics. Processing of the Layer-1 and/or Layer-2 statistics, such as to determine link condition metrics as discussed above, may be performed by a device (or devices) which collects or stores the Layer-1 and/or Layer-2 statistics, or another computing device (or devices); for example, the collected Layer-1 and/or Layer-2 statistics may be transferred from a device which collects or stores the Layer-1 and/or Layer-2 statistics via broadband network 140 to a network node operated by a communication service provider that is configured to process the Layer-1 and/or Layer-2 statistics. In some implementations, link condition metrics may be determined by a device which collects Layer-1 and/or Layer-2 statistics, and the device provides the determined link condition metrics to another computing device for further use.

At 510, a computing device determines one or more network performance indicators based on the collected Layer-1 and/or Layer-2 statistics, much as discussed above. In some implementations, the network performance indicators may be determined based on the link condition metrics. In some implementations, the network performance indicators (or a portion of the network performance indicators) may be determined by a device which collected the Layer-1 and/or Layer-2 statistics the network performance indicators are based on, and, in some examples, the device may provide the network performance indicators determined by the device to another computing device for further use.

At 515, the network performance indicators are analyzed, using program instructions provided by an analysis module, to determine whether a wireless communication network, such as WLAN 112, has experienced a performance issue. At 520, the program instructions provided by the analysis module cause a computing device to determine whether the wireless access point has been operating on a poor wireless channel. For example, the computing device may determine whether:

If (CountCongestedChannel/Count12Total)>threshCongestion)

If so ('Y'), at 525 it is determined that an Action H, which is a diagnostic action, a corrective action, or a maintenance action, is to be performed, and as a result the Action H is subsequently performed. Otherwise ('N'), at 530, the program instructions provided by the analysis module cause a computing device to determine whether a high amount of interference has been experienced on a channel that the wireless access point has been operating on. For example, the computing device may determine whether:

If ((CountLossyChannel/Count12Total)>threshLosses)

If so ('Y'), at 535 it is determined that an Action I, which is a diagnostic action, a corrective action, or a maintenance action, is to be performed, and as a result the Action I is subsequently performed. Otherwise ('N'), at 540, the program instructions provided by the analysis module cause a computing device to determine whether, for each client device that the access point communicated with during the time periods under consideration, there is a persistent bad link for the client device. For example, the computing device may determine whether:

If ((Count_DevX>=threshMinSlots) && ((CountBadLocation_DevX/Count_DevX)>=threshBadLocFractionHigh))

If so ('Y'), at 545 it is determined that an Action J, which is a diagnostic action, a corrective action, or a maintenance action, is to be performed with respect to each of the client devices for which the condition tested at 545 was met, and as a result the Action J is subsequently performed for each of those client devices. Otherwise ('N'), at 550, the program instructions provided by the analysis module cause a computing device to determine whether, for each client device that the access point communicated with during the time periods under consideration, the client device is in a bad location relative to the wireless access point. For example, the computing device may determine whether:

If ((Count_DevX>=threshMinSlots) && ((CountBadLocation_DevX/Count_DevX)>=threshBadLocFractionLow))

If so ('Y'), at 555 it is determined that an Action K, which is a diagnostic action, a corrective action, or a maintenance action, is to be performed, and as a result the Action K is subsequently performed. In some examples, for each client device that it is not determined to perform Action J, the test at 550 is performed to determine whether Action K should be performed, much as illustrated in Algorithm 14, above. Otherwise ('N'), at 560, the program instructions provided by the analysis module cause a computing device to determine whether there is a possible misconfiguration of the wireless access point. For example, the computing device may determine whether:

If ((CountBadDevices/CountDevices)>=thresh CountDevFractionHigh)

If so ('Y'), at 565 it is determined that an Action L, which is a diagnostic action, a corrective action, or a maintenance action, is to be performed, and as a result the Action L is subsequently performed. Otherwise ('N'), at 570, the program instructions provided by the analysis module cause a computing device to determine whether there have been occasional WLAN performance problems, with an undetermined cause. For example, the computing device may determine whether:

If ((CountBadDevices/CountDevices)>=thresh CountDevFractionLow)

If so ('Y'), at 575 it is determined that an Action M, which is a diagnostic action, a corrective action, or a maintenance action, is to be performed, and as a result the Action M is subsequently performed. Otherwise ('N'), at 580 it is determined that an Action N, which is a diagnostic action, a corrective action, or a maintenance action, is to be performed, and as a result the Action N is subsequently performed. Examples of Actions H-N are discussed below. It is noted that an action (such as Action I) does not have to be performed immediately after a determination that the action is to be performed (such as the condition at 530 for Action I testing positive); for example, a flag may be set for the action to be performed at a later time.

As mentioned in the above description of FIG. 4A, a wireless access point may provide an interface for accessing and/or controlling settings and/or operation of the wireless access point. Also as mentioned in the above description of FIG. 4A, in examples in which a device that includes wireless data communication capability (and accordingly functions as a wireless access point, such as CPE 132 illustrated in FIG. 1B) also determines that an action should be performed at a wireless access point, the interface for accessing and/or controlling settings and/or operation of the wireless access point may be provided via inter-process communication within the device or directly executing shell scripts or driver commands. In some examples, one or more client devices may provide a network-accessible interface (which may include an authorization mechanism) for controlling wireless communication settings for the client devices. For example, such a network-accessible interface may be used to change a band a client device uses to communicate with a wireless access point, or may be used to configure the client device to utilize a different wireless access point or WLAN. A wireless access point may implement a band-steering feature that allows the wireless access point to change a band for a client device without changing wireless networking settings on the client device. For example, first and second bands provided by a wireless access point may have same SSID and password, or the first and second bands may have different SSIDs and the client device has configuration stored for both the SSIDs. Then, the wireless access point can selectively ignore association requests from the client device on a first band, thereby forcing the client device to associate via the second band.

In some examples, Action H may include issuing a message indicating there is a potential issue with a wireless communication channel that has been used by a wireless access point or WLAN, and instructing or suggesting the wireless access point or WLAN be operated on a different wireless communication channel. The message may include instructing or suggesting use of a different band, if one is determined to be available, for some or all client devices on the affected wireless access point or WLAN. In some examples, Action H may include causing a wireless access point, such as via an interface provided by wireless access point 120, CPE 132, or CPE 250 for accessing and/or controlling settings and/or operation of wireless access point 120, CPE 132, or CPE 250, to change a radio channel on which it is operating. In some implementations, Action H may include obtaining information, such as, but not limited to, channel utilization, about other wireless communication channels, and to automatically identify a new wireless communication channel based on the obtained information. In some examples, Action H may include causing a client device, such as via an interface provided by the client device for controlling wireless communication settings, to utilize a different band, wireless access point, or WLAN. In some examples, Action H may include causing a network element to rate limit connections within broadband network 140 to match the speed of a wireless access point, to avoid queue build-up at a CPE.

In some examples, Action I may include issuing a message indicating there is a high degree of interference on a wireless communication channel that has been used by a wireless access point or WLAN, and instructing or suggesting the wireless access point or WLAN be operated on a different wireless communication channel. The message my include instructing or suggesting use of a different band, if one is determined to be available, for some or all client devices on the affected wireless access point or WLAN. In some examples, Action I may include causing a wireless access point, such as via the interface provided by a wireless access point mentioned above, to change a radio channel on which it is operating. In some examples, Action I may include causing a client device, such as via an interface provided by the client device for controlling wireless communication settings, to utilize a different band, wireless access point, or WLAN. In some examples, Action I may include causing a proxy, for example a Layer-4 proxy included in a CPE, wireless access point, or client gateway/router to spoof all connections to limit recovery to a local network. In some examples, Action I may include causing a network element (for example, a proxy such as proxy 131) to rate-limit slow connections to match device speeds, to avoid queue build-up at a CPE.

In some examples, Action J may include issuing a message indicating that a persistent bad link has been observed for one or more problem client devices, identifying the problem client devices, and suggesting that the problem client devices may have insufficient wireless communication capabilities (which may be addressed by, for example, upgrading the problem client devices). In some examples, Action J may include issuing a message instructing or suggesting that one or more client devices be reassigned from a first band to a second band, to prevent one or more of the problem client devices from affecting wireless communication performance of other client devices. In some examples, Action J may include causing a wireless access point, such as via the interface provided by a wireless access point mentioned above, to prioritize one or more of the problem client devices, for fairness. In some examples, Action J may include causing a wireless access point, such as via the interface provided by a wireless access point mentioned above, to deprioritize one or more of the problem client devices, for the benefit of other client devices. In some examples, Action J may include causing a wireless access point, such as via the interface provided by a wireless access point mentioned above, to reassign one or more client devices from a first band (for example, the 5 GHz U-NII band) to a second band (for example, the 2.4 GHz ISM band), thereby preventing one or more of the problem client devices from affecting wireless communication performance of other client devices; the reassignment may involve problem client devices and/or other client devices. In some examples, Action J may include reconfiguring a wireless access point, such as via the interface provided by a wireless access point mentioned above, to refuse to allow one or more of the problem client devices to connect via a first band, to prevent the one or more problem client devices from affecting wireless communication performance of other client devices, and to encourage a user to reconfigure the one or more problem client devices to use a second band. In some examples, Action J may include causing a network element (for example, a proxy such as proxy 131) to rate-limit or decrease priority of traffic to one or more of the problem client devices.

In some examples, Action K may include issuing a message indicating that one or more problem client devices appear to be poorly located or oriented (for example, an antenna may be poorly positioned) with respect to a wireless access point, identifying the problem client devices, and suggesting that the problem client devices and/or the wireless access point be moved to a new location or reoriented. In some examples, Action K may include causing a wireless access point, such as via the interface provided by a wireless access point mentioned above, to force one or more of the problem client devices to associate with the wireless access point on another band (for example, if a problem client device is determined to have been operating on the 5 GHz U-NII band, forcing the problem client device to instead operate on the 2.4 GHz ISM band may overcome the location issue). In some examples, Action K may include causing a Layer-4 proxy, for example a Layer-4 proxy included in a CPE, wireless access point, or client gateway/router to spoof connections for one or more of the problem client devices.

In some examples, Action L may include issuing a message indicating that the wireless access point or WLAN may have a possible misconfiguration. In some examples, Action L may include causing a wireless access point, such as via the interface provided by a wireless access point mentioned above, to reboot. In some examples, Action L may include causing a wireless access point, such as via the interface provided by a wireless access point mentioned above, to reload a "last good configuration" (an older configuration known to be good). In some examples, Action L may include automatically arranging for a support technician to investigate the issue.

In some examples, Action M may include issuing a message indicating that the wireless access point is in a poor location or orientation, and suggesting that the wireless access point be moved to a new location or the addition of a wireless communication range-extender device.

In some examples, Action N may include issuing a message indicating there are no significant problems detected on a WLAN of interest. In some examples, Action N may include storing a backup of configuration settings for a wireless access point as a "last good configuration." For example, this may be performed via the interface provided by a wireless access point mentioned above.

The messages discussed above with respect to Actions A-N may, for example, result in a human-readable message being displayed to a user (such as via an email, text message, or user interface dialog) or be in the form of an indication to a computing device, which may result in the computing device taking further action. In some examples, such messages may be provided by automatically sending an email to a user associated with a wireless communication network. In some examples, such messages may be provided via an IVR (interactive voice response system), to provide automated identification of likely wireless communication network issues in response to a customer contacting a customer service number.

Figure 5B:
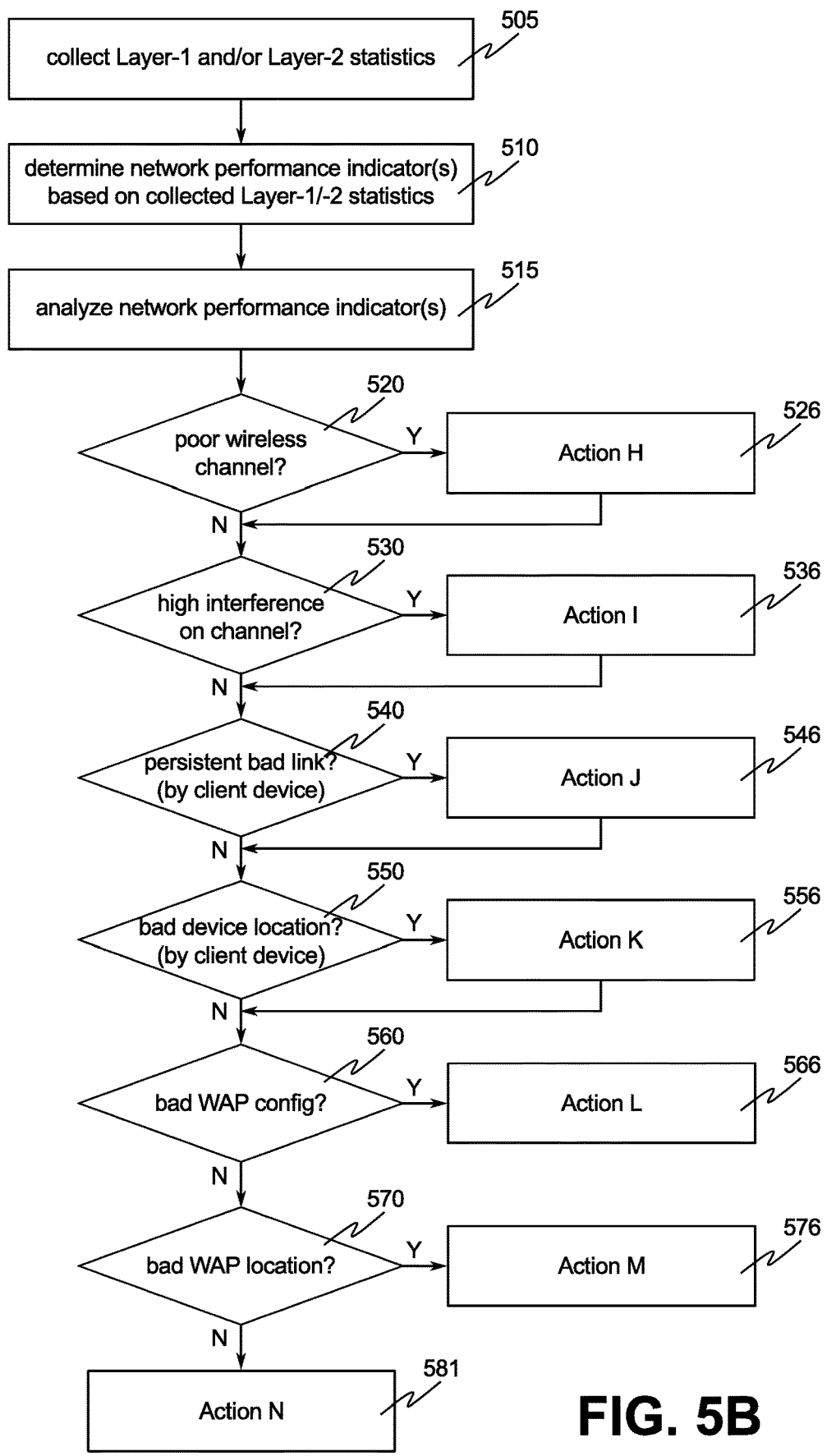

FIG. 5A illustrates an example in which conditions are tested at 520, 530, 540, 550, 560, and 570 in sequence and only one of Actions H-N is performed. For example, in the example illustrated in FIG. 5A, if the condition at 530 tests positive ('Y'), as a result Action I at 535 is performed, and conditions are not tested at 540, 550, 560, and 570. However, in some examples additional conditions may be tested after a condition tests positive. FIG. 5B illustrates one such example. In FIG. 5B, at 526 Action H (discussed above) is performed as a result of the determination at 520; at 536 Action I (discussed above) is performed as a result of the determination at 530; at 546 Action J (discussed above) is performed as a result of the determination at 540; at 556 Action K (discussed above) is performed as a result of the determination at 550; at 566 Action L (discussed above) is performed as a result of the determination at 560; at 576 Action M (discussed above) is performed as a result of the determination at 570; at 581 Action N (discussed above) is performed as a result of the determination at 570. If the condition at 560 tests positive ('Y'), as a result Action L at 566 is performed, and the condition at 570 is not tested. In the example illustrated in FIG. 5B, if the condition at 530 tests positive ('Y'), as a result Action I at 536 is performed, and conditions may still be tested at 540, 550, 560, and 570, and one or more of Actions J-N may be performed in addition to Action I. An action (such as Action J) does not have to be initiated or completed before testing the next condition; for example, if the condition at 530 tests positive ('Y'), a flag may be set for Action I to be performed at a later time, and the process illustrated in FIG. 5B may proceed to 540 before Action I is either initiated or completed (and in some situations, Action J might be initiated or completed before Action I, even if a determination to perform Action J occurs after a determination to perform Action I). If more than one of Actions H-N are performed, in some instances the actions, or portions of the actions, may be performed or initiated concurrently; for example, a single command might be issued to wireless access point 120 that causes multiple actions to be performed. In some instances, if conflicting actions are identified, only a subset of nonconflicting actions may be performed.

Although the examples illustrated in FIGS. 5A and 5B illustrate 520, 530, 540, 550, 560, and 570 being performed in a particular order, this is merely illustrative. In some implementations, 520, 530, 540, 550, 560, and 570 may be performed in a different order than illustrated in FIGS. 5A and 5B. In some implementations, two or more of 520, 530, 540, 550, 560, and 570 may be performed concurrently. In some implementations, the processes illustrated in FIGS. 5A and 5B would be repeated for each band a wireless access point was operating on during the time periods under consideration. In some implementations, the processes illustrated in FIGS. 5A and 5B would be repeated for each channel a wireless access point was operating on during the time periods under consideration. In some implementations, the processes illustrated in FIGS. 5A and 5B would be repeated for each wireless access point that Layer-1 and/or Layer-2 statistics were being collected during the time periods under consideration; for example, Layer-1 and/or Layer-2 statistics may be collected separately for each of a plurality of wireless access points 120 and 122a to 122n. In some implementations, the processes illustrated in FIGS. 5A and 5B would be repeated for each WLAN that Layer-1 and/or Layer-2 statistics were being collected during the time periods under consideration; for example, Layer-1 and/or Layer-2 statistics may be collected separately for each of a plurality of WLANs operated by wireless access points 120 and 122a to 122n (it is noted that in some examples, a plurality of wireless access points may be involved in operating a single WLAN, and that in some examples, a single wireless access point may be involved in operating a plurality of WLANs).

Some examples of the Actions A-N include attempts to automatically identify the occurrence of, characterize, and report undesirable network conditions (diagnostic actions); improve undesirable network conditions (corrective actions); and attempt to limit the impact of ongoing or potential undesirable network conditions (maintenance actions). Maintenance actions may include, for example, preventive maintenance actions that attempt to reduce the likelihood or degree of a later undesirable network condition (for example, saving a known good configuration for later restoration in the event that a detrimental modification is made to the configuration). In response to a corrective action being caused to be performed, a smaller time frame for collecting Layer 4, Layer 1, and/or Layer-2 statistics and a review of network conditions based on the collected statistic (resulting in a "followup" review of the effects of the corrective action) may be enabled to perform an automatic evaluation as to whether the corrective action improved network conditions. The length of the time frame may be based on the corrective action (for example, a type of corrective action or details or parameters for the corrective action) and/or the detected undesirable network condition that prompted the corrective action (for example, more time may be required to confirm resolution of a condition recurring at a particular time of day versus an ongoing condition), to, for example, more quickly assess the effects of the corrective action or to allow some time for undesirable network conditions to manifest. For example, success of changing a wireless communication channel might be quickly confirmed in a situation where use of the new channel avoid interference from other devices on the previous channel. In an event that a followup review indicates that network conditions were not substantially improved, an additional or modified corrective action can be taken (for example, a wireless access point may be replaced or disabled, or other settings of the wireless access point changed, in response to network conditions not having substantially improved), or a maintenance action to limit the impact (for example, rate-limiting connections to client devices with poor link performance). In some examples, confirmation that an expected result of a corrective action has occurred may be performed in response to causing a corrective action to be performed; the confirmation may be scheduled to occur after a predetermined period of time. For example, if a corrective action is performed to reassign a particular client device from a first band to a second band, it may be confirmed that the client device has begun associating with a wireless access point via the second band; additionally, a followup review may be arranged, much as discussed above, to verify that newer network performance indicators demonstrate improved performance.

Figure 6:
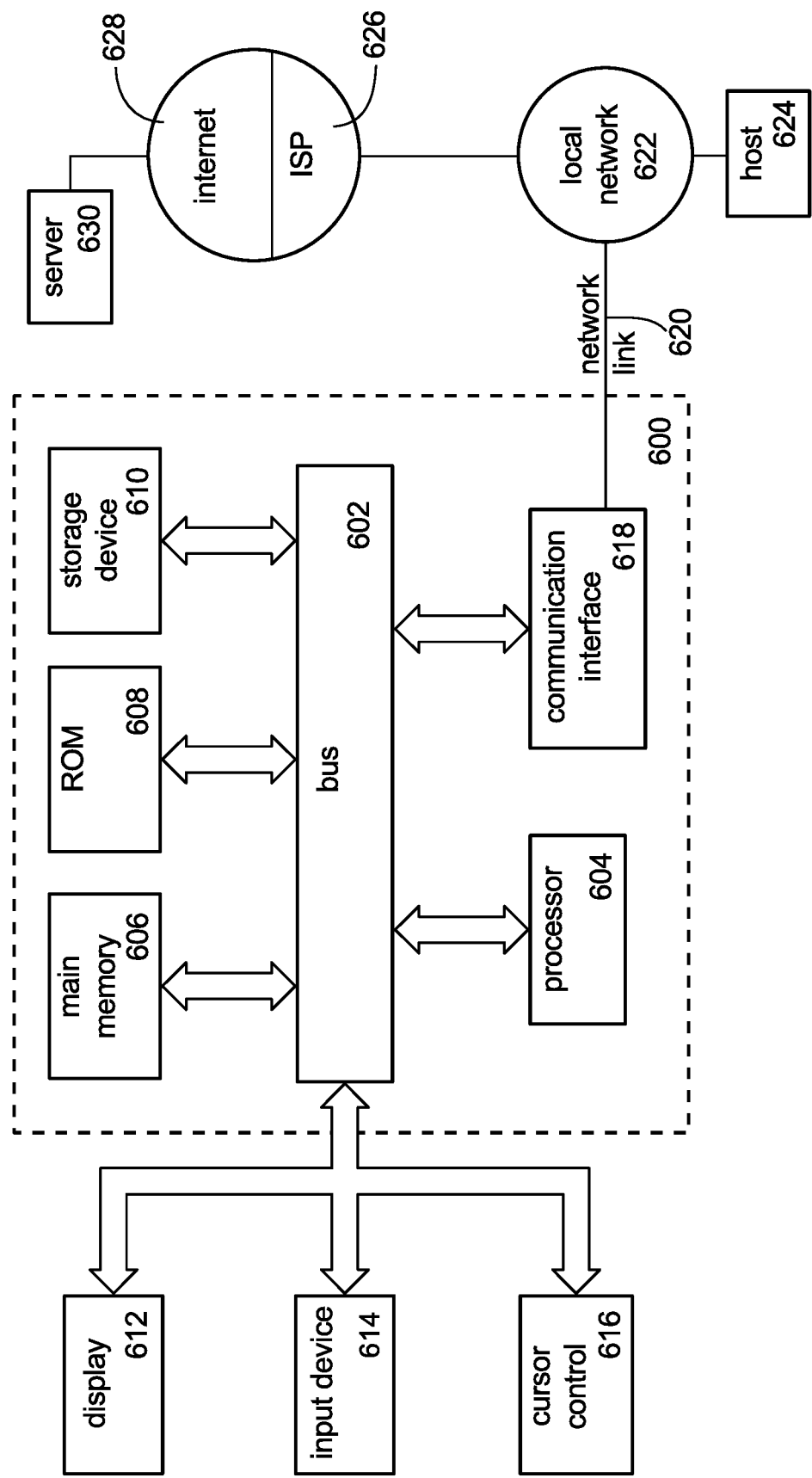
FIG. 6 is a block diagram that illustrates a computer system upon which aspects of this disclosure may be implemented.

FIG. 6 is a block diagram that illustrates a computer system 600 upon which aspects of this disclosure may be implemented, such as, but not limited to, client devices 110a to 110n, 190, and 192, wireless access point 120 and 122a to 122n, CPEs 130, 132, 134, 136, 220, 240, and 250, network nodes included in broadband network 140, remote servers such as remote server 160, client gateway/router 170, router 180, and monitoring devices 210, 230, 242, and 252. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Various other actions may be performed in response to identifying wireless communication network issues. In some situations, a replacement wireless access point may be automatically dispatched to a customer in response to detecting a bad wireless access point. In some situations, a customer may be automatically notified (through, for example, emails and pop-up windows) about potential WLAN issues or potentially problematic client devices that may be impacting service quality at a customer location. In some situations, a system may automatically recommend WLAN changes, such as upgrading a wireless access point, upgrading a client device, suggesting moving or placement of a wireless access point or client device, and suggesting use of wireless network repeaters. In some situations, information about WLAN conditions may be automatically included in a monthly bill or online account webpage. In some situations, network conditions of customers who contact customer support may be gathered in a database, and used to dynamically and/or automatically identify reasons for customer dissatisfaction; for example, wireless access point models may be identified and assessed for compatibility with other network hardware and client devices, and information about CPE 132 (which includes an integrated wireless access point) may be collected to improve quality over time.

Computer system 600 may be coupled via bus 602 to a display 612, such as a cathode ray tube (CRT) or liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Another type of user input device is a touchscreen, which generally combines display 612 with hardware that registers touches upon display 612.

This disclosure is related to the use of computer systems such as computer system 600 for implementing the techniques described herein. In some examples, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method of automatically diagnosing operation of a communication network, the method comprising:
    collecting, during a plurality of time periods spanning a plurality of days, a plurality of Layer-4 protocol statistics for Layer-4 network connections each having a first endpoint at one of one or more client devices, wherein data transmitted for each of the Layer-4 network connections traverses the communication network, each of the time periods being at least 5 minutes in duration and the plurality of days including two nonconsecutive days;
    determining, for each time period in the plurality of time periods, a first Layer-4 condition metric for the time period based on the Layer-4 protocol statistics collected during the time period;
    determining a first network performance indicator, based on a number of the plurality of time periods that a first threshold condition is met by the first Layer-4 condition metric;
    determining whether the communication network has experienced a performance issue based on the first network performance indicator meeting a second threshold condition; and
    causing a diagnostic action, a corrective action, or a maintenance action to be performed based on the determination whether the communication network has experienced a performance issue.

2. The method of claim 1, wherein:
    the causing a diagnostic action, a corrective action, or a maintenance action to be performed comprises causing a wireless access point to perform a corrective action.

3. The method of claim 1, wherein:
the collecting a plurality of Layer-4 protocol statistics includes collecting TCP statistics for TCP connections when a TCP ACK is received at a network node for the TCP connection;
each of the Layer-4 network connections for which the Layer-4 protocol statistics are collected has a second endpoint at the network node; and
the collecting is performed at the network node.

4. The method of claim 1, wherein:
the collecting a plurality of Layer-4 protocol statistics includes collecting TCP statistics for TCP connections when a packet is transmitted by a network node for the TCP connection;
each of the Layer-4 network connections for which the Layer-4 protocol statistics are collected has a second endpoint at the network node; and
the collecting is performed at the network node.

5. The method of claim 1, wherein:
the first network performance indicator is determined based on the Layer-4 protocol statistics collected during a plurality of time periods each occurring during a first day;
the method further comprises:
  determining that the communication network has experienced a performance issue based on the first network performance indicator indicating poor performance, and
  determining a second network performance indicator, based on the Layer-4 protocol statistics collected during a plurality of time periods each occurring on a second day, the second day occurring before the first day; and
wherein the determination that the communication network has experienced a performance issue is further based on the second network performance indicator not indicating poor performance.

6. The method of claim 1, wherein:
the first network performance indicator is determined based on the Layer-4 protocol statistics collected during time periods that each cover a first time of day; and
the method further comprises determining that the communication network has experienced a performance issue based on the first network performance indicator indicating poor performance.

7. The method of claim 1, wherein:
the communication network includes a wireless access point configured to provide a wireless network; and
the method further comprises:
  collecting, during the plurality of time periods, a plurality of Layer-1 and/or Layer-2 protocol statistics for wireless data communications on the wireless network,
  determining, for each time period in the plurality of time periods, a link condition metric for the time period based on the Layer-1 and/or Layer-2 protocol statistics collected during the time period,
  determining a second network performance indicator, based on a number of the plurality of time periods that a third threshold condition is met by the first link condition metric,
  determining whether the wireless network has experienced a performance issue based on the second network performance indicator meeting a fourth threshold condition, and
  causing a diagnostic action, a corrective action, or a maintenance action to be performed based on the determination whether the wireless network has experienced a performance issue.

8. The method of claim 7, wherein:
the first link condition metric is an average channel utilization, an average packet error rate, or an average frame error rate;
the determining whether the wireless network has experienced a performance issue comprises automatically determining that a wireless access point has been experiencing issues with use of a first wireless communication channel; and
the method further comprises causing, in response to the determining that the wireless access point has been experiencing issues with use of the first wireless communication channel, the wireless access point to change to a second wireless communication channel different from the first wireless communication channel.

9. The method of claim 7, wherein:
the link condition metric is an average RSSI (received signal strength indicator), an average PHY (physical layer) data rate, or an average packet error rate for a first wireless client device;
the determining whether the wireless network has experienced a performance issue comprises automatically determining that a first wireless client device has been experiencing communication issues on the wireless network; and
the method further comprises reassigning, in response to the determining that the first wireless client device has been experiencing communication issues on the wireless network, a second wireless client device from a first wireless communication band to a second wireless communication band different from the first wireless communication band.

10. A nontransitory computer readable medium including instructions which, when executed by one or more processors, cause the one or more processors to perform the method of claim 1.

11. The system of claim 1, wherein:
the first network performance indicator is determined based on the Layer-4 protocol statistics collected during time periods that each cover a first time of day; and
the instructions further cause the one or more processors to determine that the communication network has experienced a performance issue based on the first network performance indicator indicating poor performance.

12. A system comprising:
one or more processors; and
one or more nontransitory computer readable media including instructions which, when executed by one or more processors, cause the one or more processors to:
  collect, during a plurality of time periods spanning a plurality of days, a plurality of Layer-4 protocol statistics for Layer-4 network connections each having a first endpoint at one of one or more client devices, wherein data transmitted for each of the Layer-4 network connections traverses the communication network, each of the time periods being at least 5 minutes in duration and the plurality of days including two nonconsecutive days;
  determine, for each time period in the plurality of time periods, a first Layer-4 condition metric for the time period based on the Layer-4 protocol statistics collected during the time period;

determine a first network performance indicator, based on a number of the plurality of time periods that a first threshold condition is met by the first Layer-4 condition metric;

determine whether the communication network has experienced a performance issue based on the first network performance indicator meeting a second threshold condition; and cause a diagnostic action, a corrective action, or a maintenance action to be performed based on the determination whether the communication network has experienced a performance issue.

13. The system of claim 12, wherein:
the causing a diagnostic action, a corrective action, or a maintenance action to be performed comprises causing a wireless access point to perform a corrective action.

14. The system of claim 12, wherein:
the collecting a plurality of Layer-4 protocol statistics includes collecting TCP statistics for TCP connections when a TCP ACK is received at a network node for the TCP connection;
each of the Layer-4 network connections for which the Layer-4 protocol statistics are collected has a second endpoint at the network node; and
the collecting is performed at the network node.

15. The system of claim 12, wherein:
the collecting a plurality of Layer-4 protocol statistics includes collecting TCP statistics for TCP connections when a packet is transmitted by a network node for the TCP connection;
each of the Layer-4 network connections for which the Layer-4 protocol statistics are collected has a second endpoint at the network node; and
the collecting is performed at the network node.

16. The system of claim 12, wherein:
the first network performance indicator is determined based on the Layer-4 protocol statistics collected during a plurality of time periods each occurring during a first day;
the instructions further cause the one or more processors to:
determine that the communication network has experienced a performance issue based on the first network performance indicator indicating poor performance, and
determine a second network performance indicator, based on the Layer-4 protocol statistics collected during a plurality of time periods each occurring on a second day, the second day occurring before the first day;
wherein the determination that the communication network has experienced a performance issue is further based on the second network performance indicator not indicating poor performance.

17. The system of claim 12, wherein:
the communication network includes a wireless access point configured to provide a wireless network; and the instructions further cause the one or more processors to:
collect, during the plurality of time periods, a plurality of Layer-1 and/or Layer-2 protocol statistics for wireless data communications on the wireless network,
determine, for each time period in the plurality of time periods, a link condition metric for the time period based on the Layer-1 and/or Layer-2 protocol statistics collected during the time period;
determine a second network performance indicator, based on a number of the plurality of time periods that a third threshold condition is met b the link condition metric,
determine whether the wireless network has experienced a performance issue based on the second network performance indicator meeting a fourth threshold condition, and
cause a diagnostic action, a corrective action, or a maintenance action to be performed based on the determination whether the wireless network has experienced a performance issue.

18. The system of claim 17, wherein:
the link condition metric is an average channel utilization, an average packet error rate, or an average frame error rate;
the determining whether the wireless network has experienced a performance issue comprises automatically determining that a wireless access point has been experiencing issues with use of a first wireless communication channel; and
the instructions further cause the one or more processors to cause, in response to the determining that the wireless access point has been experiencing issues with use of the first wireless communication channel, the wireless access point to change to a second wireless communication channel different from the first wireless communication channel.

19. The system of claim 17, wherein:
the link condition metric is an average RSSI (received signal strength indicator), an average PITY (physical layer) data rate, or an average packet error rate for a first wireless client device;
the determining Whether the wireless network has experienced a performance issue comprises automatically determining that a first wireless client device has been experiencing communication issues on the wireless network; and
the instructions further cause the one or more processors to reassign, in response to the determining that the first wireless client device has been experiencing communication issues on the wireless network, a second wireless client device from a first wireless communication band to a second wireless communication band different from the first wireless communication hand.

* * * * *

UNITED STATES PATENT AND TRADEMARK OFFICE
CERTIFICATE OF CORRECTION

PATENT NO. : 10,652,765 B2
APPLICATION NO. : 16/200340
DATED : May 12, 2020
INVENTOR(S) : Kaustubh Jain and Nagesh Javali Page 1 of 1

It is certified that error appears in the above-identified patent and that said Letters Patent is hereby corrected as shown below:

In the Claims

Column 54, Line 41 "The System of claim 1, wherein:" should be -- The System of claim 12, wherein: --;

Column 56, Line 13 "that a third threshold condition is met b the link" should be -- that a third threshold condition is met by the link --;

Column 56, Line 42 "(receivedd signal strength indicator), an average PITY (physical layer)" should be -- (received signal strength indicator), an average PHY (physical layer) --;

Column 56, Line 45 "the determining Whether the wireless network has expe-" should be -- the determining whether the wireless network has exp- --;

Column 56, Line 56 "different from the first wireless communication hand." should be -- different from the first wireless communication band. --.

Signed and Sealed this
Eighteenth Day of August, 2020

Andrei Iancu
*Director of the United States Patent and Trademark Office*